United States Patent
Riddoch et al.

(10) Patent No.: US 8,116,312 B2
(45) Date of Patent: Feb. 14, 2012

(54) METHOD AND APPARATUS FOR MULTICAST PACKET RECEPTION

(75) Inventors: David J. Riddoch, Cambridge (GB);
Martin W. Porter, Cambridge (GB);
Steven L. Pope, Cambridge (GB)

(73) Assignee: Solarflare Communications, Inc., Irvine, CA (US)

( * ) Notice: Subject to any disclaimer, the term of this patent is extended or adjusted under 35 U.S.C. 154(b) by 1355 days.

(21) Appl. No.: 11/351,177

(22) Filed: Feb. 8, 2006

(65) Prior Publication Data

US 2007/0183418 A1 Aug. 9, 2007

(51) Int. Cl.
*H04L 12/28* (2006.01)
*H04L 12/56* (2006.01)
(52) U.S. Cl. ........ 370/390; 370/389; 370/392; 370/419; 713/154; 726/13
(58) Field of Classification Search .................. 709/250, 709/231, 225, 223–224, 238–240, 246, 236; 370/365, 377, 389–392, 252, 229, 395.5, 370/419, 402, 412, 413, 469; 713/186–189, 713/153, 154; 726/22, 13
See application file for complete search history.

(56) References Cited

U.S. PATENT DOCUMENTS

| | | | | |
|---|---|---|---|---|
| 4,884,263 A * | 11/1989 | Suzuki | ............................ | 370/225 |
| 5,280,477 A * | 1/1994 | Trapp | ............................ | 370/356 |
| 6,119,170 A * | 9/2000 | Schoffelman et al. | ........ | 709/244 |
| 6,208,651 B1 * | 3/2001 | Van Renesse et al. | ......... | 370/392 |
| 6,246,683 B1 * | 6/2001 | Connery et al. | ............... | 370/392 |
| 6,247,060 B1 * | 6/2001 | Boucher et al. | ............... | 709/238 |
| 6,331,983 B1 * | 12/2001 | Haggerty et al. | ............. | 370/400 |
| 6,456,597 B1 * | 9/2002 | Bare | .............................. | 370/252 |
| 6,578,080 B1 * | 6/2003 | Dwork | ........................... | 709/229 |
| 6,606,325 B1 * | 8/2003 | Cain | .............................. | 370/410 |
| 6,675,163 B1 * | 1/2004 | Bass et al. | .............................. | 1/1 |
| 6,801,948 B2 * | 10/2004 | Clark et al. | .................... | 709/231 |
| 6,874,036 B2 * | 3/2005 | Rawson, III | ................... | 709/246 |

(Continued)

FOREIGN PATENT DOCUMENTS

EP 1347597 A2 9/2003

OTHER PUBLICATIONS

Juan-Mariano De Goyeneche, "Multicast over TCP/IP HOWTO", v1.0, Mar. 20, 1998.

(Continued)

*Primary Examiner* — Aung S Moe
*Assistant Examiner* — Benjamin H Elliott, IV
(74) *Attorney, Agent, or Firm* — Haynes Beffel & Wolfeld LLP; Warren S. Wolfeld

(57) ABSTRACT

Roughly described, incoming data packets are delivered by the NIC directly to at least two user level endpoints. In an aspect, only filters that cannot be ambiguous are created in the NIC. In another aspect, the NIC maintains a filter table supporting direct delivery of incoming unicast and multicast data packets to one user level endpoint. Additional requests to join the same multicast group cause replacement of the NIC filter with one in the kernel. In another aspect, a NIC has limited capacity to maintain multicast group memberships. In response to a new multicast filter request, the kernel establishes it in the NIC only if the NIC still has sufficient capacity; otherwise it is established in the kernel.

21 Claims, 42 Drawing Sheets

U.S. PATENT DOCUMENTS

| | | | | |
|---|---|---|---|---|
| 6,965,941 | B2 * | 11/2005 | Boucher et al. | 709/230 |
| 7,143,218 | B1 * | 11/2006 | Yin et al. | 710/107 |
| 7,151,764 | B1 * | 12/2006 | Heinonen et al. | 370/338 |
| 7,188,136 | B1 * | 3/2007 | Aoshima et al. | 709/203 |
| 7,236,465 | B2 * | 6/2007 | Banerjee et al. | 370/312 |
| 7,333,488 | B2 * | 2/2008 | Sumiyoshi | 370/390 |
| 7,398,389 | B2 * | 7/2008 | Teal et al. | 713/164 |
| 7,400,596 | B1 * | 7/2008 | Robertson et al. | 370/312 |
| 7,403,535 | B2 * | 7/2008 | Modi et al. | 370/401 |
| 7,477,654 | B2 * | 1/2009 | Murray et al. | 370/432 |
| 7,493,409 | B2 * | 2/2009 | Craddock et al. | 709/238 |
| 7,546,369 | B2 * | 6/2009 | Berg | 709/227 |
| 7,620,057 | B1 * | 11/2009 | Aloni et al. | 370/395.7 |
| 2002/0001310 | A1 * | 1/2002 | Mai et al. | 370/390 |
| 2003/0126249 | A1 * | 7/2003 | Chang | 709/223 |
| 2003/0126297 | A1 * | 7/2003 | Olarig et al. | 709/250 |
| 2003/0231629 | A1 * | 12/2003 | Banerjee et al. | 370/390 |
| 2004/0100983 | A1 * | 5/2004 | Suzuki | 370/432 |
| 2004/0133669 | A1 * | 7/2004 | Jalonen et al. | 709/224 |
| 2004/0190533 | A1 * | 9/2004 | Modi et al. | 370/400 |
| 2004/0218596 | A1 * | 11/2004 | Tagore-Brage et al. | 370/389 |
| 2004/0258003 | A1 * | 12/2004 | Kokot et al. | 370/254 |
| 2005/0120378 | A1 * | 6/2005 | Jalonen | 725/97 |
| 2005/0195816 | A1 * | 9/2005 | Sumiyoshi | 370/390 |
| 2005/0210479 | A1 * | 9/2005 | Andjelic | 719/321 |
| 2006/0007860 | A1 * | 1/2006 | Komisky | 370/230 |
| 2006/0098649 | A1 * | 5/2006 | Shay | 370/389 |
| 2006/0209858 | A1 * | 9/2006 | Blum | 370/402 |
| 2006/0233171 | A1 * | 10/2006 | Murray et al. | 370/390 |
| 2007/0008967 | A1 * | 1/2007 | Bressler et al. | 370/390 |
| 2007/0025352 | A1 * | 2/2007 | Tanaka | 370/390 |
| 2007/0160048 | A1 * | 7/2007 | Faucheux et al. | 370/390 |
| 2008/0219269 | A1 * | 9/2008 | Minkenberg et al. | 370/395.4 |
| 2008/0289008 | A1 * | 11/2008 | Bourdon et al. | 726/4 |

OTHER PUBLICATIONS

W. Fenner, "Internet Group Management Protocol, Version 2", RFC 2236, Network Working Group, Nov. 1977.

R. Braudes, and S. Zabele, "Requirements for Multicast Protocols", RFC 1458, Network Working Group, May 1993.

S. Deering, "Host Extensions for IP Multicasting", RFC 1112, Network Working Group, Aug. 1989.

Riddoch, David et al.; "Distributed Computing With the CLAM Network"; Laboratory for Communications Engineering, Cambridge, England; SIGCOMM 2002, 13 pages.

Mansley, Kieran; "Engineering a User-Level TCP for the CLAN Network"; Laboratory for Communication Engineering, University of Cambridge, Cambridge, England; AGM SIGCOMM Aug. 2003 Workshops, 228-236.

Pratt, Lan et al.; "Arsenic: A User-Accessible Gigabit Ethernet Interface"; Computer Laboratory, University of Cambridge, England; UK Engineering and Physical Sciences Research Councel (EPSRC), Apr. 2001, 11 pages.

PCT/GB2007/000391, International Preliminary Report on Patentability, mailed Aug. 21, 2008.

Bilic Hrvoye, et al.; article in Proceedings of the 9th Symposium on High Performance Interconnects, "Deferred Segmentation for Wire-Speed Transmission of Large TCP Frames over Standard GbE Networks," Aug. 22, 2001, 5pp.

Bilic Hrvoye, et al.; presentation slides from 9th Symposium on High Performance Interconnects, "Deferred Segmentation for Wire-Speed Transmission of Large TCP Frames over Standard GbE Networks," Aug. 22, 2001, 9pp.

Bruce Lowekamp, et al.; ACM Computer Communication Review, vol. 31, No. 4, Oct. 2001.

Piyush Shivam, et al.; Proceedings of the 2001 ACM/IEEE conference on Supercomputing, pp. 57, Denver, Nov. 10, 2001.

Robert Ross, et al.; Proceedings of the 2001 ACM/IEEE conference on Supercomputing, pp. 11, Denver, Nov. 10, 2001.

E. Blanton and M. Allman; ACM Computer Communication Review, vol. 32, No. 1, 2002, Jan. 2002.

Murali Rangarajan, et al.; Technical Report DCR-TR-481, Computer Science Department, Rutgers University, 2002., Mar. 2002.

Jon Crowcroft, Derek McAuley; ACM Computer Communication Review, vol. 32, No. 5, 2002, Nov. 2002.

Charles Kalmanek; ACM Computer Communication Review, vol. 32, No. 5, pp. 13-19, Nov. 2002.

Jonathan Smith; ACM Computer Communication Review, vol. 32, No. 5, pp. 29-37, Nov. 2002.

NR Adiga, et al.; Proceedings of the 2002 ACM/IEEE conference on Supercomputing, pp. 1-22, Baltimore, Nov. 16, 2002.

Steven J. Sistare, Christopher J. Jackson; Proceedings of the 2002 ACM/IEEE conference on Supercomputing, p. 1-15, Baltimore, Nov. 16, 2002.

R. Bush, D. Meyer; IETF Network Working Group, Request for Comments: 3439, Dec. 2002.

Pasi Sarolahti, et al.; ACM Computer Communication Review, vol. 33, No. 2, Apr. 2003.

Tom Kelly; ACM Computer Communication Review, vol. 33, No. 2, pp. 83-91, Apr. 2003.

Jeffrey C. Mogul; Proceedings of HotOS IX: The 9th Workshop on Hot Topics in Operating Systems, pp. 25-30, May 18, 2003.

Derek McAuley, Rolf Neugebauer; Proceedings of the ACM SIGCOMM 2003 Workshops, Aug. 2003.

Justin Hurwitz, Wu-chun Feng; Proceedings of the 11th Symposium on High Performance Interconnects, Aug. 20, 2003.

Vinay Aggarwal, et al.; ACM Computer Communication Review, vol. 33, No. 5, 2003, Oct. 2003.

Wu-chun Feng, et al.; Proceedings of the 2003 ACM/IEEE conference on Supercomputing, Phoenix, Arizona, Nov. 15, 2003.

Jiuxing Liu, et al.; Proceedings of the 2003 ACM/IEEE conference on Supercomputing, Phoenix, Arizona, Nov. 15, 2003.

Srihari Makineni and Ravi Iyer; Proceedings of the 10th International Symposium on High Performance Computer Architecture, pp. 152, Feb. 14, 2004.

Cheng Jin, et al.; Proceedings of IEEE Infocom 2004, pp. 1246-1259, Mar. 7, 2004.

Andy Currid; ACM Queue, vol. 2, No. 3, 2004, May 1, 2004.

Greg Regnier, et al.; Computer, IEEE Computer Society, vol. 37, No. 11, pp. 48-58, Nov. 2004.

Gregory L. Chesson; United States District Court, Northern District California, San Francisco Division, Feb. 4, 2005.

Edward D. Lazowska, David A. Patterson; ACM Computer Communication Review, vol. 35, No. 2, Jul. 2005.

W. Feng, et al.; Proceedings of the 13th Symposium on High Performance Interconnects, Aug. 17, 2005.

B. Leslie, et al.; J. Comput. Sci. & Technol., vol. 20, Sep. 2005.

P. Balaji, et al.; Proceedings of the IEEE International Conference on Cluster Computing, Sep. 2005.

Humaira Kamal, et al.; Proceedings of the 2005 ACM/IEEE conference on Supercomputing, Seattle, p. 30, Washington, Nov. 12, 2005.

Sumitha Bhandarkar, et al.; ACM Computer Communication Review, vol. 36, No. 1, pp. 41-50, Jan. 2006.

H. K. Jerry Chu; Proceedings of the USENIX Annual Technical Conference Jan. 1996.

Ken Calvert; ACM Computer Communication Review, vol. 36, No. 2, pp. 27-30, Apr. 2006.

Jon Crowcroft; ACM Computer Communication Review, vol. 36, No. 2, pp. 51-52, Apr. 2006.

Greg Minshall, et al.; ACM Computer Communication Review, vol. 36, No. 3, pp. 79-92, Jul. 2006.

David Wetherall; ACM Computer Communication Review, vol. 36, No. 3, pp. 77-78, Jul. 2006.

Patrick Geoffray; HPCWire article: http://www.hpcwire.com/features/17886984.html, Aug. 18, 2006.

Geoffray P., "Protocol off-loading vs on-loading in high-performance networks," 14th Symposium on High Performance Interconnects, Aug. 23, 2006, 5pp.

Jose Carlos Sancho, et al.; Proceedings of the 2006 ACM/IEEE conference on Supercomputing, Tampa, Florida, Nov. 11, 2006.

Sayantan Sur, et al.; Proceedings of the 2006 ACM/IEEE conference on Supercomputing, Tampa, Florida, Nov. 11, 2006.

Steven Pope, David Riddoch; ACM Computer Communication Review, vol. 37, No. 2, pp. 89-92, 2007, Mar. 19, 2007.

Kieran Mansley, et al.; Euro-Par Conference 2007, pp. 224-233, Rennes, France, Aug. 28, 2007.

M. Kaiserswerth; IEEE/ACM Transactions in Networking vol. 1, Issue 6, pp. 650-663, Dec. 1993.
Danny Cohen, et al.; ACM Computer Communication Review, vol. 23, No. 4, p. 32-44, Jul. 1993.
J. Evans and T. Buller; IEEE TCGN Gigabit Networking Workshop, 2001, Apr. 22, 2001.
M.V. Wilkes and R.M. Needham; ACM SIGOPS Operating Systems Review, vol. 14, Issue 1, pp. 21-29, Jan. 1980.
Dickman, L., "Protocol OffLoading vs OnLoading in High Performance Networks," 14th Symposium on High Performance Interconnects, Aug. 23, 2006, 8pp.
Mogul J., "TCP offload is a dumb idea whose time has come," USENIX Assoc., Proceedings of HotOS IX: The 9th Workshop on Hot Topics in Operating Systems, May 2003, pp. 24-30.
Petrini F., "Protocol Off-loading vs On-loading in High-Performance Networks," 14th Symposium on High Performance Interconnects, Aug. 23, 2006, 4pp.
C. A. Thekkath, et al.; ACM Computer Communication Review, vol. 23, No. 4, Oct. 1993.
Raj K. Singh, et al.; Proceedings of the 1993 ACM/IEEE conference on Supercomputing, p. 452-461, Portland, Oregon, Nov. 15, 1993.
Peter Druschel and Larry L. Peterson; ACM Operating Systems Review, vol. 27, Issue 5, p. 189-202, Dec. 1993.
Matthias Kaiserswerth; IEEE/ACM Transactions on Networking, vol. 1, No. 6, p. 650-663, Dec. 1993.
Chris Maeda, Brian Bershad; ACM Operating Systems Review, vol. 27, Issue 5, p. 244-255, Dec. 1993.
Greg Regnier, et al.; IEEE Micro, vol. 24, No. 1, p. 24-31, Jan. 1994.
J. Vis; ACM Computer Communication Review, vol. 24, No. 1, pp. 7-11, Jan. 1994.
Danny Cohen, Gregory Finn, Robert Felderman, Annette DeSchon; Journal of High Speed Networks, Jan. 3, 1994.
Gregory G. Finn and Paul Mockapetris; Proceedings of InterOp '94, Las Vegas, Nevada, May 1994.
Stuart Wray, et al.; Proceedings of the International Conference on Multimedia Computing and Systems, p. 265-273, Boston, May 1994.
Various forum members; Message-Passing Interface Forum, University of Tennessee, Knoxville, May 5, 1994.
Raj K. Singh, et al.; ACM Computer Communication Review, vol. 24, No. 3, p. 8-17, Jul. 1994.
P. Druschel, et al.; ACM Computer Communication Review, vol. 24, No. 4, Oct. 1994.
Sally Floyd; ACM Computer Communication Review, vol. 24, No. 5, p. 8-23, Oct. 1994.
A. Edwards, et al.; ACM Computer Communication Review, vol. 24, No. 4, pp. 14-23, Oct. 1994.
L. S. Brakmo, et al.; ACM Computer Communication Review, vol. 24, No. 4, p. 24-35, Oct. 1994.
A. Romanow and S. Floyd; ACM Computer Communication Review, vol. 24, No. 4, p. 79-88, Oct. 1994.
R. J. Black, I. Leslie, and D. McAuley; ACM Computer Communication Review, vol. 24, No. 4, p. 158-167, Oct. 1994.
Babak Falsafi, et al.; Proceedings of the 1994 conference on Supercomputing, pp. 380-389, Washington D.C., Nov. 14, 1994.
Mengjou Lin, et al.; Proceedings of the 1994 conference on Supercomputing, Washington D.C., Nov. 14, 1994.
Nanette J. Boden, et al.; Draft of paper published in IEEE Micro, vol. 15, No. 1, pp. 29-36, 1995, Nov. 16, 1994.
Thomas Sterling, et al.; Proceedings of the 24th International Conference on Parallel Processing, pp. 11-14, Aug. 1995.
K. Kleinpaste, P. Steenkiste, B. Zill; ACM Computer Communication Review, vol. 25, No. 4, p. 87-98, Oct. 1995.
C. Partridge, J. Hughes, J. Stone; ACM Computer Communication Review, vol. 25, No. 4, p. 68-76, Oct. 1995.
A. Edwards, S. Muir; ACM Computer Communication Review, vol. 25, No. 4, Oct. 1995.
J. C. Mogul; ACM Computer Communication Review, vol. 25, No. 4, Oct. 1995.
Thorsten von Eicken, et al.; ACM Operating Systems Review, vol. 29, Issue 5, p. 109-126, Dec. 1995.
D. L. Tennenhouse, D. J. Wetherall; ACM Computer Communication Review, vol. 26, No. 2, pp. 15-20, Apr. 1996.
Paul Ronald Barham; PhD Thesis, University of Cambridge, Jul. 1996.
Chi-Chao Chang, et al.; Proceedings of the 1996 ACM/IEEE conference on Supercomputing, Pittsburgh, Nov. 17, 1996.
Joe Touch, et al.; "Atomic-2" slides, Gigabit Networking Workshop '97 Meeting, Kobe, Japan, Apr. 1997, 10pp.
Joe Touch, et al.; "Host-based Routing Using Peer DMA," Gigabit Networking Workshop '97 Meeting, Kobe, Japan, Apr. 1997, 2pp.
O. Angin, et al.; ACM Computer Communication Review, vol. 27, No. 3, pp. 100-117, Jul. 1997.
Charles P. Thacker and Lawrence C. Stewart; ACM Operating Systems Review, vol. 21, Issue 4, p. 164-172, 1987, Oct. 1997.
Ed Anderson, et al.; Proceedings of the 1997 ACM/IEEE conference on Supercomputing, p. 1-17, San Jose, California, Nov. 16, 1997.
Harvey J. Wassermann, et al.; Proceedings of the 1997 ACM/IEEE conference on Supercomputing, p. 1-11, San Jose, California, Nov. 16, 1997.
Philip Buonadonna, et al.; Proceedings of the 1998 ACM/IEEE conference on Supercomputing, p. 1-15, Orlando, Florida, Nov. 7, 1998.
Parry Husbands and James C. Hoe; Proceedings of the 1998 ACM/IEEE conference on Supercomputing, p. 1-15, Orlando, Florida, Nov. 7, 1998.
Michael S. Warren, et al.; Proceedings of the 1998 ACM/IEEE conference on Supercomputing, Orlando, Florida, Nov. 7, 1998.
John Salmon, et al.; Proceedings of the 1998 ACM/IEEE conference on Supercomputing, Orlando, Florida, Nov. 7, 1998.
Boon S. Ang, et al.; Proceedings of the 1998 ACM/IEEE conference on Supercomputing, Orlando, Florida, Nov. 7, 1998.
S. L. Pope, et al.; Parallel and Distributed Computing and Networks, Brisbane, Australia, Dec. 1998.
M. de Vivo, et al.; ACM Computer Communication Review, vol. 29, No. 1, pp. 81-85, Jan. 1999.
M. Allman; ACM Computer Communication Review, vol. 29, No. 3, Jul. 1999.
Steve Muir and Jonathan Smith; Technical Report MS-CIS-00-04, University of Pennsylvania, Jan. 2000.
Patrick Crowley, et al.; Proceedings of the 14th international conference on Supercomputing, pp. 54-65, Santa Fe, New Mexico, May 8, 2000.
Jonathan Stone, Craig Partridge; ACM Computer Communication Review, vol. 30, No. 4, pp. 309-319, Oct. 2000.
W. Feng and P. Tinnakornsrisuphap; Proceedings of the 2000 ACM/IEEE conference on Supercomputing, Dallas, Texas, Nov. 4, 2000.
Jenwei Hsieh, et al.; Proceedings of the 2000 ACM/IEEE conference on Supercomputing, Dallas, Texas, Nov. 4, 2000.
Ian Pratt and Keir Fraser; Proceedings of IEEE Infocom 2001, pp. 67-76, Apr. 22, 2001.
Regnier G., "Protocol Onload vs. Offload," 14th Symposium on High Performance Interconnects, Aug. 23, 2006, 1pp.
Montry G., OpenFabrics Alliance presentation slides, 14th Symposium on High Performance Interconnects, Aug. 23, 2006, 8pp.
Gordon E. Moore; Electronics, vol. 38, No. 8, pp. 114-117, 1965, Apr. 19, 1965.
Jack B. Dennis and Earl C. Van Horn; Communications of the ACM, vol. 9, No. 3, pp. 143-155, Mar. 1966.
Marvin Zelkowitz; Communications of the ACM, vol. 14, No. 6, p. 417-418, Jun. 1971.
J. Carver Hill; Communications of the ACM, vol. 16, No. 6, p. 350-351, Jun. 1973.
F.F. Kuo; ACM Computer Communication Review, vol. 4 No. 1, Jan. 1974.
Vinton Cerf, Robert Kahn; IEEE Transactions on Communications, vol. COM-22, No. 5, pp. 637-648, May 1974.
V. Cerf, et al.; ACM Computer Communication Review, vol. 6 No. 1, p. 1-18, Jan. 1976.
Robert M. Metcalfe and David R. Boggs; Communications of the ACM, vol. 19, Issue 7, pp. 395-404, Jul. 1976.
P. Kermani and L. Kleinrock; Computer Networks, vol. 3, No. 4, pp. 267-286, 1979, Sep. 1979.
John M. McQuillan, et al.; Proceedings of the 6th Data Communications Symposium, p. 63, 1979, Nov. 1979.
Andrew D. Birrell, et al.; Communications of the ACM, vol. 25, Issue 4, pp. 260-274, Apr. 1982.

Ian M. Leslie, et al.; ACM Computer Communication Review, vol. 14, No. 2, pp. 2-9, Jun. 1984.
John Nagle; ACM Computer Communication Review, vol. 14, No. 4, p. 11-17, Oct. 1984.
Robert M. Brandriff, et al.; ACM Computer Communication Review, vol. 15, No. 4, Sep. 1985.
C. Kline; ACM Computer Communication Review, vol. 17, No. 5, Aug. 1987.
Christopher A. Kent, Jeffrey C. Mogul; ACM Computer Communication Review, vol. 17, No. 5, pp. 390-401, Oct. 1987.
Gary S. Delp, et al.; ACM Computer Communication Review, vol. 18, No. 4, p. 165-174, Aug. 1988.
David R. Boggs, et al.; ACM Computer Communication Review, vol. 18, No. 4, p. 222-234, Aug. 1988.
H. Kanakia and D. Cheriton; ACM Computer Communication Review, vol. 18, No. 4, p. 175-187, Aug. 1988.
V. Jacobson; ACM Computer Communication Review, vol. 18, No. 4, p. 314-329, Aug. 1988.
David D. Clark; ACM Computer Communication Review, vol. 18, No. 4, pp. 106-114, Aug. 1988.
Paul V. Mockapetris, Kevin J. Dunlap; ACM Computer Communication Review, vol. 18, No. 4, pp. 123-133, Aug. 1988.
Margaret L. Simmons and Harvey J. Wasserman; Proceedings of the 1988 ACM/IEEE conference on Supercomputing, p. 288-295, Orlando, Florida, Nov. 12, 1988.
David A. Borman; ACM Computer Communication Review, vol. 19, No. 2, p. 11-15, Apr. 1989.
R. Braden, et al.; ACM Computer Communication Review, vol. 19, No. 2, p. 86-94, Apr. 1989.
David D. Clark, et al.; IEEE Communications Magazine, vol. 27, No. 6, pp. 23-29, Jun. 1989.
David R. Cheriton; ACMm Computer Communication Review, vol. 19, No. 4, p. 158-169, Sep. 1989.
Derek Robert McAuley; PhD Thesis, University of Cambridge, Sep. 1989.
Craig Partridge; ACM Computer Communication Review, vol. 20, No. 1, p. 44-53, Jan. 1990.
D. D. Clark and D. L. Tennenhouse; ACM Computer Communication Review, vol. 20, No. 4, pp. 200-208, Sep. 1990.
Eric C. Cooper, et al.; ACM Computer Communication Review, vol. 20, No. 4, p. 135-144, Sep. 1990.
Bruce S. Davie; ACM Computer Communication Review, vol. 21, No. 4, Sep. 1991.
C. Brendan S. Traw, et al.; ACM Computer Communication Review, vol. 21, No. 4, p. 317-325, Sep. 1991.
Ian Leslie and Derek R. McAuley; ACM Computer Communication Review, vol. 21, No. 4, p. 327, Sep. 1991.
Mark Hayter, Derek McAuley; ACM Operating Systems Review, vol. 25, Issue 4, p. 14-21, Oct. 1991.
Gregory G. Finn; ACM Computer Communication Review, vol. 21, No. 5, p. 18-29, Oct. 1991.
Greg Chesson; Proceedings of the Third International Conference on High Speed Networking, Nov. 1991.
Michael J. Dixon; University of Cambridge Computer Laboratory Technical Report No. 245, Jan. 1992.
Danny Cohen, Gregory Finn, Robert Felderman, Annette DeSchon; Made available by authors, Jan. 10, 1992.
Gene Tsudik; ACM Computer Communication Review, vol. 22, No. 5, pp. 29-38, Oct. 1992.
Peter Steenkiste; ACM Computer Communication Review, vol. 22, No. 4, Oct. 1992.
Paul E. McKenney and Ken F. Dove; ACM Computer Communication Review, vol. 22, No. 4, Oct. 1992.
Erich Ruetsche and Matthias Kaiserswerth; Proceedings of the IFIP TC6/WG6.4 Fourth International Conference on High Performance Networking IV, Dec. 14, 1992.
C. Traw and J. Smith; IEEE Journal on Selected Areas in Communications, pp. 240-253, Feb. 1993.
E. Ruetsche; ACM Computer Communication Review, vol. 23, No. 3, Jul. 1993.
Jonathan M. Smith and C. Brendan S. Traw; IEEE Network, vol. 7, Issue 4, pp. 44-52, Jul. 1993.
Jeffrey R. Michel; MSci Thesis, University of Virginia, Aug. 1993.
Mark David Hayter; PhD Thesis, University of Cambridge, Sep. 1993.
Jonathan Kay and Joseph Pasquale; ACM Computer Communication Review, vol. 23, No. 4, pp. 259-268, Oct. 1993.
W. E. Leland, et al.; ACM Computer Communication Review, vol. 23, No. 4, p. 85-95, Oct. 1993.

* cited by examiner

KERNEL MC GROUP MEMBERSHIP TABLE (PER LOCAL INTERFACE)

INTERFACE IP ADDRESS: _____

| MC GROUP IP ADDRESS AND DEST. PORT | # LOCAL MEMBERSHIPS | PTR TO LIST OF MEMBER SOCKETS |
|---|---|---|
|  |  |  |
|  |  |  |
|  |  |  |
|  |  |  |

FIG. 4 (PRIOR ART)

METHOD AND APPARATUS FOR MULTICAST PACKET RECEPTION

FIELD OF THE INVENTION

The invention relates to network interfaces, and more particularly to mechanisms for hardware support of multicast data packet reception.

INTRODUCTION

When data is to be transferred between two devices over a data channel, such as a network, each of the devices must have a suitable network interface to allow it to communicate across the channel. Often the network is based on Ethernet technology. Devices that are to communicate over a network are equipped with network interfaces that are capable of supporting the physical and logical requirements of the network protocol. The physical hardware component of network interfaces are referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

Most computer systems include an operating system (OS) through which user level applications communicate with the network. A portion of the operating system, known as the kernel, includes protocol stacks for translating commands and data between the applications and a device driver specific to the NIC, and the device drivers for directly controlling the NIC. By providing these functions in the operating system kernel, the complexities of and differences among NICs can be hidden from the user level application. In addition, the network hardware and other system resources (such as memory) can be safely shared by many applications and the system can be secured against faulty or malicious applications.

The kernel executes in kernel mode, also sometimes called trusted mode or a privileged mode, whereas application level processes (also called user level processes) execute in a user mode. Typically it is the processor subsystem hardware itself which ensures that only trusted code, such as the kernel code, can access the hardware directly. The processor enforces this in at least two ways: certain sensitive instructions will not be executed by the processor unless the current privilege level is high enough, and the processor will not allow user level processes to access memory locations (including memory mapped addresses associated with specific hardware resources) which are outside of a user-level physical or virtual address space already allocated to the process. As used herein, the term "kernel space" or "kernel address space" refers to the address and code space of the executing kernel. This includes kernel data structures and functions internal to the kernel. The kernel can access the memory of user processes as well, but "kernel space" generally means the memory (including code and data) that is private to the kernel and not accessible by any user process. The term "user space", or "user address space", refers to the address and code space allocated by a code that is loaded from an executable and is available to a user process, excluding kernel private code data structures. As used herein, all four terms are intended to accommodate the possibility of an intervening mapping between the software program's view of its own address space and the physical memory locations to which it corresponds. Typically the software program's view of its address space is contiguous, whereas the corresponding physical address space may be discontiguous and out-of-order, and even potentially partly on a swap device such as a hard disk drive.

Although parts of the kernel may execute as separate ongoing kernel processes, much of the kernel is not actually a separate process running on the system. Instead it can be thought of as a set of routines, to some of which the user processes have access. A user process can call a kernel routine by executing a system call, which is a function that causes the kernel to execute some code on behalf of the process. The "current process" is still the user process, but during system calls it is executing "inside of the kernel", and therefore has access to kernel address space and can execute in a privileged mode. Kernel code is also executed in response to an interrupt issued by a hardware device, since the interrupt handler is found within the kernel. The kernel also, in its role as process scheduler, switches control between processes rapidly using the clock interrupt (and other means) to trigger a switch from one process to another. Each time a kernel routine is called, the current privilege level increases to kernel mode in order to allow the routine to access the hardware directly. When the kernel relinquishes control back to a user process, the current privilege level returns to that of the user process.

When a user level process desires to communicate with the NIC, conventionally it can do so only through calls to the operating system. The operating system implements a system level protocol processing stack which performs protocol processing on behalf of the application. In particular, an application wishing to transmit a data packet using TCP/IP calls the operating system API (e.g. using a send( ) call) with data to be transmitted. This call causes a context switch to invoke kernel routines to copy the data into a kernel data buffer and perform TCP send processing. Here protocol is applied and fully formed TCP/IP packets are enqueued with the interface driver for transmission. Another context switch takes place when control is returned to the application program. Note that kernel routines for network protocol processing may be invoked also due to the passing of time. One example is the triggering of retransmission algorithms. Generally the operating system provides all OS modules with time and scheduling services (driven by the hardware clock interrupt), which enable the TCP stack to implement timers on a per-connection basis. The operating system performs context switches in order to handle such timer-triggered functions, and then again in order to return to the application.

It can be seen that network transmit and receive operations can involve excessive context switching, and this can cause significant overhead. The problem is especially severe in networking environments in which data packets are often short, causing the amount of required control work to be large as a percentage of the overall network processing work.

One solution that has been attempted in the past has been the creation of user level protocol processing stacks operating in parallel with those of the operating system. As used herein, a "user level" operation is one that does not require changing to a higher privilege level to perform. User level protocol processing stacks can enable data transfers using standard protocols to be made without requiring data to traverse the kernel stack. It is desirable for the network interface device to be capable of supporting standard transport level protocols such as TCP, UDP, RDMA and ISCSI at user level. TCP is defined in RFC:0793 Transmission Control Protocol. J. Postel. Sep-01-1981, and UDP is defined in RFC:0768 User Datagram Protocol. J. Postel. Aug-28-1980, both incorporated by reference herein. By supporting transport protocols at user level, data transfers that require use of standard protocols can be made without requiring data to traverse the kernel stack, without requiring context switches, and without requiring changing to a higher privilege level.

FIG. 1 illustrates one implementation in which user level protocol stacks are incorporated. In this architecture the TCP (and other) protocols are implemented twice: as denoted TCP1 and TCP2. In a typical operating system TCP2 will be the standard implementation of the TCP protocol that is built into the operating system of the computer. In order to control and/or communicate with the network interface device an application running on the computer may issue API (application programming interface) calls. Some API calls may be handled by the transport libraries that have been provided to support the network interface device. API calls which cannot be serviced by the transport libraries that are available directly to the application can typically be passed on through the interface between the application and the operating system to be handled by the libraries that are available to the operating system or modules within the operating system. For implementation with many operating systems it is convenient for the transport libraries to use existing Ethernet/IP based control-plane structures: e.g. SNMP and ARP protocols via the OS interface.

There are a number of difficulties in implementing transport protocols at user level. Most implementations to date have been based on porting pre-existing kernel code bases to user level. Examples of these are Arsenic and Jet-stream. These have demonstrated the potential of user-level transports, but have not addressed a number of the problems required to achieve a complete, robust, high-performance commercially viable implementation.

FIG. 2 shows an architecture employing a standard kernel TCP transport (TCPk). In operation, on packet reception from the network interface hardware (NIC), the NIC transfers data into pre-allocated data buffer (a) and invokes the OS interrupt handler by means of the interrupt line. (Step I). The interrupt handler manages the hardware interface e.g. posts new receive buffers and passes the received (in this case Ethernet) packet looking for protocol information. If a packet is identified as destined for a valid protocol e.g. TCP/IP it is passed (not copied) to the appropriate receive protocol processing block. (Step ii).

TCP receive-side processing takes place and the destination port is identified from the packet. If the packet contains valid data for the port then the packet is engaged on the port's data queue (step iii) and that port marked (which may involve the scheduler and the awakening of blocked process) as holding valid data.

The TCP receive processing may require other packets to be transmitted (step iv), for example in the cases that previously transmitted data should be retransmitted or that previously enqueued data (perhaps because the TCP window has opened) can now be transmitted. In this case packets are enqueued with the OS "NDIS" driver for transmission.

In order for an application to retrieve a data buffer it must invoke the OS API (step v), for example by means of a call such as recv( ), select( ) or poll( ). This has the effect of informing the application that data has been received and (in the case of a recv( ) call) copying the data from the kernel buffer to the application's buffer. The copy enables the kernel (OS) to reuse its network buffers, which have special attributes such as being DMA accessible and means that the application does not necessarily have to handle data in units provided by the network, or that the application needs to know a priori the final destination of the data, or that the application must pre-allocate buffers which can then be used for data reception.

It should be noted that on the receive side there are at least two distinct threads of control which interact asynchronously: the up-call from the interrupt and the system call from the application. Many operating systems will also split the up-call to avoid executing too much code at interrupt priority, for example by means of "soft interrupt" or "deferred procedure call" techniques.

The send process behaves similarly except that there is usually one path of execution. The application calls the operating system API (e.g. using a send( ) call) with data to be transmitted (Step vi). This call copies data into a kernel data buffer and invokes TCP send processing. Here protocol is applied and fully formed TCP/IP packets are enqueued with the interface driver for transmission.

If successful, the system call returns with an indication of the data scheduled (by the hardware) for transmission. However there are a number of circumstances where data does not become enqueued by the network interface device. For example the transport protocol may queue pending acknowledgments or window updates, and the device driver may queue in software pending data transmission requests to the hardware.

A third flow of control through the system is generated by actions which must be performed on the passing of time. One example is the triggering of retransmission algorithms. Generally the operating system provides all OS modules with time and scheduling services (driven by the hardware clock interrupt), which enable the TCP stack to implement timers on a per-connection basis.

If a standard kernel stack were implemented at user-level then application might be linked with the user level transport libraries, rather than directly with the OS interface. The structure can be very similar to the kernel stack implementation with services such as timer support provided by user level packages, and the device driver interface replaced with user-level virtual interface module. Advantageously, the NIC delivers incoming data packets directly to the appropriate instantiation of the user level transport library, bypassing the kernel stack whenever possible.

In order that incoming data packets be delivered to the data port of the correct application, a mechanism is required which examines the header information of the packet and looks up the associated destination queue. Such filtering is commonly performed on a number of fields of the header, including source and destination ports and addresses. In order to maximize efficiency, it is preferable that the filtering be accomplished in hardware on the network interface device, rather than in software within the kernel or user level drivers. Where the NIC supports hardware filtering of incoming IP packets, the kernel, in response to an application's request for a filter, may program the filter information into the NIC. In this case the NIC will forward to the kernel only those incoming data packets that satisfy one of its programmed filters, and will ignore any that do not. The kernel then forwards the packet on to the endpoint designated in the matching filter. Typically NICs that support hardware filtering have only limited capacity to store them, so if applications have requested too many filters, the kernel simply programs the NIC to forward all incoming data packets to the kernel and performs the filtering entirely in software.

One means of filtering packets in the network interface card is by presenting the packet header information to a content addressable memory (CAM) which associates each combination of header bit information with a specified receive port. Alternatively, iterative lookup can be performed through a table, comparing the header bit information with various entries in the table successively until a match is found.

In yet another alternative one might consider a hashed lookup, which is a form of hybrid between the parallel approach of a CAM and the sequential approach of an iterative lookup. In a hashed lookup, the table is subdivided into a number of subsets of entries. The input data is passed through a consistent mathematical "hashing function", which converts it to an index (called a hash code) pointing to the particular list (or "bucket") within which the data belongs. When new data is to be added to the table, it is simply inserted into an available free entry of the list pointed to by its hash code. When input data is to be located in the table, an iterative search is performed within the list pointed to by the hash code. Many hashing algorithms are known, and some examples may be found in Knuth, "Art of Computer Programming", Volume 3: Sorting and Searching (2nd Edition), incorporated herein by reference.

Most data packets on a typical network are unicast packets. A unicast data packet is transmitted from a sender to a single destination endpoint. (The term "endpoint" is used herein in the sense of communications protocols, to denote the entity on one end of a transport layer connection. An "endpoint" is not precluded from forwarding a data packet on to yet further destinations.) On IP-based networks, a unicast data packet is identified by source and destination IP addresses and port numbers in the header. The destination IP address designates the destination host computer network interface to which the packet should be delivered, and the destination port number designates a particular destination endpoint (typically a software endpoint) within the host. An application that expects to receive unicast data packets through a particular network interface typically makes calls to the operating system kernel to set up a filter, so that any incoming data packet having specified header information (destination IP address, destination port number, protocol, and optionally source IP address and source port), will be delivered to that application.

In addition to unicast data packet transmission, many network protocols including IP also support broadcast data packet transmission. Broadcast packets are far less frequent than unicast packets, and are intended to be received by all host interfaces connected to the network. Broadcast packets are typically used for network configuration and management purposes, rather than content transmission. On IP-based networks, a broadcast data packet is identified by a destination address of 255.255.255.255, which is a 32-bit address of all 1's. Virtually all NICs will receive broadcast data packets and forward them on to the kernel for further processing, regardless of whether the NIC performs hardware filtering.

Many network protocols including IP also support multicast data packet transmission. Multicasting is the transmission of a data packet to a set of zero or more host network interfaces who have subscribed to a "multicast group". Multicasting is used mainly for transmitting or streaming identical content to numerous recipients, for example an audio or video feed or a continuous financial information feed. On IP-based networks, a multicast data packet is identified by a destination address within the range 224.0.0.0 to 239.255.255.255, that is a 32-bit address in which the high order four bits are '1110'. The remaining 28 bits designate a "multicast group number", except that the address 224.0.0.0 is not to be assigned to any group, and 224.0.0.1 is assigned to the permanent group of all IP hosts (including gateways). This is used to address all multicast hosts on the directly connected network. Multicast data packets are delivered to all members of the designated multicast group. Membership in a multicast group is dynamic; that is, hosts may join and leave groups at any time, and a host may be a member of more than one group at a time.

Internetwork forwarding of IP multicast data packets is handled by multicast-capable routers, which may be co-resident with, or separate from, internet gateways. A host transmits an IP multicast datagram as a local network multicast which reaches all immediately-neighboring members of the destination multicast group. If the packet has an IP time-to-live greater than 1, the multicast router(s) attached to the local network take responsibility for forwarding it towards all other networks that have members of the destination group. On those other member networks that are reachable within the IP time-to-live, an attached multicast router completes delivery by transmitting the datagram as a local multicast.

Within a single host computer system, more than one endpoint can request membership in a multicast group. In a conventional arrangement such as that of FIG. 2, all incoming multicast data packets are reported to the kernel for forwarding to any applications that are members of the multicast group. FIG. 3 illustrates this arrangement symbolically. Since the kernel needs to know which application processes are members of each multicast group, it maintains a table such as that shown in FIG. 4. Each entry in the table contains a multicast group number (or full multicast group IP address), a destination IP port number, the number of software endpoints in the host that are members of the group, and a pointer to a linked list of the socket handles of the member endpoints. Multicast group membership is specific to each network interface, so if a particular host has more than one IP address assigned to it (at either one or more physical network connections), then the kernel maintains a separate table like that shown in FIG. 4 for each interface. Alternatively, it might maintain a single table for all interfaces, with a further field in each entry of the particular interface identifying to which interface the membership applies.

FIG. 5 is an example broad outline of steps that an application process might typically follow for the reception of multicast IP packets of a particular multicast group. In a step 510, when the application first starts up, its libraries are initialized. In step 512 the application makes a socket( ) call, specifying that it would like a UDP socket. The call returns to the application with a socket handle. In step 514, the application process makes a bind( ) call, in order to bind the socket to a port number. This port number is specific to the IP address of one network interface of the host, and the allocation of such port numbers is managed by the kernel. Depending on the policies and procedures of the particular multicast group, the application may request a particular "well-known" port number, or it may request a port number previously provided by or negotiated with the multicast server. In step 515, the application process makes a setSockOpt( ) call, specifying the socket handle, the "add_membership" option, the multicast group IP address it wishes to join, and the IP address of the local interface at which it wishes to join that group. In step 516, the application process makes either a recvfrom( ) call, if it knows and cares about the source of the multicast packets, or a recv( ) call if not. The application then blocks until a packet of the multicast group (or another packet destined for this same application process) comes up from the kernel. At that time, in step 518, the application processes the received data and returns, in this example, to step 516 to await the next incoming data packet. Steps 516 and 518 are repeated many times, most likely interspersed with many other functions performed by the application process. When the application has finished with the multicast transmission and wishes to leave the group, then in step 519 it makes another setSockOpt( ) call, specifying the socket handle, the "drop_membership" option, the multicast group IP address it wishes to leave, and the IP address of the local interface at which it was a member of that group. Later, when the application has finished altogether with the socket that it had created in step 512, then in step 520, the application makes a close( ) call in order to close the socket.

Note that in a different embodiment, setSockOpt( ) calls might be made by the transport library rather than directly by an application. This might occur for example if the NIC driver software or OS itself implements a protocol stack for a multicast protocol. In the case of user level transport libraries, which operate within user level rather than a kernel process, it is unimportant whether the call is made by the transport library or by the application directly; in both cases the call is made by a user level process.

FIG. 6 is an example outline of steps that the kernel might take in the environment of FIG. 3, in response to a setSockOpt add_membership system call. In step 610, the kernel first determines whether the host is already a member of the specified multicast group on the specified in network interface. If not, then the kernel creates a new multicast group entry in the kernel's table for this interface, and initializes an empty list of memberships in for this entry (step 612). In step to 614, the kernel sends an IGMP host membership report out to the specified multicast group IP address from the specified local IP address. IGMP (Internet Group Management Protocol) is a protocol used by IP hosts to report their host group memberships to any immediately-neighboring multicast routers. Briefly, multicast routers send periodic Host Membership Query messages to discover which hosts on the attached local networks have group members, and hosts respond to a Query by generating Host Membership Reports, reporting each host group to which they belong at the network interface through which the Query was received. In order to minimize the total number of Reports transmitted, hosts delay for a random time interval before responding, and then send their Reports to the entire multicast group (but not beyond the immediately-neighboring multicast routers) so that all other hosts on the local network know that they no longer need to respond with a Report about the same multicast group. Hosts also send Reports when they wish to join a multicast group, as done in step 614.

After step 614, or if the host already does have a member of this group on this interface (step 610), then in step 616, the kernel adds the socket's port number to its list of memberships for the specified multicast group at the specified local interface. In step 618, the kernel increments its count of the number of memberships in the specified multicast group at the specified interface, and in step 620 the kernel returns to the calling application process.

FIG. 7 is an example outline of steps that the kernel might take, again in the environment of FIG. 3, in response to a setSockOpt drop_membership system call. In step 710, the kernel finds and removes the port number of the specified socket handle from its list of memberships for the specified multicast group at the specified local interface. In step 712, the kernel decrements its count of the number of memberships in the specified multicast group at the specified local interface, and in step 714, it determines whether any memberships remain. If so, then the routine returns to the calling application process (step 716). If no such memberships remain, then in step 718, the kernel removes the multicast group entry from its table for the specified local interface. Then, if the kernel implements IGMP version 1, the routine simply returns to the calling application process (step 716). There is no "leave group" message in IGMP version 1; the multicast router learns that it no longer has to forward packets onto the LAN for a particular multicast group in response to the router's unanswered host membership query messages. If the routine implements IGMP version 2, then in step 720, the kernel does send an IGMP "leave group" message out to the nearby multicast routers from the specified local IP address.

FIG. 8 is an outline of steps that a kernel, again in the environment of FIG. 3, might typically follow upon receipt of an IGMP host membership query specifying a particular multicast group IP address. In step 810, in accordance with the IGMP protocol, the kernel first delays a random time interval. In step 812, it determines whether or not it has already received an IGMP host membership report for this multicast group address from another host on the network. If so, then the kernel routine exits (step 814). If not, then in step 816, the routine searches its tables for all its local interfaces, for any memberships in the multicast group address specified in the host membership query. If none are found, then the routine exits (step 814). If at least one is found, then in step 818, the kernel sends an IGMP host membership report out to the multicast group IP address specified in the query.

FIG. 9 is an example outline of steps that the kernel, again in the environment of FIG. 3, might perform upon receipt of a packet on a particular network interface. In step 910, the routine first determines from the destination IP address in the header, whether the incoming packet is a unicast or a multicast packet. If it is a unicast packet, then in step 912, the kernel performs its conventional unicast processing. If it is a multicast packet, then in step and 914, the kernel searches its table for the interface at which the packet was received, for memberships in the multicast group indicated by the destination IP address in the packet header. If no memberships are found (step 916), then the routine quietly ignores the packet. If at least one is found, then in step 918, the routine proceeds to deliver the packet to the user level process of each port number in the linked list pointed to by the table entry at which the group membership was found.

It can be seen that in the environment of FIG. 3, where all incoming multicast data packets come up through the kernel for delivery to the individual user level endpoint members of the particular multicast group, the kernel's table of multicast group memberships (FIG. 4) is central. But as previously mentioned, it is advantageous to implement network protocol stacks at user level so as to bypass the kernel as much as possible. FIG. 10 illustrates this arrangement symbolically. In this arrangement, at least some incoming multicast data packets are delivered directly from the NIC to the individual member application processes, bypassing the kernel. It is not at all clear in the arrangement of FIG. 10 whether or where to implement group membership tables, or how to maintain them.

Accordingly, it is an object of the invention to implement multicast data packet reception in an environment that takes advantage, to whatever extent possible, of an architecture in which network protocol stacks are implemented at user level and incoming data packets are delivered from the NIC to the user level stacks without intervention by the kernel.

Roughly described, in an aspect of the invention, incoming multicast data packets are delivered by the NIC to a user level endpoint directly, bypassing the kernel.

In another aspect of the invention, incoming data packets are delivered by the NIC to at least two user level endpoints in a single host computer system, bypassing the kernel.

In another aspect of the invention, roughly described, incoming unicast packets of supported protocols are delivered by the NIC directly to a user level endpoint. When an application process makes a system call that involves the establishment of a filter for the delivery of incoming data packets, then it is first determined whether the call is of a character that permits a second user level process to make a request to deliver the same incoming data packets also to a second user level endpoint. If not, then the requested filter may be established in hardware on the NIC, assuming all other requirements are met. Future incoming data packets matching the filter criteria will then be passed from the NIC directly to the user level driver, without requiring a context switch to the kernel. But if the call is of a character that does permit a second user level process to make a request to deliver the same incoming data packets also to a second user level endpoint, then the kernel instead establishes the filter in its own tables, and the NIC delivers matching packets to the kernel for forwarding to the appropriate user level process (es).

In another aspect of the invention, the NIC maintains a receive filter table that supports direct delivery of incoming data packets to one user level endpoint. Unicast filters are maintained in the NIC's filter table, as are multicast filters for multicast groups having only one endpoint member running in the host. The NIC need not know whether a particular filter is for unicast or multicast reception. Instead, in response to a user level request to join a multicast group, the kernel or another process running in the host programs the multicast filter into the NIC only if the NIC does not already have a filter for that multicast IP address and destination port number combination. Thus if a request to join a multicast group is the first such request for the specified group and port number, then the kernel programs a filter into the NIC receive filter table just as it programs a unicast filter. The only difference is that the destination IP address specified in the filter is a multicast group IP address rather than a unicast destination IP address. If the request to join the multicast group is the second or subsequent such request for the same multicast group and port number, then the filter is established in the kernel multicast group membership table instead.

More generally, a NIC has limited capacity to maintain multicast group membership information. For example the NIC might support multicast group membership of only some predetermined number N endpoints have joined the group, or it might support multicast group membership as long as the total number of endpoint memberships within the host computer system, including all multicast groups, does not exceed some maximum number M. In this aspect, when an application process makes a system call that involves the establishment of a filter for the delivery of incoming multicast data packets, then it is first determined whether the NIC has sufficient capacity to add the requested filter. If so, then the requested filter is established in hardware on the NIC. Future incoming data packets matching the filter criteria will then be passed from the NIC directly to the user level driver, potentially as well as being passed from the NIC directly to user level drivers of other processes as well, but without requiring a context switch to the kernel. But if the NIC does not have sufficient capacity to add the requested filter, then the filter is instead established in the kernel's own tables, and the NIC delivers matching packets to the kernel for forwarding to the appropriate user level process(es). In some embodiments, the kernel or the user level driver may also cause all entries in the NIC's multicast group membership tables for the same multicast group, or for the same multicast group and port combination, to be purged and transferred to the kernel tables as well.

BRIEF DESCRIPTION OF THE DRAWINGS

The invention will be described with respect to specific embodiments thereof, and reference will be made to the drawings, in which:

FIG. 4 illustrates an example kernel multicast group membership table.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 11:
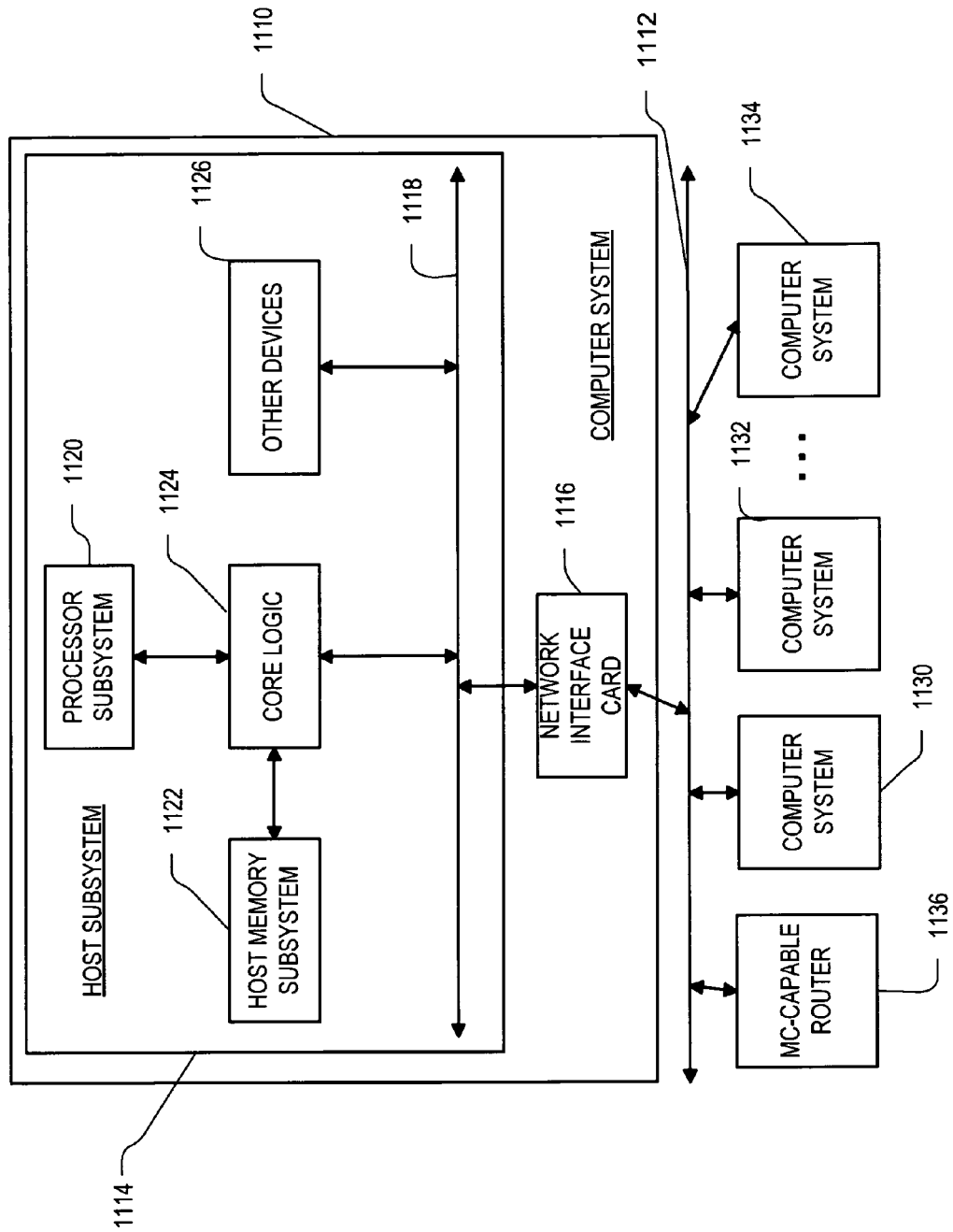
FIG. 11 is a simplified block diagram of a typical computer system that can incorporate the invention.

FIG. 11 is a simplified block diagram of a typical computer system 1110 which can communicate via a network 1112 with other computer systems such as 1130, 1132 and 1134, and with a multicast-capable router 1136. Computer system 1110 includes a network interface card (NIC) 1116 communicating via a communication channel 1118 with a host subsystem 1114. The host subsystem 1124 includes a processor subsystem 1120 which includes at least one processor, a host memory subsystem 1122, and a core logic subsystem 1124. The core logic subsystem 1124 provides bridges among the processor subsystem 1120, the host memory subsystem 1122 and the communication channel 1118. The host subsystem 1114 may also include other devices 1126 in communication with the communication channel 1118. As used herein, the host subsystem 1114 is considered to be one type of "computing device". Other types of computing devices include non-reconfigurable processing devices for which network connectivity is desired.

The network interface card 1116 provides an interface to outside networks, including an interface to the network 1112, and is coupled via network 1112 to corresponding interface devices in other computer systems and one or more routers such as 1136. Network 1118 may comprise many interconnected computer systems and communication links. These communication links may be wireline links, optical links, wireless links or any other mechanism for communication of information. While in one embodiment network 1118 is the Internet, in other embodiments, network 1118 may be any suitable computer network or combination of networks. In and embodiment described herein, network 1118 supports an Ethernet protocol.

Host memory subsystem 1122 typically includes a number of memories including a main random access memory (RAM) for storage of instructions and data during program execution, and a read only memory (ROM) in which fixed instructions and data are stored. One or more levels of cache memory may also be included in the host memory subsystem 1122. For simplicity of discussion, the host memory subsystem 1122 is sometimes referred to herein simply as "host memory". As used herein, virtual memory is considered part of the host memory subsystem even though part of it may be stored physically at various times on a peripheral device. The host memory 1122 contains, among other things, computer instructions which, when executed by the processor subsystem 1120, cause the computer system to operate or perform functions as described herein. As used herein, processes and software that are said to run in or on "the host" or "the computer", execute on the processor subsystem 1120 in response to computer instructions and data in the host memory subsystem 1122 including any other local or remote storage for such instructions and data.

The communication channel 1118 provides a mechanism for allowing the various components and subsystems of computer system 1110 to communicate with each other. In one embodiment the communication channel 1118 comprises a PCI Express bus. Other embodiments may include other buses, and may also include multiple buses. The PCI bus and its progeny, including the version known as PCI Express, support burst transfer protocols such as that described above. PCI express is described in PCI Special Interest Group, "PCI Express Base Specification 1.0a", Apr. 15, 2003, incorporated herein by reference.

Computer system 1110 itself can be of varying types including a personal computer, a portable computer, a workstation, a computer terminal, a network computer, a television, a mainframe, a server or any other data processing system or user devices. Due to the ever-changing nature of computers and networks, the description of computer system 1110 depicted in FIG. 11 is intended only as a specific example for purposes of illustrating an embodiment of the present invention. Many other configurations of computer system 1110 are possible having more or less components, and configured similarly or differently than, the computer system depicted in FIG. 11.

Figure 12:
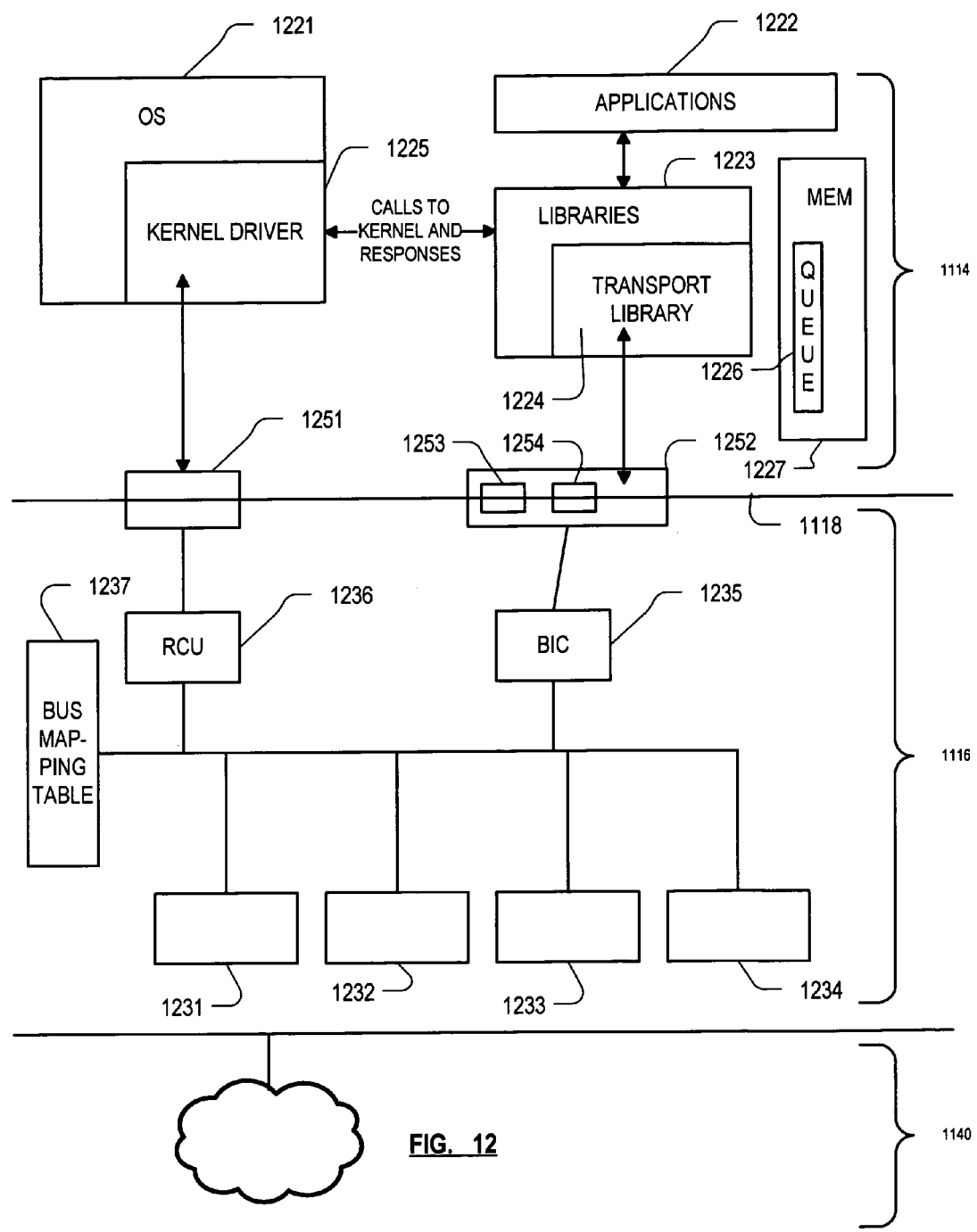
FIGS. 12, 13 and 14 are software functional views of the computer system of FIG. 11.

FIG. 12 is another view of the computer system 1110, presented to better illustrate certain software and functional features. The computer runs an operating system 1221 which is capable of supporting application processes 1222 also running on the computer. As used herein, a "process" is a program, for example an application program, in execution. A process may run multiple "threads", which can also be thought of as lightweight processes. A library 1223 of instructions is stored by the computer and available to the applications. The part of the library usable for communications with the NIC 1116 is termed a transport library 1224. Included in the operating system kernel is a driver component 1225: a dedicated set of instructions which allow for data transfer with the NIC 1116. Each application would normally take the form of a software program running on the computer, but it could be embedded in firmware. Some operating systems include applications in addition to fundamental operating system code.

The NIC 1116 supports resources of a number of types: i.e. resources having capabilities of different natures. Examples include DMA queues, event queues, timers and support resources for virtual to physical memory mapping of the type described in WO2004/025477, incorporated by reference herein. Each type of resource (1231-1234) is provided from a dedicated hardware resource pool which can support numerous instances of resources of the respective type. In order for such an instance to be made operational it is configured by means of instructions from the computing device 1114, as described in more detail below.

The NIC 1116 communicates with the computing device 1114 over the bus 1118. In this example the bus is a PCI bus, but the invention is not limited to such a bus. Data transmitted over the PCI bus 1118 is associated with a destination address and is received by whichever entity that is connected to the bus has had that address allocated to it. In a typical PC implementation the addresses are allocated in pages of 4 or 8 kB. One or more of these pages may be allocated to the NIC 1116. Blocks 1251 and 1252 represent allocated pages on the PCI bus 1118.

The NIC 1116 has a bus interface controller (BIC) 1235, a resource configuration unit (RCU) 1236 and a bus mapping table 1237. The resource configuration unit processes communications received from the computer that provide instructions on the allocation, re-allocation and de-allocation of resources on the NIC 1116, and configures the resources in accordance with such instructions. The kernel driver 1225 stores a record of which resources on the NIC 1116 are allocated. When a resource is to be allocated the driver 1225 identifies a suitable free resource of the required type on the NIC 1116 and transmits an allocation instruction to the NIC 1116. The instruction identifies the resource and specifies the details of how it is to be allocated, including details of the internal configuration of the resource (e.g. in the case of a timer the amount of time it is to run for). That instruction is passed to the resource configuration unit. The resource configuration unit then loads the specified configuration into the identified resource. The instruction also includes an ownership string, which may be an identification of which application or process on the computer is using the resource. The resource configuration unit stores these in a row of the bus mapping table. When a resource is to be re-allocated the relevant entries in the resource's own configuration store and in the bus mapping table are altered as necessary. When a resource is to be de-allocated it is disabled and any rows of the bus mapping table that relate to it are deleted.

During setup of the system one or more pages (1251, 1252) on the bus 1118 are allocated to the NIC 1116. Part of this address space (page 1251) can be used by the kernel driver 1225 to send instructions to the NIC 1116. Other pages (e.g. page 1252) can be used for communication between application processes such as application 1222 and the resources 1231-1234. The resource configuration unit 1236 stores a record of the pages that are allocated to the NIC 1116 for use by resources. Note that in some embodiments, some or all of the functions of the resource configuration unit 1236 may alternatively be provided by the kernel driver 1225 itself.

When an application 1222 wishes to open a data connection over the network it calls a routine in the user level transport library 1224 to cause the NIC resources that are required for the connection to be allocated. Standard types of network connection require standard sets of resources; for example: an event queue, transmit and receive DMA command queues, and a set of DMA'able memory buffers. For example a typical set may contain one TX command queue, one RX command queue, two timers, and on the order of 100-1000 DMA memory buffers.

The user level transport library 1224 includes routines that can be called directly by the application process 1222 and that initiate the allocation of such standard sets of resources, including set numbers of resources of different types. The transport library also includes routines that allow a resource of each type to be allocated, re-allocated or de-allocated individually. The presence of both these types of instruction means that standard connections can be set up efficiently, and yet non-standard groups of resources can be created, and existing connections can be reconfigured on a resource-by-resource basis. As used herein, a "user level process" is a process that runs in unprotected mode. Similarly, a "user level stack" is any protocol processing software that runs in unprotected mode. A "protocol stack" is the set of data structures and logical entities associated with the networking interfaces. This includes sockets, protocol drivers, and the media device drivers.

The routines for allocation, re-allocation and de-allocation of resources require access to restricted memory mapped addresses, such as page 1251 for sending configuration instructions to the NIC 1116. Since the user level transport library 1224 lacks the necessary privilege level to perform these accesses, these routines in the user level transport library 1224 make calls to the kernel driver 1225. In a Unix environment, for example, such calls might take the form of IOCtl( ) system calls. These calls cause an initial context switch to a kernel level process, which in turn communicate the instructions to the NIC 1116 for the allocation of the resources as specified in the routines. Those instructions specify the identity of the application or process with which the resources are to be associated, and the nature of the resources. The instructions are processed by the resource configuration unit 1236 of the NIC 1116.

The space on the bus 1118 that is allocated to the NIC 1116 can be split dynamically between the resources on the bus 1118. Once one or more pages 1252 have been allocated to the NIC 1116 for use by resources those resources can be allocated one or more individual sub-page addresses within that page, corresponding to locations as illustrated at 1253, 1254. Thus each resource can have a part of the total space allocated to it. A record of which part of the total space is allocated to which resource is stored in the bus mapping table 1237. The effect is that a single page of the bus can be used for communication to resources of multiple types and/or resources that relate to multiple connections and/or resources that are associated with multiple applications or processes on the computer 1114. As a result, the total bus space can be used relatively efficiently.

The usage of the allocated bus space 1252 is managed by the kernel driver 1225. When a resource is to be allocated the RCU identifies using a data store whose content it manages an unused block in the space on the bus that has already been allocated for use by resources of the NIC 1116, the space being of the size required for the resource. It then stores in that data store the identity of the resource ("resource ID"), the address of the block within the allocated space ("sub-page ID"), and the identity of the application or process that is to use the resource ("process tag"); and sends a message to the resource configuration unit 1236 to cause it to store corresponding data in the bus mapping table 1237. If the RCU finds that table 1237 indicates the address to be already occupied then it returns an error code to the driver. The sub-page address may need to be supplemented with the address of the page in which the sub-page lies if that cannot be inferred as a result of only a single page having been allocated for use by the resources. If the total space allocated for use by resources is insufficient then the kernel driver allocates it more space. Having allocated the resources, the RCU returns a success message to the kernel driver. The allocated page and sub-page addresses are returned to and mapped into the virtual address space of the user level process that requested the resources in order that it can access them by means of that data. Another context switch then takes place back to the user level calling process.

An application that has had resources allocated to it can access them by sending data (e.g. by means of load/store cycles through a virtual memory mapping) to the relevant bus page, at the sub-page address corresponding to the respective resource. Since these addresses are part of the application's virtual address space, no context switch to any kernel level processes are required in order to perform these accesses. Any data sent to pages allocated to resources is picked off the bus 1118 by the bus interface controller 1235. It directs that data to the appropriate one of the resources 1231-1234 by performing a look-up in the table 1237 to identify the identity of the resource to which the sub-page address has been allocated. An application can also access a resource by means other than a bus write: for example by means of direct memory access (DMA). In those instances, the NIC 1116 checks that the identity of the application/process from which the access has been received matches the identity indicated in the table 1237 for the resource. If it does not match, the data is ignored. If it matches, it is passed to the relevant resource. This adds to security and helps to prevent corruption of the resources by other applications.

The set of resources allocated to an application or process is sometimes referred to herein as a virtual network interface (VNIC).

Once a virtual interface has been composed, it may be reconfigured dynamically. As one example of dynamic reconfiguration, a resource that is no longer required may be freed-up. To achieve this the application using the resource calls a de-allocation routine in the user level transport library 1223. The de-allocation routine calls the kernel driver 1225, which instructs the RCU to de-allocate the resource by disabling it, clearing its status and deleting its row in the table 1237.

As another example of dynamic reconfiguration, additional resources may be added to the VNIC. The process is analogous to that described above for initial composition of the VNIC.

As yet another example of dynamic reconfiguration, resources may be passed from one application or process to another. This is most useful in the situation where a single application has multiple processes and wants to pass control of a resource from one process to another, for example if data from the network is to be received into and processed by a new process. To achieve this the application using the resource calls a re-allocation routine in the transport library 1223. The re-allocation routine calls the kernel driver 1225, which instructs the RCU to re-allocate the resource modifying its row in the table 1237 to specify the identity of the application or process that is taking over its control.

In some instances it may be desirable for resources of one type to communicate with resources of another type. For example, data received from the network 1140 may be being passed to an application 1222 for processing. The application has a queue 1226 in a memory 1227 connected to the bus 1118. The queue is managed in part by the transport library 1223, which provides a DMA queue resource 1231 on the NIC 1116 with an up-to-date pointer to the next available location on the queue 1226. This is updated as the application reads data from the queue 1226. When data is received from the network it is passed to an event queue resource 1232, which writes it to the location identified by the pointer and also triggers an event such as an interrupt on the computing device 1114 to indicate that data is available on the queue. In order for this to happen the event queue resource 1232 must learn the pointer details from the DMA queue resource 1231. This requires data to be passed from the DMA queue resource to the event queue resource.

To achieve this the "process tag" column of the table 1237 can be treated more generally as an ownership tag, and can link the DMA queue to the related event queue. To achieve this the ownership tag of the event queue can be set to the identity of the related DMA queue. When the DMA queue needs to pass data to the related event queue it can identify the event queue from the table 1237 by performing a look-up on its own identity in the ownership tag column.

Data intended to be passed from one resource to another can be checked by the bus interface controller 1235 to ensure that it is compatible with the settings in the table 1237. Specifically, when data is to be sent from one resource to another the bus controller checks that there is a row in the table 1237 that has the identity of the resource that is the source of the data in the ownership tag field, and the identity of the resource that is the intended destination of the data in the resource ID field. If there is no match then the data is prevented from reaching its destination. This provides additional security and protection against corruption. Alternatively, or in addition, it may be permitted for one resource to transmit data to another if both are in common ownership: in this example if their resource ID fields indicate that they are owned by the same process, application or other resource.

The identities of resources linked in this way can also be reconfigured dynamically by means of the re-configuration routines in the transport library.

Figure 1:
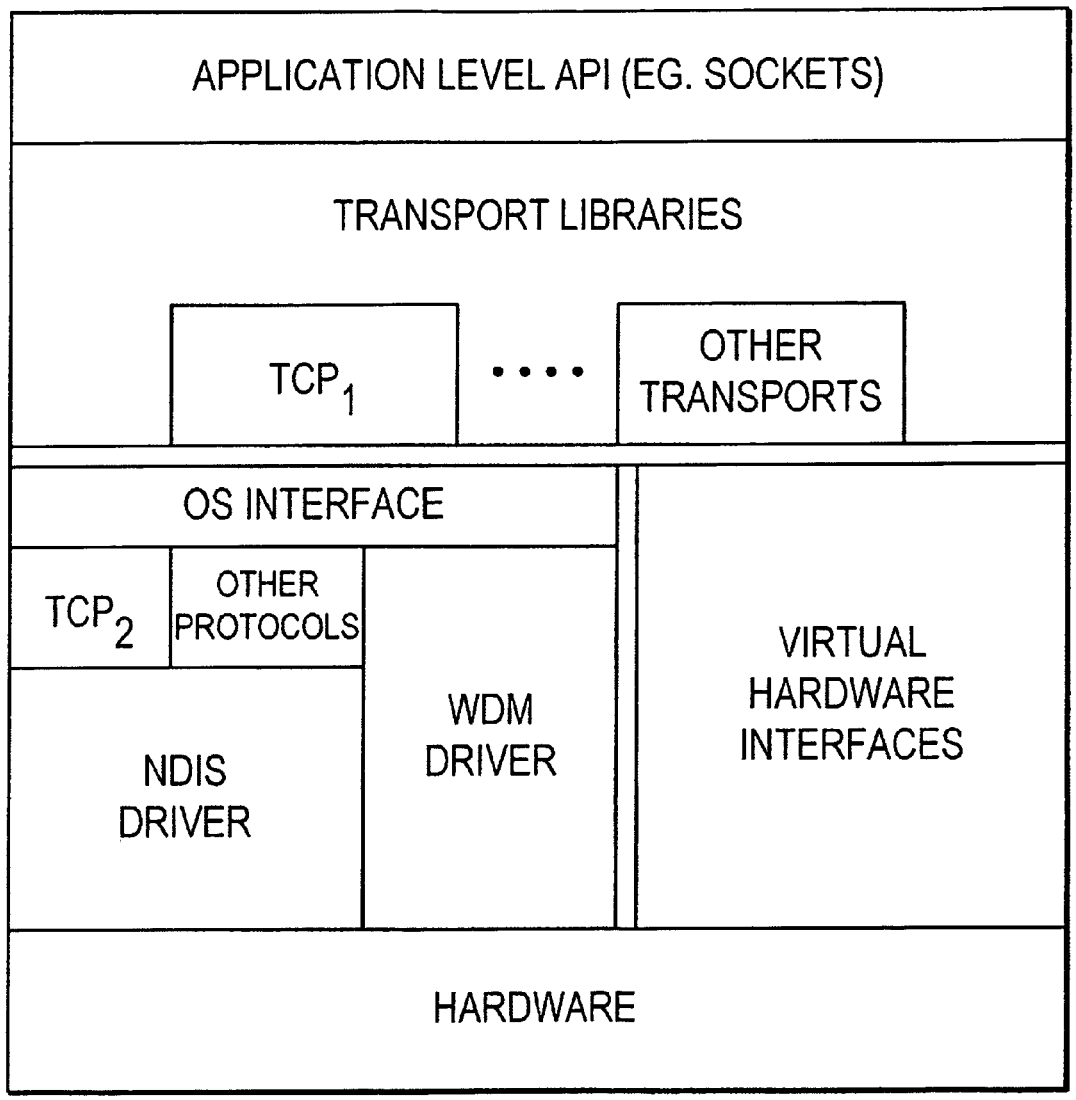
FIG. 1 illustrates an implementation of a transport library architecture.
Figure 2:
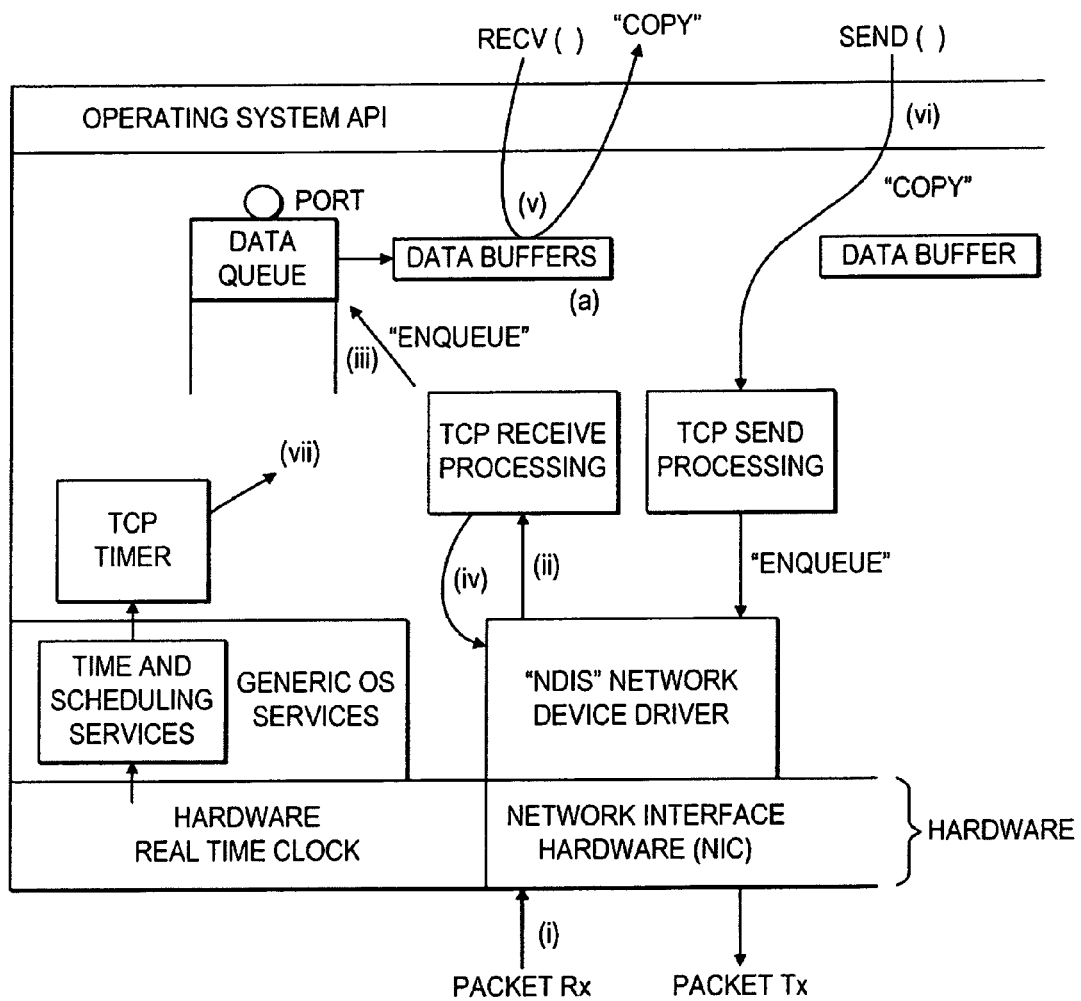
FIG. 2 shows an architecture employing a standard kernel TCP transport with a user level TCP transport.
Figure 3:
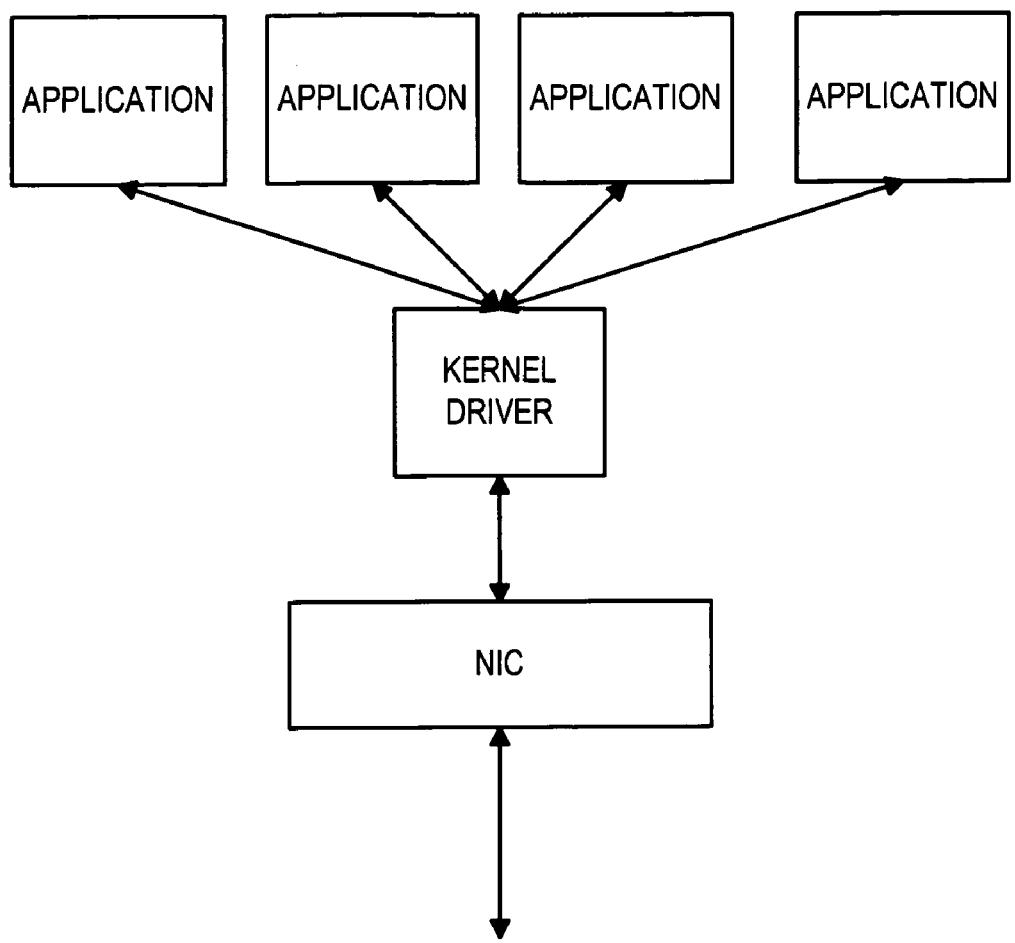
FIG. 3 symbolically illustrates a prior art arrangement for the delivery of incoming multicast data packets to any applications that are members of the multicast group.
Figure 13:
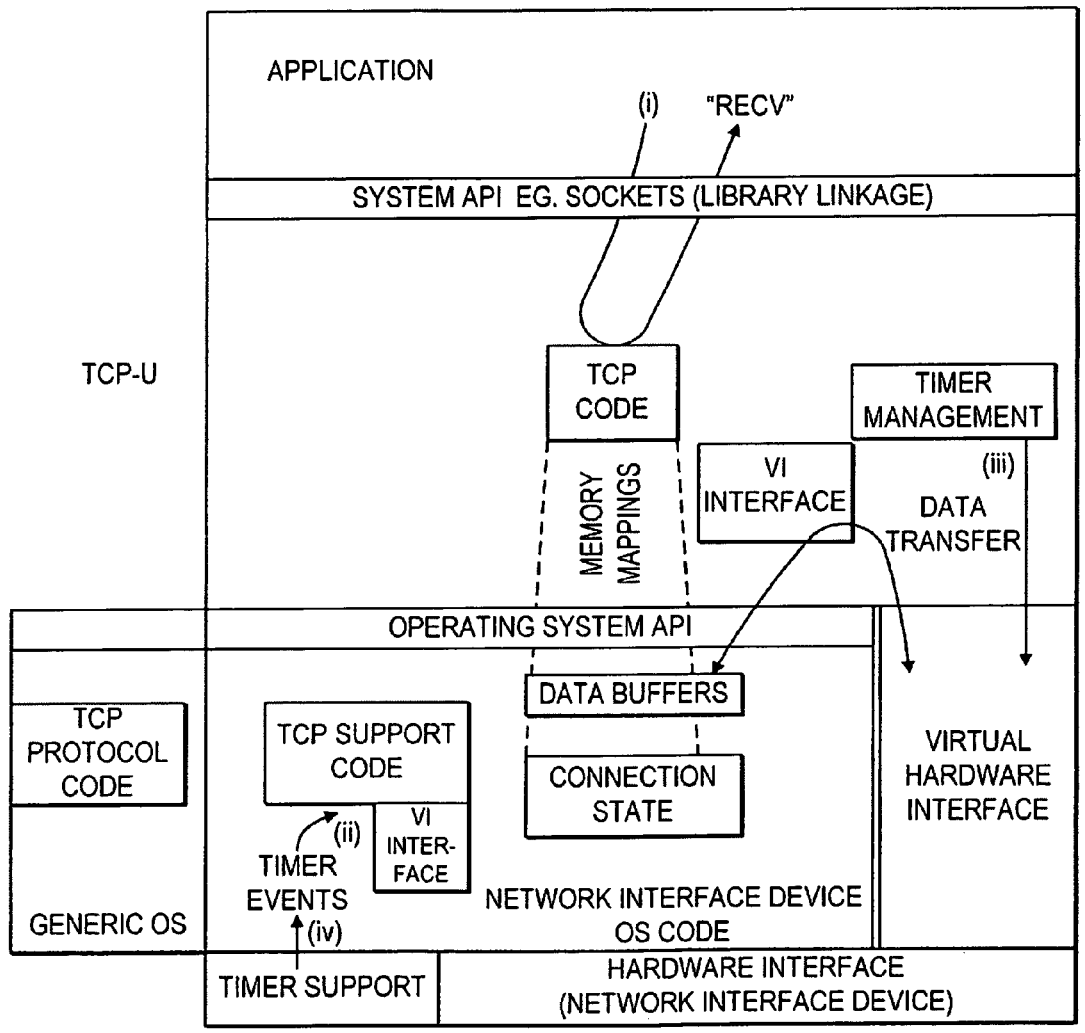

FIG. 13 shows yet another software functional view of the system of FIG. 11. Some of the features illustrated in FIG. 3B are as follows:

(I) TCP code which performs protocol processing on behalf of a network connection is located both in the transport library, and in the OS kernel. The fact that this code performs protocol processing is especially significant.

(ii) Connection state and data buffers are held in kernel memory and memory mapped into the transport library's address space (iii) Both kernel and transport library code may access the virtual hardware interface for and on behalf of a particular network connection (iv) Timers may be managed through the virtual hardware interface, (these correspond to real timers on the network interface device) without requiring system calls to set and clear them. The NIC generates timer events which are received by the network interface device driver and passed up to the TCP support code for the device.

It should be noted that the TCP support code for the network interface device is in addition to the generic OS TCP implementation. This is suitably able to co-exist with the stack of the network interface device.

Figure 14:
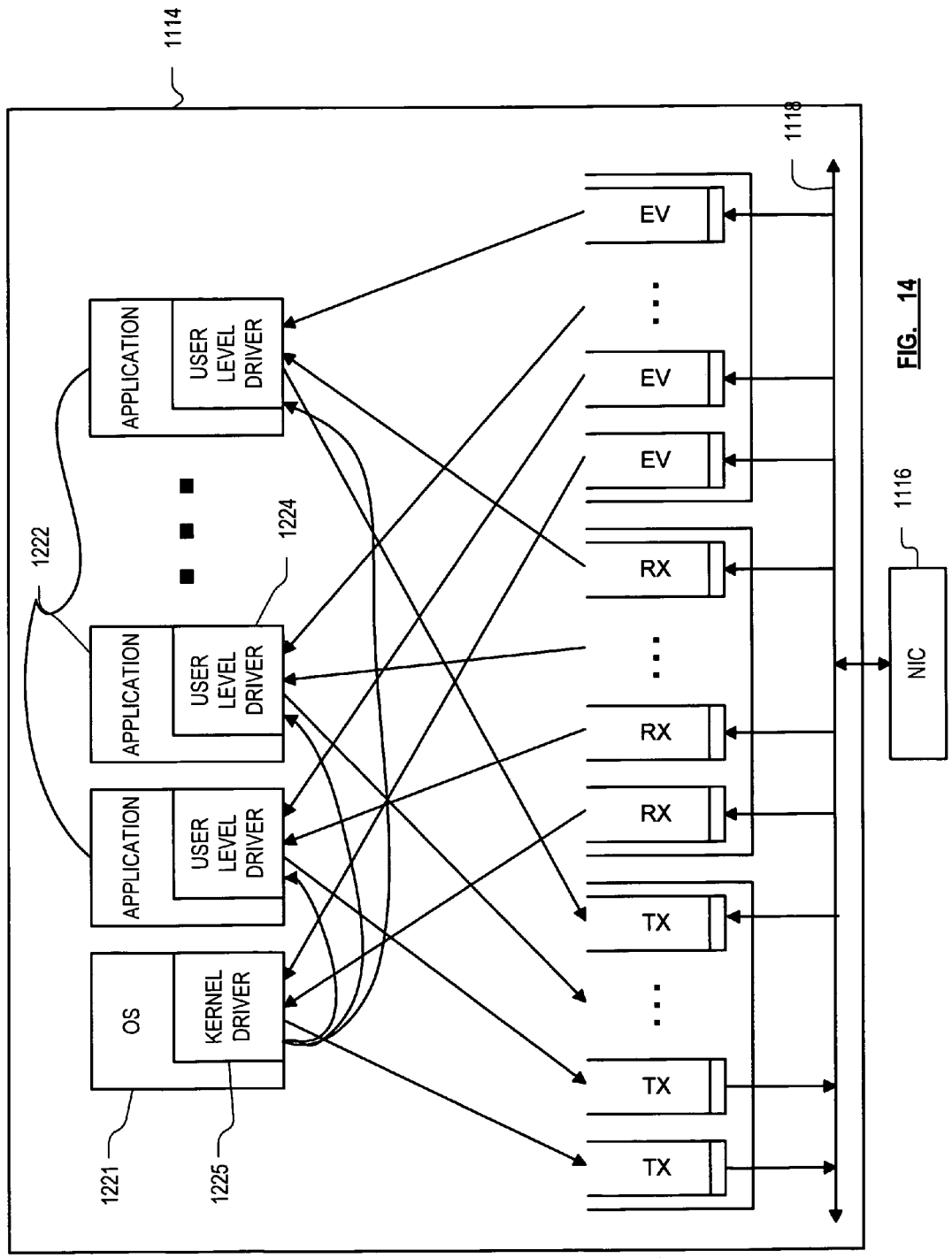

As a result of the above mechanisms, the operating system and many application programs can each maintain multiple TX, RX and Event DMA command queues. FIG. 14 illustrates this feature. As can be seen, the operating system 1221 maintains, via kernel driver 1225, TX, RX and Event data queues. Each such queue has an associated DMA command queue, not shown in FIG. 14 but maintained in the host memory 1122 by the kernel driver 1225. Multiple applications 1222 can also be running in the computer system, each with its own instance of user level driver 1224. Each such application 1222 maintains, via its respective user level driver instance 1224, TX, RX and Event data queues. As with the kernel queues, each such TX, RX and Event data queue has an associated DMA command queue, not shown in FIG. 14 but maintained in the host memory 1122 by the respective user level driver 1224. Note that the kernel driver 1225 is also able to communicate data packets received by the kernel, to the user level driver of individual target applications. This communication occurs by standard interprocess communication mechanisms of the operating system.

Figure 15:
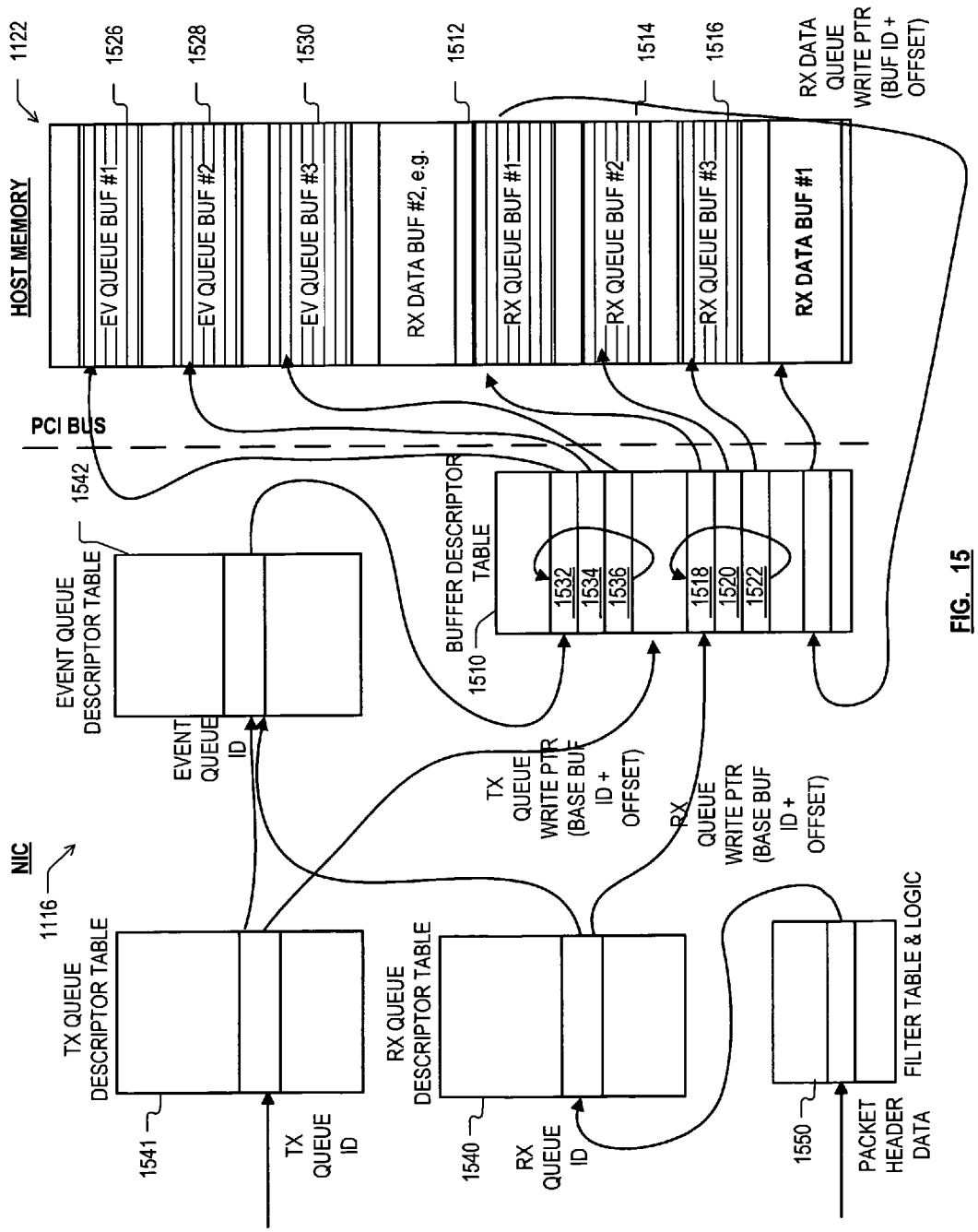
FIG. 15 is a block diagram of various data structures used by the system of FIG. 11.

FIG. 15 is a block diagram of various data structures used by the system of FIG. 11 in order to support separate transmit and receive queues for each of the VNICs. The diagram indicates which structures exist in host memory 1122 and which exist on the NIC 1116. The transmit and receive data buffers, the transmit and receive DMA descriptor queues, as well as one or more event queues, are all resident in host memory 1122 and made up of generalized buffers which can be discontiguous and interspersed with each other in host memory 1122. In FIG. 15, the buffers being used as receive data buffers are identified as "RX DATA BUF #n", and the buffers being used for a RX DMA command queue (or more simply, a receive queue) are identified as "RX QUEUE BUF #n". The buffers being used for the event queue are identified as "EV QUEUE BUF #n". Additional buffers in host memory 1122, not shown explicitly in FIG. 15, are used for transmit data buffers and for a TX DMA command queue (also called simply a transmit queue). One process may have any number of transmit, receive and event queues, and all of them share the pool of generalized buffers that have been mapped into that process's virtual address space. Other processes use a different pool of generalized buffers mapped into their respective virtual address spaces.

Individual buffers may be either 4k or 8k bytes long in one embodiment, and they are chained together into logically contiguous sequences by means of physically contiguous descriptors in a buffer descriptor table 1510 stored in the NIC 1116. For example, one receive queue might occupy buffers 1512, 1514 and 1516 in host memory 1122, which are discontiguous and possibly out-of-order regions of memory. They are chained together into a single logically contiguous space by the physically contiguous entries 1518, 1520 and 1522 in the buffer descriptor table 1510. The entries 1518, 1520 and 1522 are written and managed by the host 1114 kernel driver and are viewed as a wrap-around ring. So for example, if the host wishes to define a receive queue having 64k entries for receive data buffer descriptors, and each buffer is 4k in size, then the host will allocate a physically contiguous sequence of 16 entries in buffer descriptor table 1510 for this receive queue. Similarly, one event queue might occupy buffers 1526, 1528 and 1530 in host memory 1122. These buffers are discontiguous and possibly out-of-order in host memory, but are chained together into a single logically contiguous wrap-around space by the physically contiguous entries 1532, 1534 and 1536 in the buffer descriptor table 1510. The buffer descriptor table 1510 is indexed by "buffer ID", and each of its entries identifies, among other things, the base address of the corresponding buffer in host memory 1122.

In order to keep track of the state of each of the transmit, receive and event queues for the many user-level applications that might be in communication with NIC 1116 at the same time, the NIC 1116 includes a receive queue descriptor table 1540, a transmit queue descriptor table 1541, and an event queue descriptor table 1542. The transmit, receive and event queue descriptor tables are shown in FIG. 15 as separate tables, each containing the entire table, but it will be appreciated that in different embodiments the three tables can be implemented as a single unified table, or one of the tables can be implemented as separate sub-tables (divided by columns or by rows or by both), or some combination of these variations might be implemented. Each receive queue has a corresponding receive queue ID, which is used as an index into the receive queue descriptor table 1540. The designated entry in the receive queue descriptor table 1540 is the starting point for describing the state and other characteristics of that particular receive queue, as viewed by the NIC 1116. Each such entry identifies, among other things:

whether the queue is a kernel queue, user queue or another kind of queue;
the size of the queue (number of receive data buffer descriptors it can contain)
the ID of the event queue associated with this receive queue;
buffer ID of base buffer for this receive queue;
"device centric" read and write pointers into this receive queue.

The host 1114 maintains "host centric" versions of the read and write pointers as well, and when it has added additional receive buffers to the queue, it so notifies the NIC 1116 by writing its updated host centric receive queue write pointer into the address on the NIC of the device centric receive queue write pointer for the particular receive queue.

As shown in FIG. 15, the NIC 1116 also includes a filter table and logic block 1550. Because the NIC 1116 can support multiple simultaneous connections between user-level applications and remote agents on LAN 1112, and because the NIC 1116 supports these using multiple transmit and receive queues, one function performed by the NIC 1116 is to direct each incoming data packet to the correct receive queue. The mechanisms used by NIC 1116 to make this determination are described in detail hereinafter, but generally the filter table and logic 1550 maintains a correspondence between packet header information and destination receive queue ID. The filter table and logic 1550 thus uses the header information from the incoming packet to determine the ID of the proper destination receive queue and uses that receive queue ID to index into the receive queue descriptor table 1540. The receive queue ID is the starting point for the NIC 1116 to obtain all required information about the destination receive queue for proper forwarding of the packet data.

In an embodiment in which the NIC is able to deliver incoming multicast data packets to more than one endpoint in the host 1114, the filter table and logic 1550 maintains the correspondence between the multicast group ID from the packet header, and the ID's of the several receive queues to which it is to be delivered. The structure and operation of the filter table and logic 1550 to accomplish this is described hereinafter.

In various embodiments, as described in more detail hereinafter, the filter table and logic 1550 may contain a primary filter table for supporting primarily unicast reception, as well as one or more secondary filter tables for supporting primarily multicast reception. In an embodiment in which no secondary filter table is included, the one remaining filter table is sometimes nevertheless referred to herein as a primary filter table. Similarly, in an embodiment that does include one or more secondary filter tables, the term, "filter table" as used herein, refers to the primary and secondary filter tables collectively. In addition, it will be appreciated that the logical structure of one or more tables need not necessarily correspond to distinct physical table structures in a hardware implementation. As used herein therefore, the term "table" does not necessarily imply any unity of structure. For example, two or more separate tables, when considered together, still constitute a "table" as that term is used herein.

Thus logically described, in order to deliver a received data packet to the destination receive queue in host memory 1122, the NIC 1116 first uses the header information of the data packet to look up, in the filter table 1550, the appropriate destination receive queue ID(s). It then uses the ID of each particular receive queue to look up, in the receive queue descriptor table 1540, the buffer ID of the base buffer containing the receive descriptor queue. The NIC 1116 also obtains from the same place, the current device centric read pointer into that receive descriptor queue. It then uses the base buffer ID as a base, and the device centric read pointer high order bits as an offset, into the buffer descriptor table 1510, to obtain the base address in host memory 1122 of the buffer that contains the particular receive queue. The NIC then uses that base address as a base, and as an offset the device centric receive queue read pointer low order bits times the number of bytes taken up per descriptor, as a starting host memory address for retrieving entries from the particular receive descriptor queue. The NIC does not allocate separate space for maintaining a write pointer into any local cache into which these entries will be written.

Each entry in the particular receive descriptor queue contains, among other things:
the buffer physical address of a receive data buffer; and
a 2-byte aligned offset into the receive data buffer.

Entries for kernel receive descriptor queues can identify the buffer physical address itself, rather than a buffer ID, because the kernel is trusted to write the correct physical address whereas a user level queue is not.

The NIC 1116 then uses the buffer ID of the current receive data buffer as another index into buffer descriptor table 1510 to retrieve the buffer descriptor for the buffer into which the current receive data is to be written. Note this buffer descriptor is an individual entry in buffer descriptor table 1510; unlike the descriptors for buffers containing receive queues or event queues, this buffer descriptor is not part of a ring. The NIC 1116 obtains the physical address in host memory 1122 of the current receive data buffer, and then using that physical address as a base, and the 2-byte aligned offset from the receive descriptor queue entry as an offset, it determines the physical starting address in host memory 1122 into which the data transfer should begin. The NIC 1116 then transfers the received data packet into host memory 1122 beginning at that address. If the packet is a multicast packet, then the NIC 1116 maintains a count of the number of transfers to host memory that remain for the received data packet. When this count reaches zero, the NIC can release its own buffer for the packet.

The system handles transmit queues in a similar manner, except that multicast transmit packets are transmitted only once to the multicast group IP address.

The receive queue descriptor table 1540 entry designated by the receive queue ID, as previously mentioned, also contains the ID of the receive event queue associated with the particular receive queue. Similarly, the transmit queue descriptor table 1541 entry designated by the transmit queue ID contains the ID of the event queue associated with the particular transmit queue. All of the event queues for all the applications 1222 are described by respective entries in the event queue descriptor table 1542. The entry in the event queue descriptor table 1542 identified by a queue ID from the receive or transmit queue descriptor table 1540 or 1541 is the starting point for describing the state and other characteristics of that particular event queue, as viewed by the NIC 1116.

Note that as illustrated in FIG. 15, whereas each slot (e.g. 1532, 1534, 1518) shown in the buffer descriptor table 1510 represents a single descriptor, each slot (e.g. 1526, 1528, 1514) in the host memory 1122 represents a memory "page" of information. A page might be 4k or 8k bytes long for example, so if a receive data buffer descriptor in a receive queue occupies either 4 or 8 bytes, then each slot 1512, 1514 or 1516 as shown in FIG. 15 might hold 512, 1k or 2k receive data buffer descriptors.

FIGS. 16-19 are flowcharts illustrating functions that take place for receiving data using the structures of FIG. 15. As with all flowcharts herein, it will be appreciated that many of the steps of FIGS. 16-19 can be combined, performed in parallel or performed in a different sequence without affecting the functions achieved. In some cases a re-arrangement of steps will achieve the same results only if certain other changes are made as well, and in other cases a re-arrangement of steps will achieve the same results only if certain conditions are satisfied. Such variations will be apparent to the reader.

Figure 16:
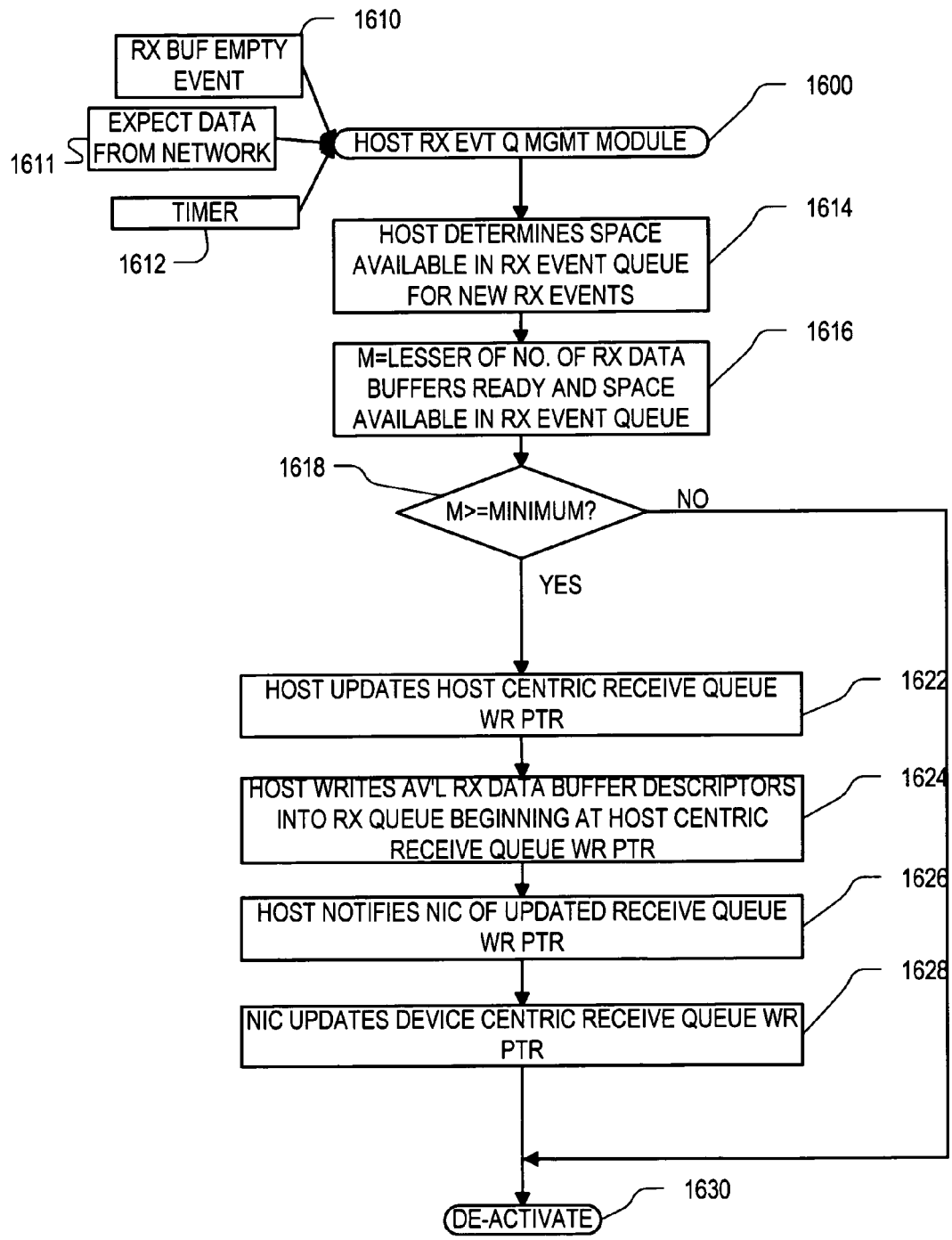
FIGS. 16-19 are flowcharts illustrating functions that take place for receiving data using the structures of FIG. 15.

In FIG. 16, a host receive event management module in the user level transport library for a given application process receives an indication from other software to expect data from the network (step 1611). The module is also activated in response to receipt by the host of a receive queue empty event as described hereinafter (step 1610). The module also may be activated periodically on expiration of a polling loop or timer (step 1612). The host subsystem 1114 will push receive buffers onto this receive queue in response to these triggers, but limited so as to guarantee that the corresponding event queue will not overflow. The host subsystem 1114 therefore will not queue more data buffers for receive data than can be accommodated in the receive event queue by the number of receive completion events that would be generated.

After determining the amount of space currently available in the receive event queue, in step 1616 the host subsystem 1114 determines a number 'M', being the lesser of the number of data buffers available for queuing of receive data, and the minimum number of receive data buffers that can be represented by receive completion events in the space available in the receive event queue as determined in step 1614.

In step 1618, it is determined whether M is greater than or equal to some minimum threshold. Preferably the minimum threshold is 1, but in other embodiments a larger number may be chosen for the threshold. If M is less than the threshold, then the host receive event queue management module 1600 simply goes inactive to await the next activation event (step 1630).

If M is greater than or equal to the minimum threshold, then in step 1622, the host subsystem 1114 updates (modulo-increments) its host centric receive queue write pointer by M entries. In step 1624 the host subsystem 1114 writes M available receive data buffer descriptors into the receive queue beginning at the entry previously (before step 1622) designated by the host centric receive queue write pointer. In step 1626 the host subsystem 1114 notifies the NIC 1116 of the updated write pointer, and in step 1628, the NIC 1116 updates its own device centric receive queue write pointer for the specified receive queue. In one embodiment, steps 1626 and 1628 are combined into a single step in which the host subsystem 1114 writes the updated write pointer into a memory mapped location of the device centric receive queue write pointer. In step 1630, the host receive event queue management module goes inactive to await the next activation event.

Figure 17:
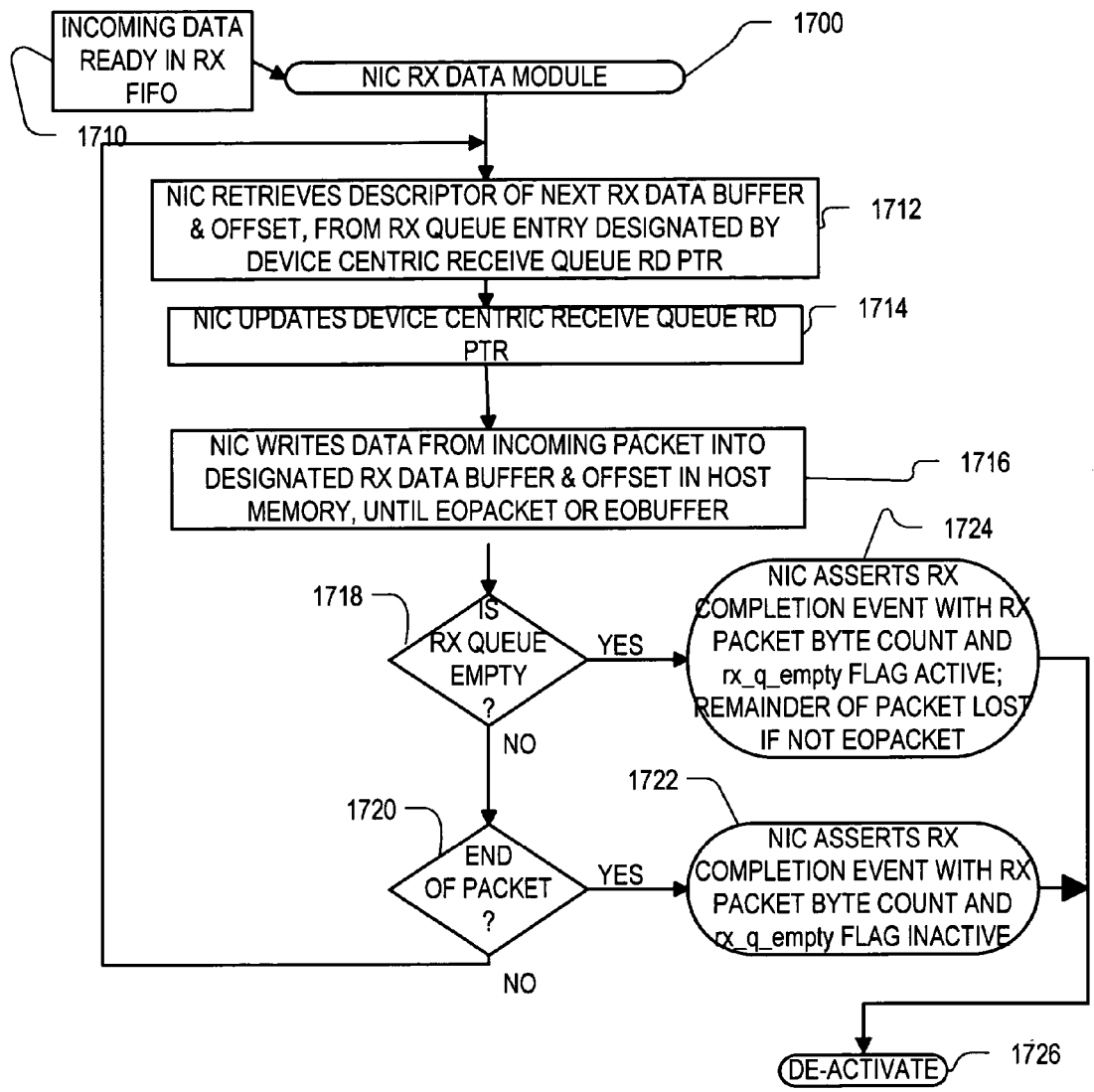

FIG. 17 is a flowchart illustrating functions initiated on the NIC 1116 upon receipt of data from the network 1112 which it has determined is destined for a particular receive queue. In the case of a multicast data packet, FIG. 17 illustrates the functions initiated for the transfer of the data to each destination receive queue. The incoming data is placed into a RX FIFO, and when a high water mark is reached, the NIC receive data module 1700 is activated (step 1710). In step 1712, the NIC 1116 retrieves the descriptor of the next receive data buffer and offset from the entry of the receive queue designated by device centric receive queue read pointer for the particular destination queue. In step 1714, the NIC 1116 updates (modulo-increments) its device centric receive queue read pointer for that queue. The NIC does not at this time notify the host 1114 of the new read pointer since that notification will occur implicitly or explicitly through event delivery as described below.

In step 1716, the NIC 1116 writes data from the incoming packet into the receive data buffer designated by the retrieved descriptor, beginning at the specified offset. Writing continues by DMA until either the end of the current data buffer is reached or the end of the incoming data packet is reached, or both.

The NIC 1116 detects and reports a queue empty alert when it believes it has retrieved and used the last buffer descriptor in the particular receive queue. This alert is combined into a single event descriptor with the receive completion event. In particular, the NIC 1116 determines in step 1718 whether it believes it has used the last receive buffer identified by a descriptor in the receive queue. The NIC can determine this by comparing its device centric receive queue read pointer to its device centric receive queue write pointer for the particular receive queue. If not, that is the NIC knows there are more receive buffer descriptors in the receive queue, then no alert is necessary and in step 1720, the NIC determines whether end-of-packet has been reached. If not, then the NIC receive data module 1700 returns to step 1712 to retrieve the descriptor for the next receive data buffer. No event is asserted to indicate Receive Data Buffer Full in this embodiment. The host 1114 will become aware of which receive data buffers are full based on the receive data buffers identified consecutively in the receive queue, beginning at the host-centric RX queue read pointer.

If step 1720 determines that end-of-packet was reached, then in step 1722 the NIC 1116 asserts a receive completion event to cover all the receive data buffers that contain data from the packet. The receive completion event descriptor format includes a receive descriptor queue empty flag ('rxZ_desc_q_empty'), but in the receive completion event written in step 1722, this flag is not set because the NIC 1116 has determined (in step 1718) that additional receive buffer descriptors remain in the receive queue. Note that in this embodiment, only one receive completion event will be asserted even if the packet data spans multiple buffers in receive data buffers. Multiple buffers are chained together by consecutive entries in the receive queue. Note also that if end-of-packet does not coincide with the end of a receive buffer, then the remaining space in the buffer is left unused.

Returning to step 1718, if the NIC 1116 believes that the last receive data buffer identified by a descriptor in the receive queue has been retrieved in step 1712, then the NIC does not wait until end-of-packet before reporting the receive completion event. Instead, in step 1724 the NIC asserts a receive completion event to cover all the receive data buffers that contain data from the packet. In this receive completion event the rx_desc_q_empty flag is set. If packet data remains in the NIC's RX FIFO when this occurs, it is lost.

In an embodiment in which the NIC supports more than one network port, the NIC 1116 does not batch receive completion events. Receive completion events do not indicate completion of more than one receive data buffer. This embodiment supports both standard size data packets, in which data packets have a relatively small maximum length and the receive data buffers are at least as large as the maximum data packet length, and "jumbo" data packets, in which a data packet can be longer and can span more than one data buffer. A given receive queue is either in standard mode or jumbo mode. If the queue is in standard mode, then absent an error, every receive data buffer filled will contain an end-of-packet, so no receive completion event will indicate completion of more than one data buffer and the problem will not arise. If the queue is in jumbo mode then it is still the case that no receive completion event will indicate completion of more than one data buffer, since the NIC writes a receive completion event for each data buffer it fills. The receive completion event format includes a "RX_Jumbo_Cont" bit which the NIC sets in order to notify the host subsystem that the subject data buffer does not contain an end-of-packet (i.e. there will be a continuation buffer). This embodiment therefore does not batch receive completion events. The receive completion event still includes a copy of the NIC's updated device centric receive queue read pointer, which now points to the specific descriptor from the receive queue for whose data buffer the event indicates completion. The receive completion event format also indicates the NIC port number from which the packet was received.

Returning to the FIG. 17 embodiment, after both steps 1724 and 1722, once the NIC has asserted a receive completion event, the NIC receive data module 1700 then returns to an inactive state (step 1726).

Figure 18:
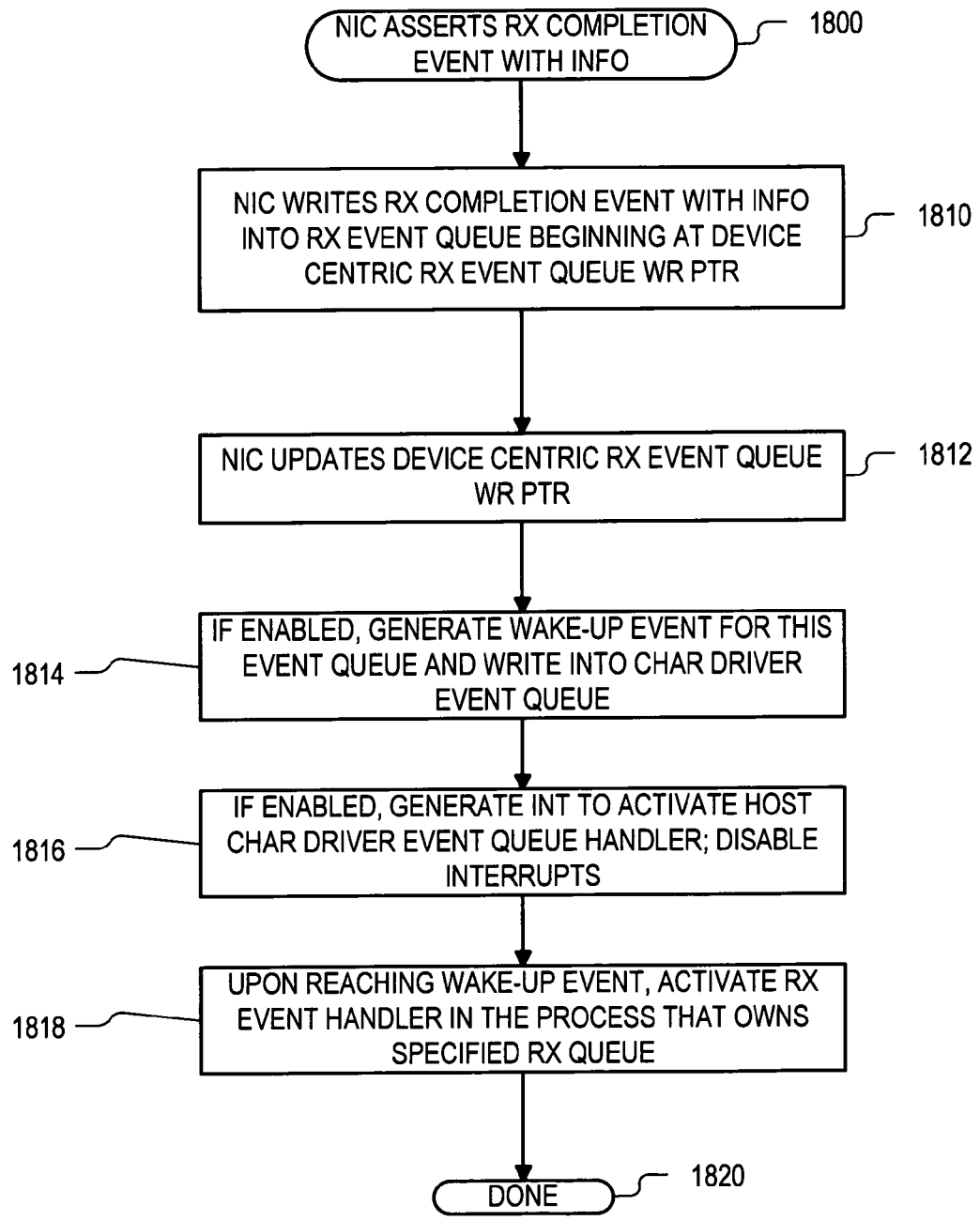

In both steps 1724 and 1722, the NIC asserts a receive completion event containing certain information. FIG. 18 is a flowchart detail of this step. In step 1810, the NIC 1116 writes the receive completion event into the corresponding receive event queue beginning at the entry identified by the device centric receive event queue write pointer for that event queue. In step 1812, NIC 1116 correspondingly updates its own receive event queue write pointer. In step 1814, if enabled, the NIC 1116 generates a wake-up event for this event queue and writes it into an event queue associated with a char driver in the kernel. In step 1816, again if enabled, the NIC 1116 generates an interrupt to activate the host char driver event queue handler, then disables interrupts. In step 1818, the host char driver event queue handler, upon reaching the wake-up event, activates the receive event handler in the process that owns the specified receive queue.

Figure 19:
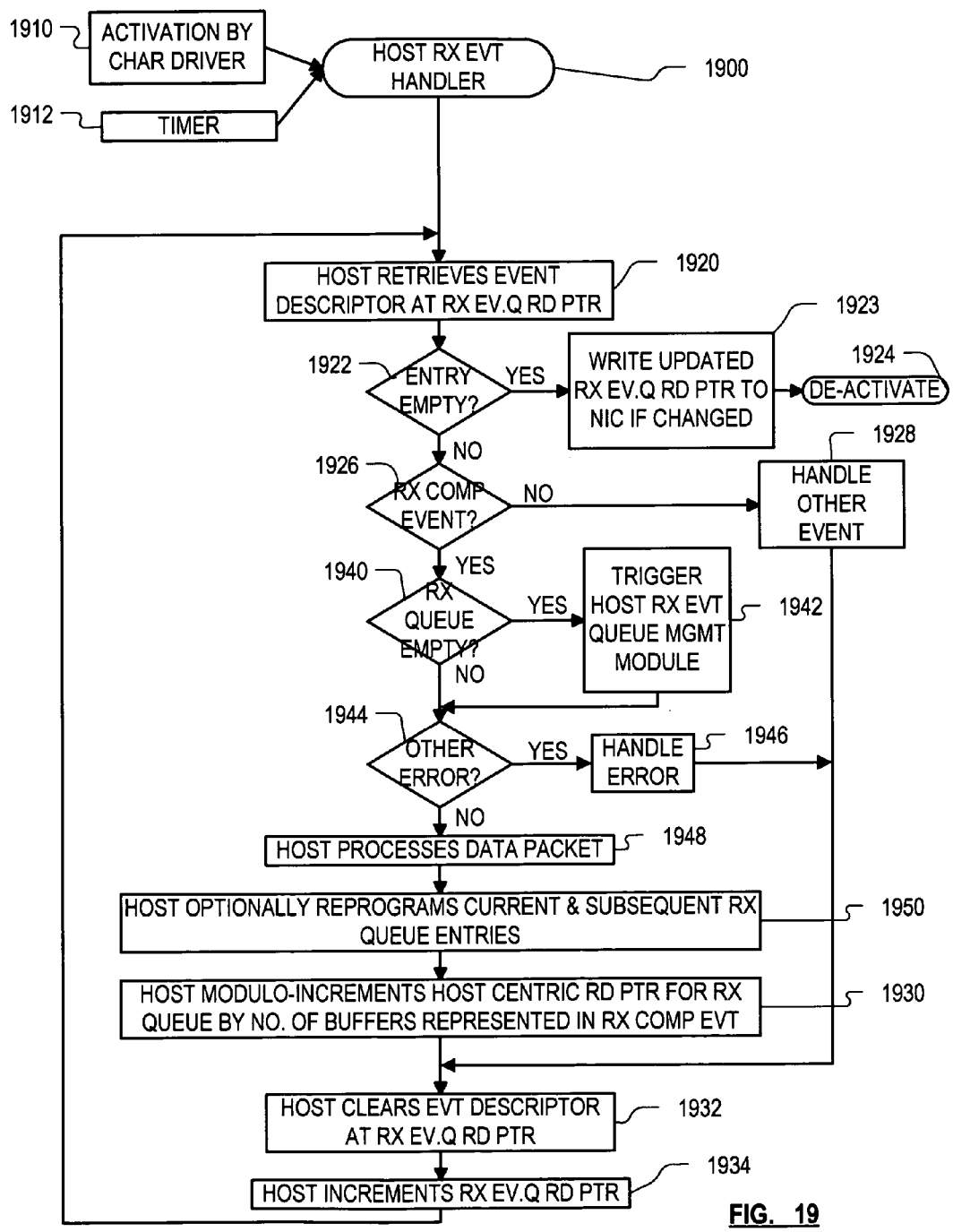

FIG. 19 is a flow chart illustrating pertinent functions of a host receive event handler module 1900 of the user level transport library of the process that owns the particular destination receive queue. Module 1900 is activated either by the host char driver in response to a wakeup event (step 1818, FIG. 18), or on selection periodically by a polling loop or expiration of a timer (step 1912).

In step 1920, the host subsystem 1114 retrieves the event descriptor at the location in the event queue designated by the receive event queue read pointer. If this new event is not in the cleared state (step 1922), then the receive event queue contains events for handling at this time. In step 1926, it is determined whether the new event is a receive completion event. In one embodiment receive event queue cannot contain any events other than receive completion events, but in another embodiment it can. Thus if the current event is something other than a receive completion event, such as a management event, then it is handled in step 1928.

If the current event is a receive completion event, then in step 1940 the host 1114 determines whether the Receive Queue Empty flag is set. If so, then the module (in step 1942) triggers the host receive event queue management module 1600 in order to replenish the receive queue with additional receive data buffers. Additional receive data buffers can be posted at other times as well, since it is highly desirable to avoid any possibility of a receive queue empty condition. In step 1944, the host 1114 determines further whether any of a variety of error types are indicated by the receive completion event descriptor. If so, then in step 1946 the host 1114 handles the error. Note that some of the error types included in step 1944 may actually be detected before or after the receive queue empty test of step 1940, some may bypass the replenishment (triggered by step 1942) of receive buffer descriptors in receive queue for the time being, and some may bypass processing of the data packet in step 1948. The details of such error handling are not important for an understanding of the invention.

In step 1948, assuming no serious error has been detected, the host 1114 processes the newly received packet data, including protocol processing. This may require chaining together several receive data buffers in sequence as designated by consecutive receive queue entries. The host 1114 knows the starting buffer and offset of the packet from the buffer descriptor in the receive queue pointed to by the host centric receive queue read pointer, and knows the end of the packet either from the receive packet byte count identified in the receive completion event or from the copy of the device centric receive queue read pointer that might be included in the receive completion event. After processing the packet data in these buffers, the host may release the buffers back into a pool for eventually re-writing into the receive queue for re-use by different incoming packet data.

In step 1950, if the higher level software is so designed, the host subsystem 1114 may reprogram the receive queue entry pointed to by the host centric receive queue read pointer with a descriptor for a new available receive data buffer, and may do the same with respect to all consecutively subsequent receive queue entries up to but not including the receive queue entry pointing to the beginning of data for the next receive packet. In step 1930, the host subsystem 1114 modulo-increments the host centric receive queue read pointer for the receive queue by the number of buffers represented in the current receive completion event. In step 1932, the host subsystem 1114 clears the event descriptor at the location in receive event queue identified by the current receive event queue read pointer, and in step 1934 the host subsystem 1114 modulo-increments the receive event queue read pointer. The module then loops back to step 1920 to retrieve the next event descriptor, and so on until a cleared entry is retrieved and the module goes inactive (step 1924).

If in step 1922 it is determined that the retrieved next event descriptor is cleared, then the receive event queue contains no more events for handling at this time. In one embodiment, the host receive event handler 1900 would then simply go inactive to await the next activation trigger (step 1924). In another embodiment, in step 1923, if the host centric receive event queue read pointer has changed, then the host writes the updated pointer value into the NIC's device centric receive event queue read pointer. The host receive event handler 1900 then goes inactive in step 1924.

Figure 20:
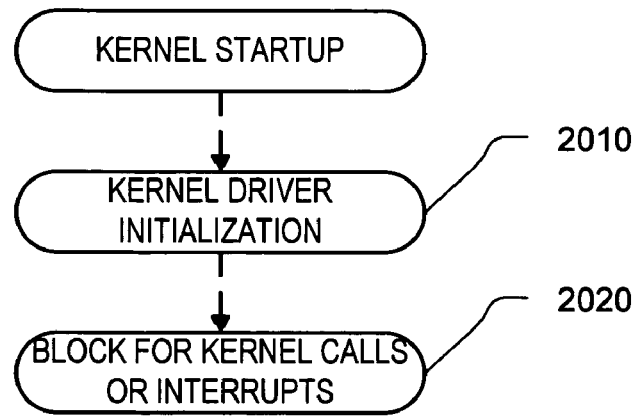
FIG. 20 is a flow chart of pertinent steps that are performed by the operating system kernel of FIG. 11 on system startup.

FIG. 20 is a brief flow chart of pertinent steps that are performed by the operating system kernel 1225 on system startup. In a step 2010, the system calls a kernel driver initialization routine, and when that returns, in step 2020, the kernel blocks and awaits calls or other interrupts from the various hardware and software entities in the system. Many other steps of course are performed during kernel startup, but they are not shown in FIG. 20 since they are not pertinent to the present description.

Figure 21:
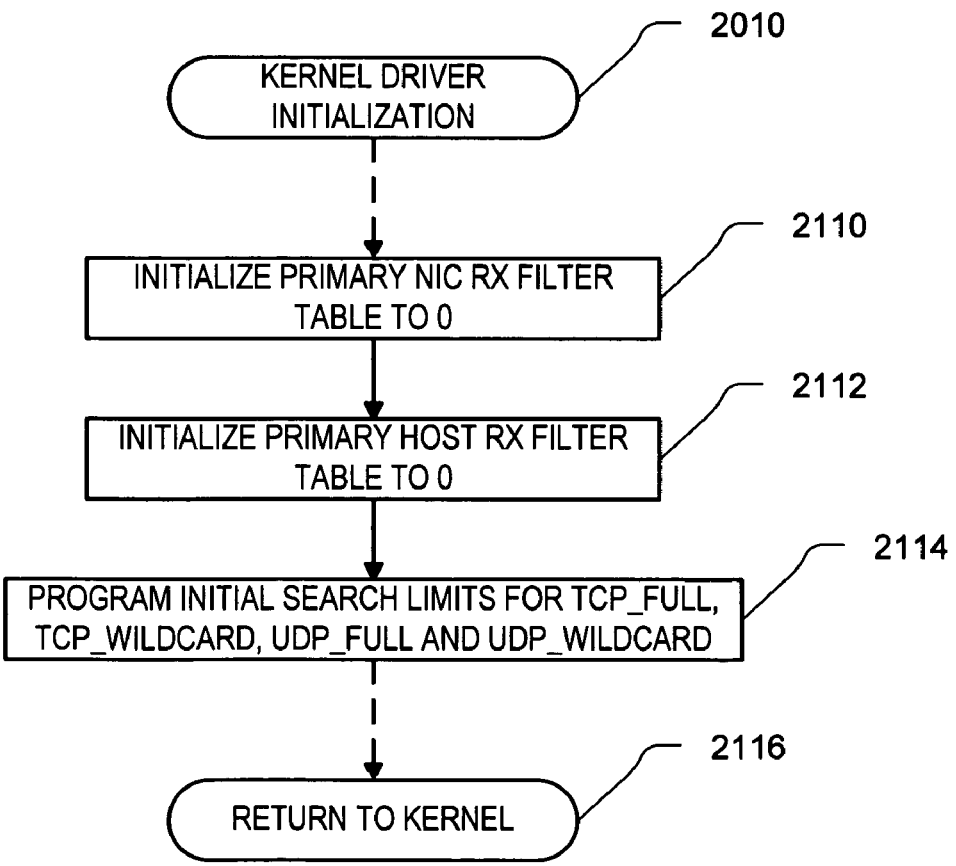
FIG. 21 is a flow chart of pertinent steps performed by the kernel driver initialization routine called in FIG. 20.

FIG. 21 is a flow chart of pertinent steps performed by the kernel driver initialization routine 2010. In step 2110, the routine initializes the primary receive filter table in the NIC 1116 such that each entry in the table contains a value which will be recognized by the NIC as being empty. This can be done by setting an empty flag bit for each entry, or preferably, by writing a unique known value into each entry. In the present embodiment the value indicating an empty entry is zero. The kernel driver 1225 maintains its own host-centric copy of the receive filter table in host memory 1122, and in step 2112, the kernel driver initializes the host primary receive filter table to all zeros as well.

In step 2114, the kernel driver programs initial search limits for four kinds of filter table hash searches into the NIC 1116. Before explaining this step, it will be useful to understand the organization of the primary receive filter table. There are many ways to organize the receive filter table, but in the present embodiment, all types of entries are intermixed in a single table address space, and the same table entry format, at least functionally, is used in both the NIC's receive filter table and in the kernel's host-centric copy. Four types of entries are supported: TCP_full, TCP_wildcard, UDP_full and UDP_wildcard. Table I below illustrates the format for an entry in the receive filter table. For purposes of the present discussion, any multicast extensions to the table format are not yet described, except to note that many kinds of multicast data are carried in UDP packets.

TABLE I

| Entry Type | bit[108] | bits[107:96] | bits[95:64] | bits[63:48] | bits[47:16] | bits[15:0] |
|---|---|---|---|---|---|---|
| TCP_Full | 0 | Q_ID[11:0] | destIP[31:0] | destPORT[15:0] | srcIP[31:0] | srcPORT[15:0] |
| TCP_Wildcard | 0 | Q_ID[11:0] | destIP[31:0] | destPORT[15:0] | 0 | 0 |
| UDP_Full | 1 | Q_ID[11:0] | destIP[31:0] | destPORT[15:0] | srcIP[31:0] | srcPORT[15:0] |
| UDP_Wildcard | 1 | Q_ID[11:0] | destIP[31:0] | 0 | 0 | destPORT[15:0] |

It can be seen that each entry contains up to five fields for identifying a particular TCP or UDP endpoint in the host subsystem 1114 (protocol (TCP or UDP), source IP address, source port number, destination IP address, destination port number), plus one for the associated receive queue ID. The queue ID field points to the entry in the receive queue descriptor table 1541 (FIG. 15), into which an incoming packet should be delivered when the endpoint data specified in the entry matches that of the header of the incoming packet.

The four fields, source IP address, source port number, destination IP address, and destination port number are referred to herein as the endpoint data portion of the entry. For a TCP_full entry, all four fields of endpoint data are filled. An incoming data packet will not match such an entry unless it is a TCP packet and all four endpoint data fields match corresponding fields in the packet header. For a TCP_wildcard entry, the destination IP address and destination port number are filled in, and the remaining fields contain zeros. An incoming data packet will match a TCP_wildcard entry if the incoming packet is a TCP packet and the two filled-in endpoint fields of the entry match corresponding fields in the packet header, regardless of the source IP address and port. For a UDP_full entry, all four fields of endpoint data are filled. An incoming data packet will not match such an entry unless it is a UDP packet and all four endpoint data fields match corresponding fields in the packet header. For a UDP_wildcard entry, like the TCP_wildcard entry, only the destination IP address and ports are filled and the remaining fields contain zeros. The UDP_wildcard entry format differs from that of the TCP_wildcard entry format since the destination port number is located in the field in which, for the TCP_full entry, contains the source port number. An incoming data packet will match a UDP_wildcard entry if the incoming packet is a UDP packet and the two filled-in endpoint data fields of the entry match corresponding fields in the packet header, again regardless of the source IP address and port.

It will be appreciated that another implementation might support different table entry formats, different protocols, and/or different entry types. As one example, entries may contain other kinds of numeric range indications rather than a wildcard for the entire field. As another example, particular bits of an address or port field may be wildcarded out (such as the low-order bits of an IPv6address). As can be seen, as used herein, therefore, the "matching" of an entry to particular header information does not necessarily require complete equality. It is sufficient that it satisfies all conditions specified for a match.

All invalid entries in the table are written with all zeros. Obsolete entries are removed ("tombstoned"), at least in the first instance, by marking them with all zeros as well.

Although all four entry types co-exist in the same filter table, separate searches are performed through the table for each type. If the incoming data packet is a UDP packet, then a search is performed first for a matching UDP_full entry, and if that fails, then for a matching UDP_wildcard entry. If the incoming data packet is a TCP packet, then a search is performed first for a matching TCP_full entry, and if that fails, then for a matching TCP_wildcard entry. All four kinds of searches are hashed searches, described in detail below. It will be seen that these searches will proceed through only a limited number of iterations before aborting. In one embodiment, the search limits for all four types of entries are the same, but in the present embodiment they can be different and can be adjusted dynamically.

Accordingly, in step 2114, the kernel driver initialization routine programs into the NIC 1116 the initial search limits for each of the four types of filter table entries. In step 2116, the driver routine returns to the kernel.

Figure 22:
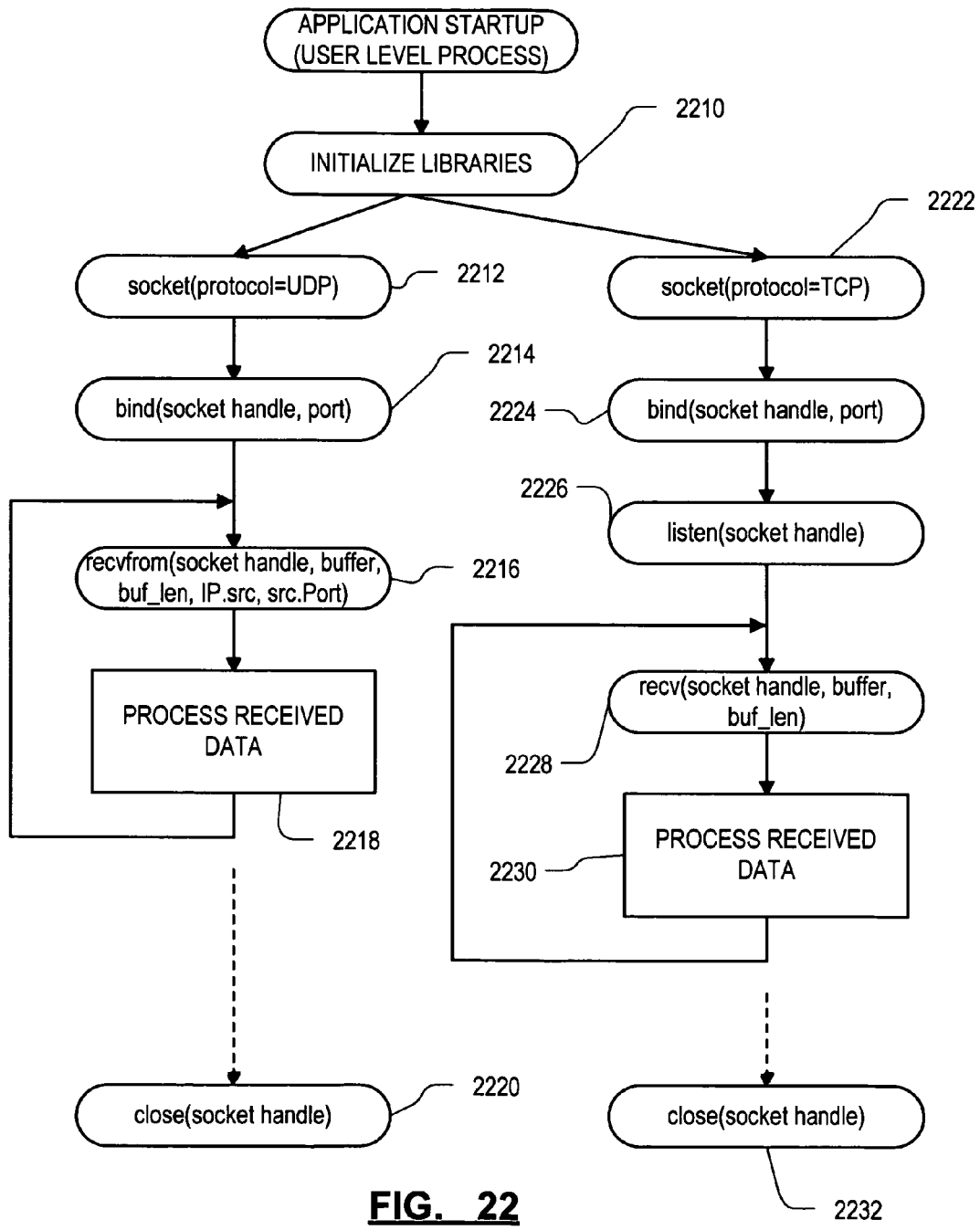
FIG. 22 is an example broad outline of steps that an application process might follow in the system of FIG. 11 for the reception of IP packets from the network.

FIG. 22 is an example broad outline of steps that an application process might follow in the system of FIG. 11 for the reception of unicast IP packets from the network 1112. The outline of steps that might be performed for the reception of multicast packets has already been described with respect to FIG. 5. This flowchart covers only the TCP and UDP transport level protocols; other embodiments can support other protocols, including but not limited to SCTP, RTP, ICMP and IGMP.

In a step 2210, when the application first starts up, its libraries are initialized. This includes the user level transport library 1224, which is initialized into the application's virtual address space.

Step 2212 begins an example sequence of steps in which the application process uses a UDP transport protocol. In step 2212 the application makes a call to the socket( ) routine of the user level transport library 1224, specifying that it would like a UDP socket. In step 2214, the application process calls the bind( ) routine of the user level transport library 1224 in order to bind the socket to a port. In step 2216, the application process makes a call to the recvfrom( ) routine of the user level transport library 1224, specifying the socket handle, the receive buffer, the buffer length, and the source IP address and port from which an incoming packet is expected. As described below, the recvfrom( ) routine of the User Level Transport Library, among other things, writes an appropriate UDP_full-type tuple into the receive filter table on the NIC 1116 and in the host 1114. If the application wishes to receive packets from any IP address and Port, these latter two fields may contain zeros. In this case the recvfrom( ) routine of the User Level Transport Library will write an appropriate UDP_wildcard-type tuple into the receive filter table on the NIC 1116 and in the host 1114. Note that in the unicast case, recvfrom( ), listen( ) and connect( ) are typically the first calls made by an application process that request the establishment of a filter table entry. In the multicast case, the first such call is generally a setSockOpt( ) call with the add_membership option.

After the recvfrom( ) call, the application blocks until a packet satisfying the specified criteria comes up from the NIC 1116 or from the kernel driver 1225. At that time, in step 2218, the application processes the received data and returns, in this example, to step 2216 to await the next incoming data packet.

Steps 2216 and 2218 are repeated many times, most likely interspersed with many other functions performed by the application process. When the application has finished with the socket that it had created in step 2212, then in step 2220, the application makes a call to the close( ) routine of the user level transport library 1224 in order to close the socket.

Alternatively to the UDP sequence beginning with step 2212, step 2222 begins an example sequence of steps in which the application process uses a TCP transport protocol. In step 2222, instead of calling the socket routine of the user level transport library 1224 to specify the UDP protocol, it calls the socket routine to specify the TCP protocol. In step 2224 the application process calls the bind( ) routine similarly to step 2214, in order to bind the socket to a port. In step 2226, since the transport protocol is now TCP, the application process calls the listen( ) routine of the user level transport library 1224, in order to listen for an incoming TCP connection request. Alternatively in step 2226 the application process may call the accept( ) routine of the user level transport library 1224. Both the listen( ) and accept( ) routines invoke the kernel to write into the receive filter table on the NIC 1116 and in the host 1114 a new IP tuple of type TCP_wildcard, so that any incoming TCP connection request (SYN) having the appropriate destination IP address and port number in its header, will be sent up to the present application process for handling.

In step 2230 the application process makes a call to the recv( ) function of the user level transport library 1224, specifying a socket handle, the buffer into which data should be delivered, and the buffer length. At this point the application blocks until a packet satisfying the specified criteria comes up from the NIC 1116 or from the kernel driver 1225. At that time, in step 2230, new incoming data arrives in the buffer and the application processes it. The application then may return to the recv( ) step 2228 to await the next incoming data packet. Again, many other steps may take place in between those illustrated in the flow chart. In step 2232, the application terminates, or the connection may be terminated, at which time the application makes a call to the close( ) routine of the user level transport library 1224 in order to close the socket.

Note that for TCP connections initiated by the present application process, instead of calling the listen( ) routine in step 2226, typically the application will make a call to the connect( ) routine of the User Level Transport Library, specifying the socket handle and the destination IP address and port number. The connect( ) routine of the User Level Transport Library will, among other things, invoke the kernel driver 1225 to write into the receive filter table on the NIC 1116 and the host 1114 a new IP tuple of type TCP_full, so that only those incoming TCP packets having four matching endpoint data fields will be sent up into the present application process.

Figure 23:
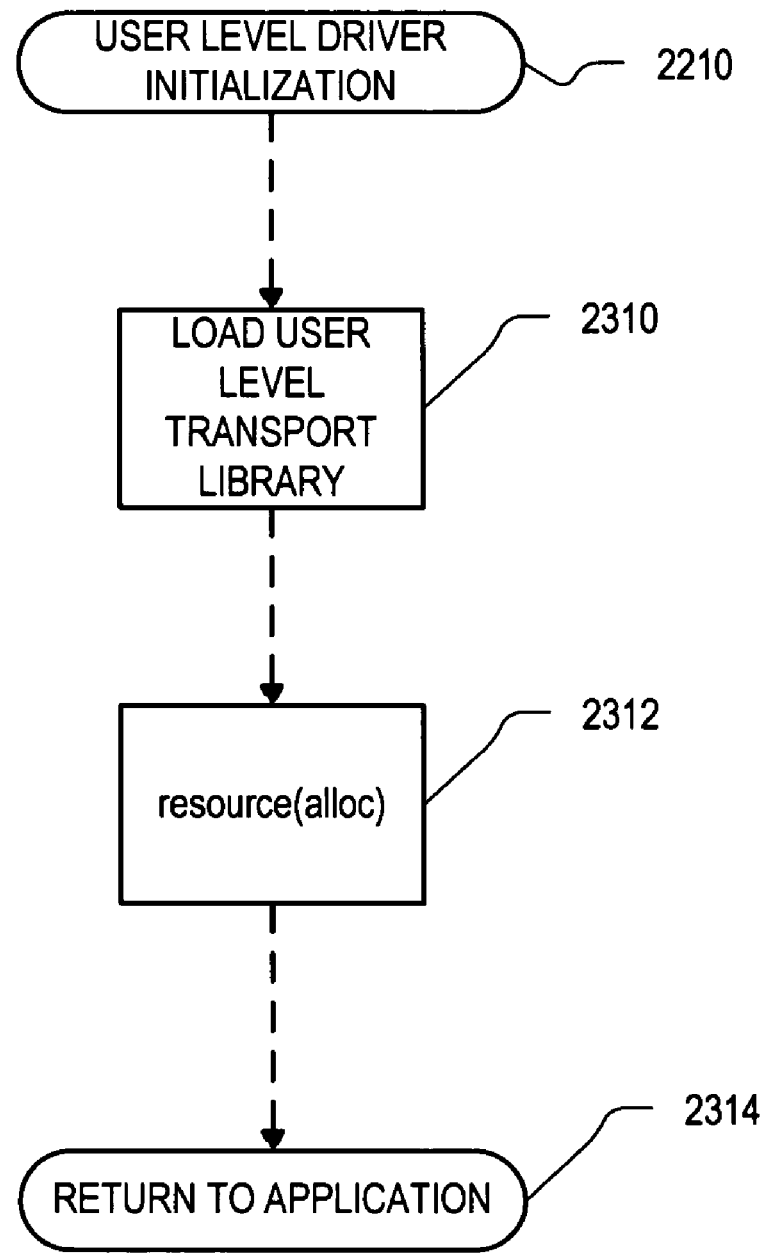
FIG. 23 is a flowchart detail of steps that might be performed during the library initialization step of FIG. 22.

FIG. 23 is a flowchart detail of steps that might be performed during the library initialization step 2210 of FIG. 22. The same steps might be performed during the library initialization step 510 of FIG. 5. In step 2310, the user level transport library 1224 is loaded into the application's virtual address space. In a conventional system, the transport library loaded in step 2310 might be a very thin layer (or incorporated within another general purpose library such as glibc or WinSock), which does little more than make calls to the kernel driver and return any results to the application. In the system of FIG. 11, however, the transport library loaded in step 2310 is more sophisticated in that it includes the user level routines described herein.

In step 2312, as part of the initialization of the user level transport library, a resource allocation routine in the kernel driver 1225 is invoked. The kernel level routine is required for allocating resources in the network interface card and the host memory subsystem 1122, since these resources are outside the virtual address space of the application, or involve direct hardware accesses that advisedly are restricted to kernel processes. After resource allocation, the user level driver initialization routine 2210 may perform a number of other steps before it returns to the application in step 2314.

Figure 24:
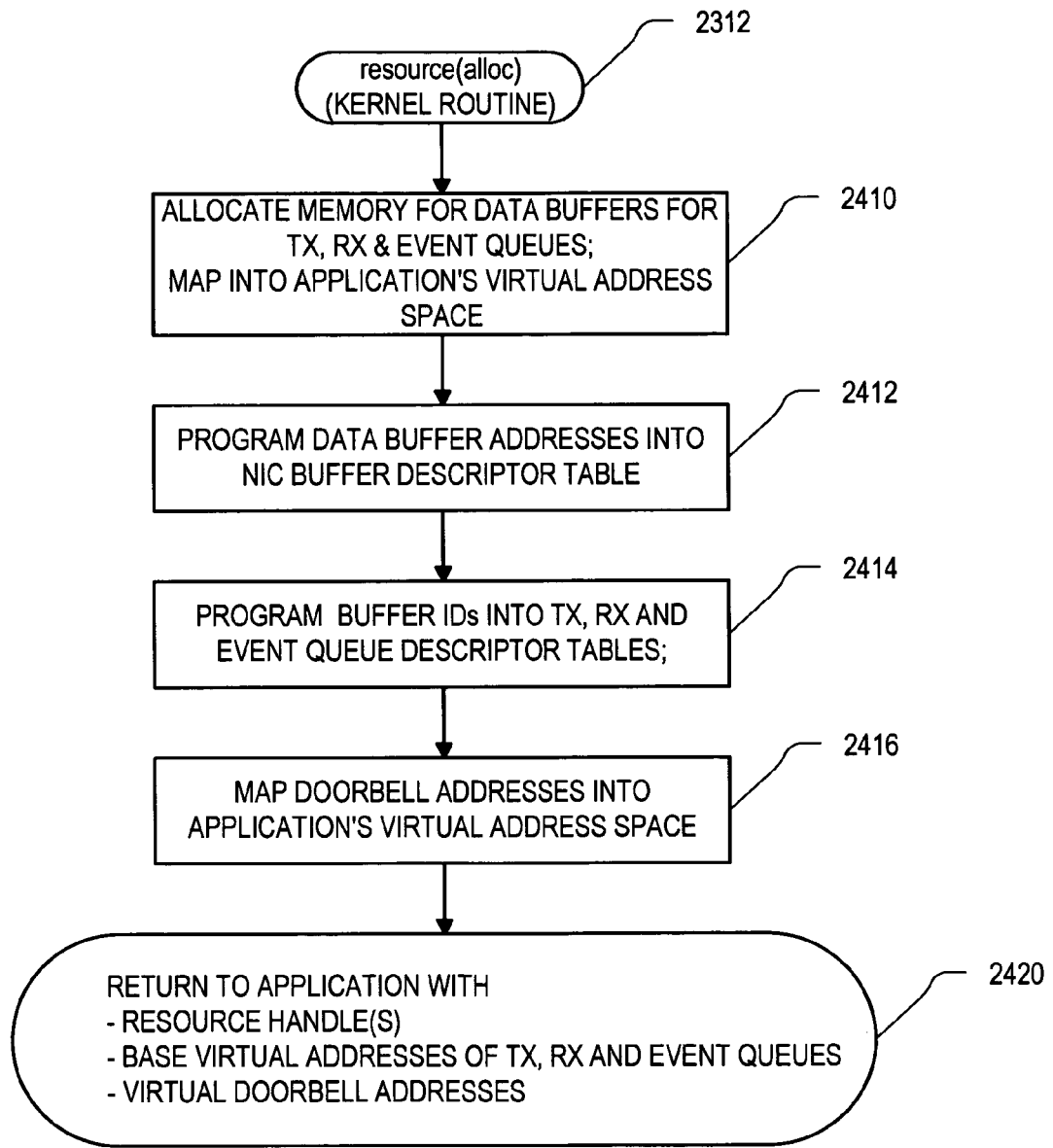
FIG. 24 is a flowchart illustrating significant steps performed by the kernel resource allocation routine in FIG. 23.

FIG. 24 is a flowchart illustrating significant steps performed by the kernel resource allocation routine 2312. In step 2410, the kernel begins by allocating memory for the generalized buffers that will be used to hold the transmit, receive and event queues. It then maps the buffers into the application's virtual address space so that the application can read and write to them directly. (See previous description with respect to FIG. 12). In step 2412, the kernel routine installs descriptors for these buffers in the buffer descriptor table 1510.

In step 2414, the kernel routine allocates a minimum set of the buffers for each of the transmit, receive and event queues requested, and programs their buffer IDs into the transmit, receive and event queue descriptor tables 1540, 1541 and 1542. In step 2416, the kernel routine determines the "doorbell" address in the NIC 1116 for each of the transmit and receive queues, and maps them as well into the application's virtual address space. The doorbell address is the address to which the user level transport library will write a value, in order to notify the NIC either that a transmit buffer is ready or that a receive buffer can be released. For transmit queues, the doorbell address is the address of the device centric transmit queue read pointer in the transmit queue descriptor table 1540 entry for the particular transmit queue. For receive queues, the doorbell address is the address of the device centric receive queue write pointer in the receive queue descriptor table 1541 entry for the particular receive queue.

In step 2420, the resource allocation routine returns to the application with handles for the resources allocated, with the base virtual addresses of the transmit, receive and event queues, and virtual memory addresses corresponding to the doorbells allocated in the transmit and receive queue descriptor tables 1541 and 1540.

Figure 25:
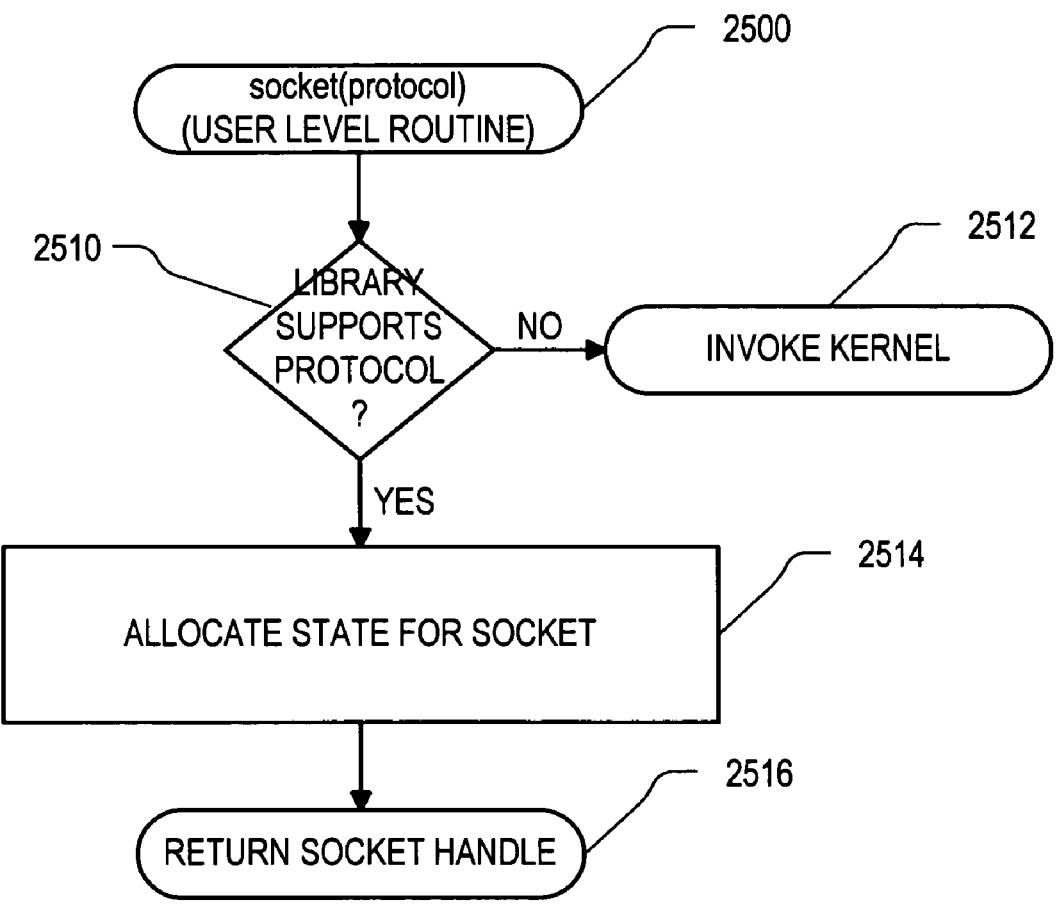
FIG. 25 is a flowchart of the user level routine in the transport library of FIG. 12 for establishing a socket.

FIG. 25 is a flowchart of the user level routine in the transport library 1224 for establishing a socket. The socket routine is called in both steps 2212 and 2222 of FIG. 22, and in step 512 of FIG. 5. In step 2510, the routine first determines whether the user level transport library 1224 contains the software code necessary to support the specified protocol. If not, then in step 2512, makes a system call to pass the request on to the kernel to handle. If it does support the specified protocol, then in step 2514 it allocates its internal state for the new socket. In step 2516 the routine returns to the application program with a handle for the new socket.

Figure 26:
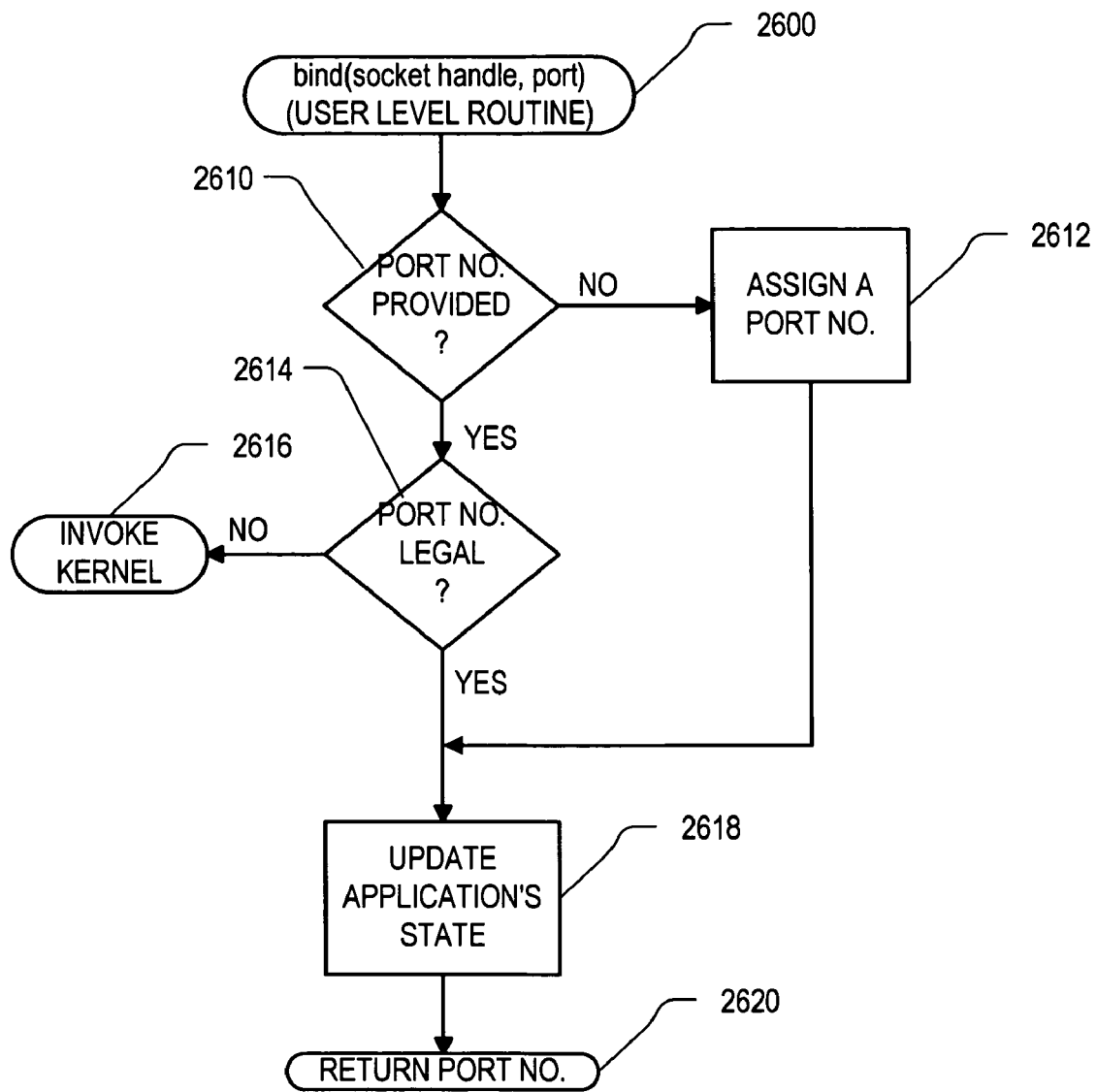
FIG. 26 is a flowchart of the user level routine transport library of FIG. 12 for binding a port number to a socket.

FIG. 26 is a flowchart of the user level routine transport library 1224 for binding a port number to a socket. The bind routine is called in both steps 2214 and 2224 of FIG. 22, and in step 514 of FIG. 5. In step 2610, the routine first determines whether the caller provided a port number. If not, then in step 2612, a port number is assigned. If the caller did specify a port number, then in step 2614, the routine determines whether the port number is legal for the current user process. If not, then in step 2616, the routine makes a call to the kernel bind( ) routine to pass the request on to the kernel to handle. If the specified port number is legal, or if a port number was assigned by the routine in step 2612, then in step 2618 the routine updates the application's state internally, to bind the port number with the specified socket. The routine returns to the caller in step 2620.

Figure 5:
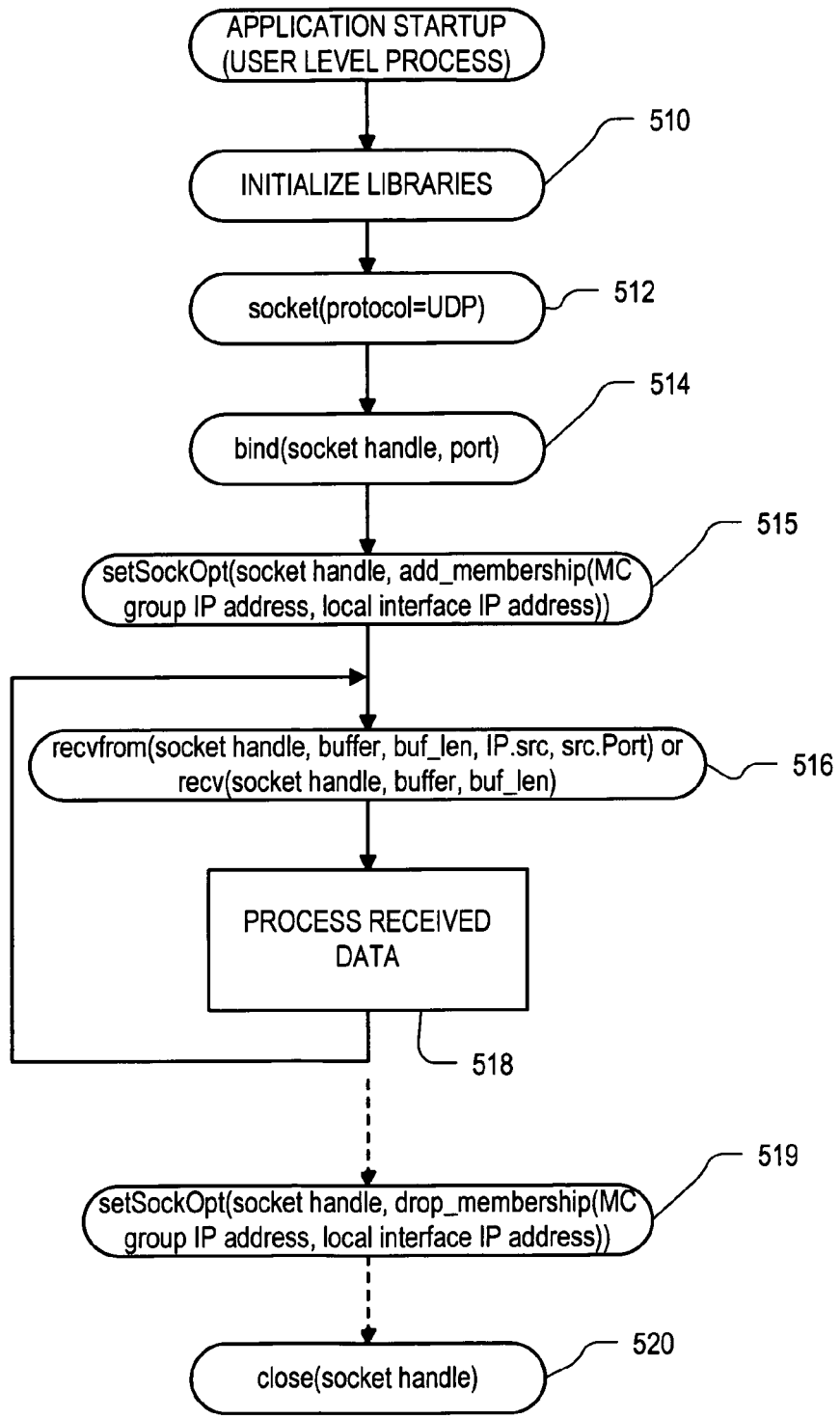
FIG. 5 is an example broad outline of steps that an application process might follow for the reception of multicast IP packets of a particular multicast group.
Figure 27:
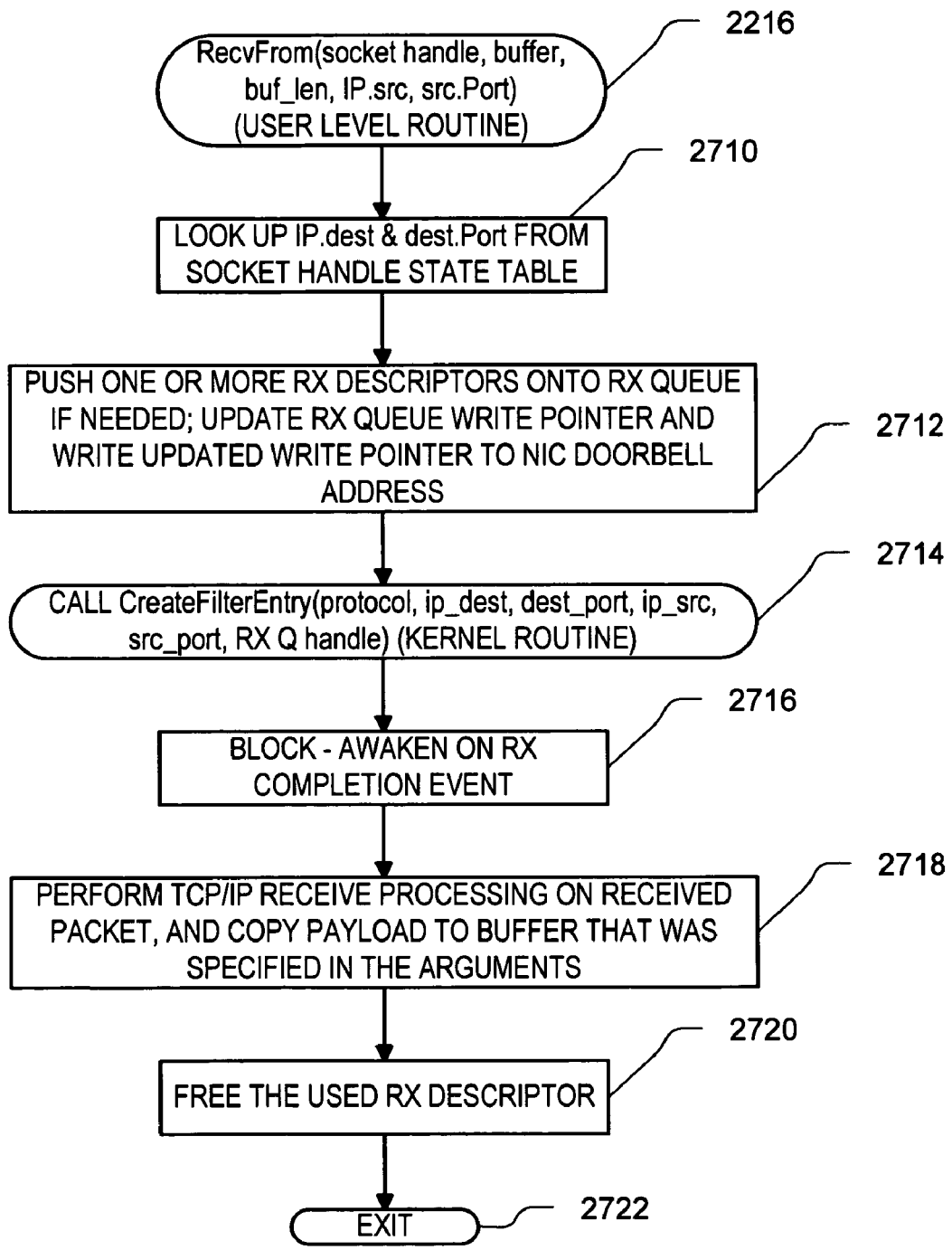
FIG. 27 is a flowchart of pertinent steps of the user level recvFrom( ) routine called in FIG. 22.

FIG. 27 is a flowchart of pertinent steps of the user level recvFrom( ) routine called in step 2216 (FIG. 22), and in step 516 (FIG. 5). This routine is called with the socket handle, the address of a buffer that the application wishes to use, the length of the buffer, and optionally the source IP address and port from which the UDP packet is expected. The source IP address and port may be left as zeros if the application does not know them. The application does not necessarily know the destination IP address and port to which the packet will be directed, especially in the unicast case, but in step 2710, the recvFrom( ) routine obtains this information from its own records of the IP address and port associated with the specified socket. In the multicast case, the destination IP address will of course be a multicast group IP address. In step 2712, the recvFrom( ) routine pushes one or more RX descriptors onto the RX queue if needed. It then updates the RX queue write pointer and writes the updated write pointer to the NIC doorbell address previously assigned. (See step 1611, FIG. 16). In step 2714 the routine invokes the kernel routine to create a new filter entry, specifying the UDP protocol, source and destination IP addresses and port numbers, and the handle previously assigned for the desired destination receive queue. In step 2716, the routine blocks, and awakens on the receipt of a receive completion event as described with respect to step 1910 (FIG. 19). In step 2718 (corresponding to step 1948 in FIG. 19) the routine then performs UDP receive processing on received packet, and copies the payload to the buffer that the application had specified in the arguments in step 2216. In another embodiment the payload copy can be avoided, for example by delivering headers and payloads separately, and delivering data in-order with respect to the sequence numbers in the headers. In step 2720 the routine frees the receive buffer corresponding to the RX descriptor just used, and in step 2722 the routine exits and returns to the application.

Note that the user level recv( ) routine 2230 (FIG. 22) is in pertinent part the same as the recvFrom( ) routine of FIG. 27, except that since the filter has already been applied, steps 2710 and 2714 are omitted.

Figure 28:
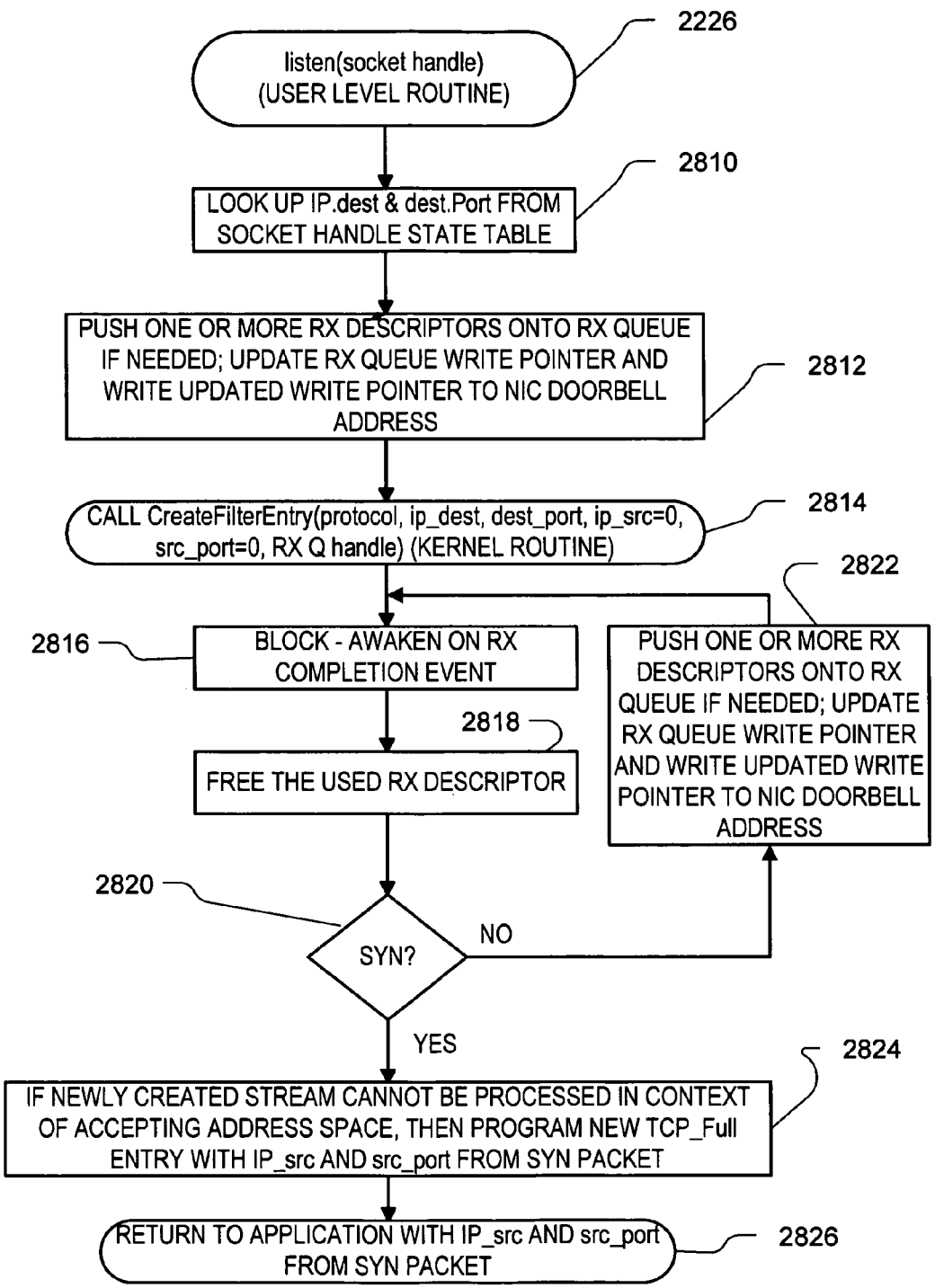
FIG. 28 is a flowchart of pertinent steps of the user level listen( ) routine called in FIG. 22.

FIG. 28 is a flowchart of pertinent steps of the user level listen( ) routine called in step 2226 (FIG. 22). This routine is called with only the socket handle, since the source IP address and port from which a SYN packet might arrive are not yet known. In step 2810, the listen( ) routine obtains the destination IP address and port from the user level driver's records associated with the specified socket handle. In step 2812, the routine pushes one or more RX descriptors onto the RX queue if needed, anticipating the receipt of a TCP connection request packet (SYN packet). It then updates the RX queue write pointer and writes the updated write pointer to the NIC doorbell address previously assigned. In step 2814, the routine invokes the kernel routine to create a new filter entry, specifying the TCP protocol, the destination IP address and port number, and the handle previously assigned for the desired destination receive queue. The routine sets the ip_src and src_port arguments to 0. In step 2816, the routine blocks, and awakens on the receipt of a receive completion event. When one is received, in step 2818 the routine frees the receive buffer corresponding to the RX descriptor just used, and in step 2820 it is determined whether the received packet is in fact a SYN. If not, then the packet is dropped and in step 2822 another RX descriptor is pushed onto the RX queue if needed (similarly to step 2812). The routine then loops back again to block in anticipation of the next RX completion event (step 2816). If the received packet was in fact a SYN, and the newly created stream cannot be processed in the context of the accepting application address space, then in step 2824 the routine programs a new TCP_full entry with the IP source address and port from the SYN packet. In step 2826 the routine exits and returns to the application with the source IP address and port from the SYN packet, the new TCP connection having been established.

The user level accept( ) routine is in pertinent part the same as the listen( ) routine of FIG. 28, except that the routine will more likely program the new TCP_full entry into the filter table because the application is more likely to follow up with a fork( ) into a new address space.

Note that the User Level Transport Library routines that invoke the kernel to set up a new filter, also maintain a local copy of the filters that they already had set up. In this way they can avoid the context switch to the kernel to duplicate work that has already been performed. This local copy also avoids duplication in the multicast case, since in that case, by the time of a recv( ) or recvFrom( ) call, the filter usually has already been established in response to a setSockOpt( ) add_membership call, as in step 515 (FIG. 5).

Figure 29:
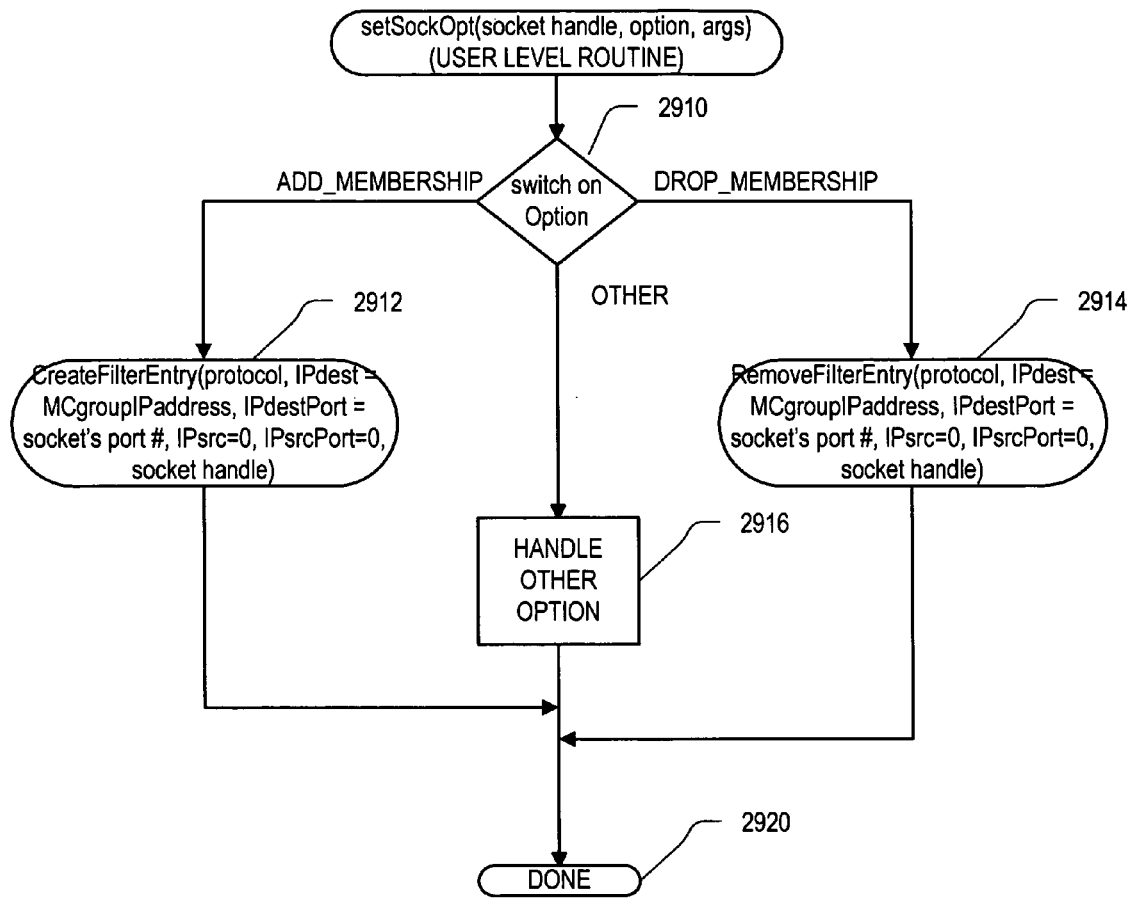
FIG. 29 is a flowchart of pertinent steps of the user level setSockOpt( ) routine, called in FIG. 5.

FIG. 29 is a flowchart of pertinent steps of the user level setSockOpt( ) routine, called at steps 515 and 519 (FIG. 5). In step 2910, the routine switches on the option specified as an argument to the setSockOpt( ) call from the application. If the option is ADD_MEMBERSHIP, then in step 2912 the routine makes a system call to the CreateFilterEntry( ) kernel routine to cause the kernel to add a filter for delivering incoming multicast data packets of the group identified by the specified multicast group IP address and port number, to the socket specified by the socket handle. The kernel routine will also be responsible for sending appropriate IGMP messages out onto the network. If the option is DROP_MEMBERSHIP, then in step 2914 the routine makes a system call to the RemoveFilterEntry( ) kernel routine to cause the kernel to remove any filter previously established for delivering incoming multicast data packets of the group identified by the specified multicast group IP address, to the socket specified by the socket handle. Again, the kernel routine will also be responsible for sending any appropriate IGMP messages out onto the network. The actual filter table management is performed by the kernel rather than by the user level setSockOpt( ) routine because maintenance of multicast group membership lists on the host involves knowledge of group membership across the entire host. The user level setSockOpt( ) routine, at least in the present embodiment, lacks any knowledge of membership by other user level processes in any particular multicast group.

If the option is anything other than ADD_MEMBERSHIP or DROP_MEMBERSHIP, then the routine proceeds to handle that option as appropriate in step 2916. Thereafter, the routine terminates and returns to the calling application process (step 2920).

Before describing the CreateFilterEntry( ) and RemoveFilterEntry( ) kernel routines, it will be helpful to describe generally several different approaches for supporting multicast reception in the environment of user level receive queues. In a first approach, whereas incoming unicast packets of supported protocols are delivered by the NIC directly to the user level endpoint, incoming multicast packets are not. When an application process makes a call that involves the establishment of a unicast filter, the kernel CreateFilterEntry( ) routine establishes the filter either on the NIC or in an internal software redirect table, as appropriate. But when an application process makes a call that involves the establishment of a multicast filter, such as a request to join a multicast group, the kernel CreateFilterEntry( ) routine recognizes this and creates the filter in its own multicast group membership tables.

In a second approach, the NIC maintains a receive filter table that supports direct delivery of incoming data packets to one user level endpoint. Unicast filters are maintained in the NIC's filter table, as are multicast filters for multicast groups having only one endpoint member running in the host. The NIC need not know whether a particular filter is for unicast or multicast reception. Instead, in response to a user level request to join a multicast group, the kernel or another process running in the host programs the multicast filter into the NIC only if the NIC does not already have a filter for that multicast group. Thus if a request to join a multicast group is the first such request for the specified group, then the kernel programs a filter into the NIC receive filter table just as it programs a unicast filter. The only difference is that the destination IP address specified in the filter is a multicast group IP address rather than a unicast destination IP address. If the request to join the multicast group is the second or subsequent such request for the same multicast group, then the filter is established in the kernel multicast group membership table instead.

In a third approach, basically a generalization of the second, a NIC has limited capacity to maintain multicast group membership information. For example the NIC might support multicast group membership of only some predetermined number N endpoints, or it might support multicast group membership as long as the total number of endpoint memberships within the host system, including all multicast groups, does not exceed some maximum number M. In these approaches, when an application process makes a system call that involves the establishment of a filter for the delivery of incoming multicast data packets, then the kernel first determines whether the NIC has sufficient capacity to add the requested filter. If so, then the kernel establishes the requested filter in hardware on the NIC. Future incoming data packets matching the filter criteria will then be passed from the NIC directly to the user level driver, potentially as well as being passed from the NIC directly to user level drivers of other processes as well, but without requiring a context switch to the kernel. But if the NIC does not have sufficient capacity to add the requested filter, then the kernel instead establishes the filter in its own tables, and in a typical embodiment the kernel also moves existing filters from the NIC to the kernel tables as well. The NIC then delivers matching packets to the kernel for forwarding to the appropriate user level process(es).

It should be noted that an "endpoint" and a "user level process" are not necessarily the same. One user level process may own more than one endpoint. In addition, in the present embodiment each endpoint is implemented with a single corresponding receive queue for receipt of packets destined for the corresponding endpoint. Therefore, identification of a receive queue also identifies a single endpoint in the present embodiment, and also identifies a single process running in the host system. Similarly, identification of an endpoint also identifies a single receive queue in the present embodiment, and also a single process running in the host system. But identification of a process does not by itself also identify an endpoint and a receive queue, unless the process owns exactly one endpoint and receive queue. If the process owns more than one endpoint, then identification of the process is by itself insufficient to identify a single endpoint and receive queue. Given this terminology, requests for a filter, and requests to join a multicast group, are made by processes, not by endpoints; but they specify (by a socket handle in the present embodiment) to which endpoint and receive queue the incoming packets should be delivered. Incoming packets are then delivered to the indicated endpoint, by way of the corresponding receive queue, and thereby to the process that owns the indicated endpoint. In most embodiments discussed herein, a process has only one endpoint and therefore the terms process, endpoint and receive queue are often used interchangeably. But in an embodiment in which a process owns more than one endpoint, when it is stated herein that a packet is delivered to a particular process, this phraseology does not require that the delivery be made through any particular one of the process's endpoints.

Figure 6:
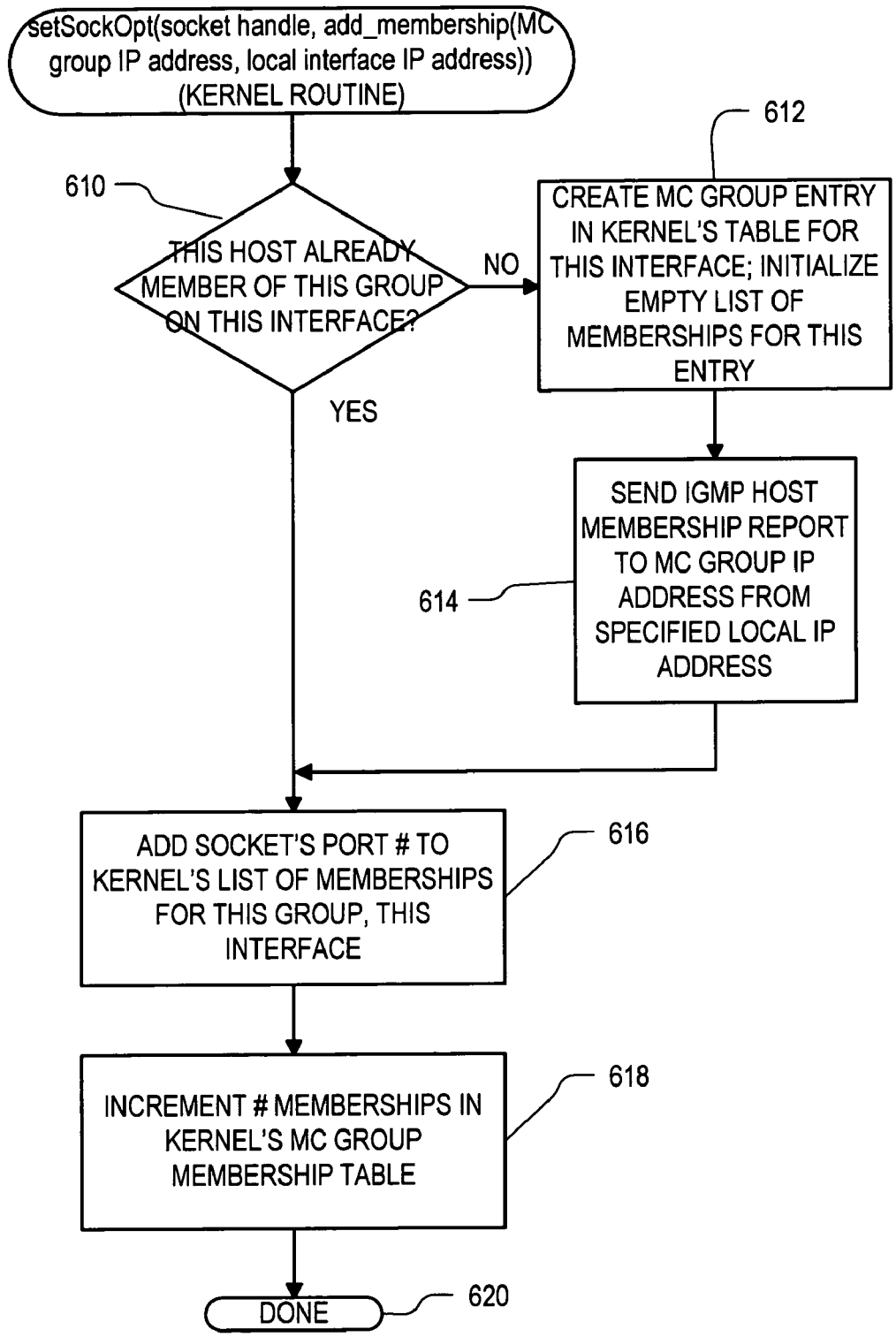
FIG. 6 is an example outline of steps that the kernel might take in the environment of FIG. 3, in response to a setSockOpt add_membership system call.
Figure 30:
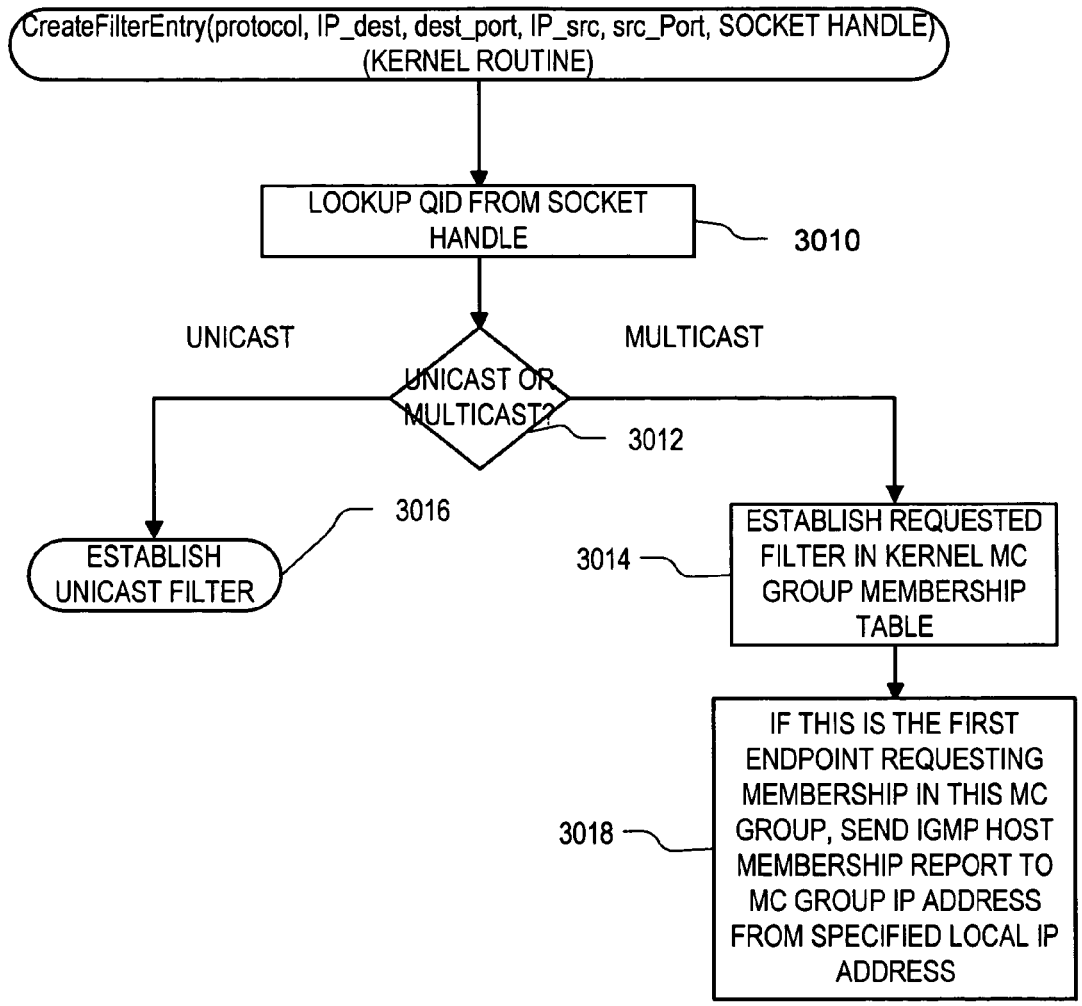
FIGS. 30, 36 and 42 are flowcharts for implementing various embodiments of the kernel's CreateFilterEntry( ) routine.

FIG. 30 is a flowchart of pertinent steps of the kernel's CreateFilterEntry( ) routine, for implementing the first approach. As mentioned, in this first approach the NIC provides no additional hardware support for multicast packet reception. In step 3010, the routine first looks up the queue ID from the socket handle. The queue ID is the index into the receive queue descriptor table 1541 (FIG. 15). In step 3012, the routine determines whether the requested filter is for unicast or multicast reception. As mentioned, this is easily determined from the specified destination IP address, since an address having the pattern '1110' in its four high-order bits is always a multicast group IP address. If the request is for a multicast filter, then in step 3014 the routine establishes the requested filter in the kernel's internal multicast group membership table. In an embodiment, the table structure can be the same as described above with respect to FIG. 4, and the process of establishing the filter can be the same as described above with respect to FIG. 6. In step 3018, if this is the first request for delivery of packets of this multicast group to a user level endpoint, then the routine sends an appropriate IGMP host membership report to multicast group IP address from the specified local IP address. If the request is for a unicast filter, then the kernel establishes this filter in the NIC if possible, or in the kernel's own software redirect filter table if not (step 3016).

Figure 31:
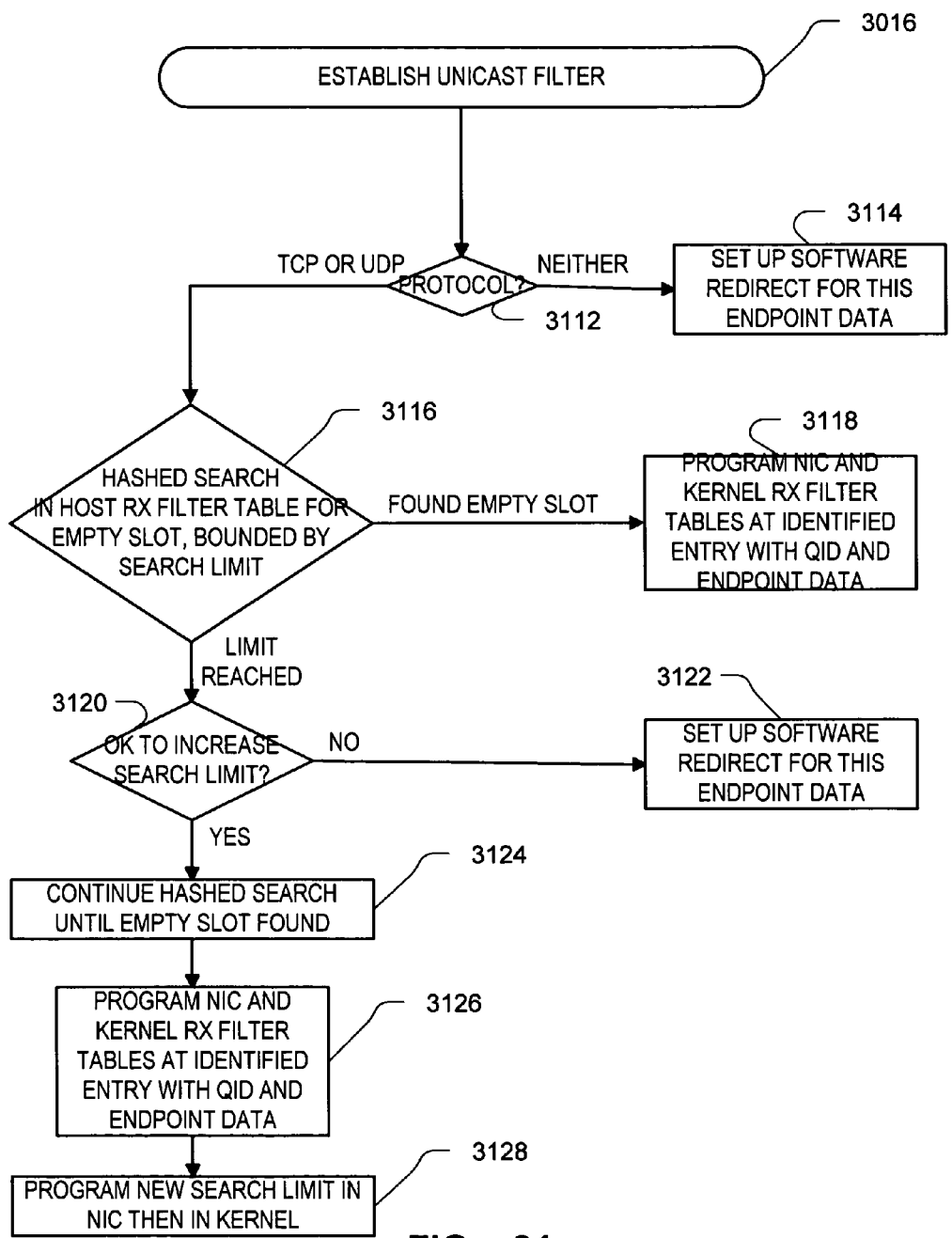
FIG. 31 is a flowchart of pertinent steps of the kernel routinely for creating a new filter table entry.

FIG. 31 is a flowchart detail of step 3016 (FIG. 30) for creating a new unicast filter table entry. When called, the routine of FIG. 31 is provided with the protocol name or number, the source and destination IP address and ports for matching with incoming data packets, and the queue ID of the receive queue into which matching packets should be directed. In step 3112, the routine determines whether the protocol for which the filter entry is to be placed, is either a TCP or a UDP protocol. If it is neither, then in step 3114, the routine establishes the filter in the kernel's software redirect filter table rather than in the NIC because the filter table in the NIC in the present embodiment does not support any protocols other than TCP and UDP. Incoming data packets using a different protocol will automatically default to a kernel queue for handling or delivery to the proper user level queue.

If the protocol is TCP or UDP, then in step 3116, the routine performs a hashed search in the host receive filter table for an empty slot. For UDP filters, a search of the UDP_wildcard entries is performed if the ip_src and src_port arguments are null. If either the ip_src or src_port argument contains a value, then a search of the UDP_full entries is performed. Alternatively, the API can include a separate parameter to indicate whether a full or wildcard search should be performed. For TCP filters, a search of the TCP_wildcard entries is performed if the ip_src and src_port arguments are null. If either the ip_src or src_port argument contains a value, then a search of the TCP_full entries is performed. In each case, the search is bounded by the appropriate search limit for the TCP_full, TCP_wildcard, UDP_full or UDP_wildcard protocol as programmed in step 2114 (FIG. 21). The search algorithm itself is unimportant for an understanding of the present invention, except to note that in the present embodiment it is the same as that used by the NIC against the NIC copy of the filter table upon receipt of a unicast packet from the network. Another embodiment could use another kind of search algorithm, such as a linear search or a CAM.

In step 3118, if an empty slot was found before the appropriate search limit was reached, then the routine programs both the NIC and the host receive filter tables at the identified entry with the queue ID and the endpoint data as provided in step 3016.

If the search limit was reached before an empty slot was found, then the routine makes a decision whether to increase the search limit for the particular kind of entry (step 3120). If not, then in step 3122 the routine simply sets up a software redirect for this set of endpoint data. The redirect is a data structure that the kernel driver consults on receipt of every packet to see whether the packet should be delivered to the kernel stack or a user transport managed endpoint. In one embodiment it is a separate table of filter entries, structured similarly to the host receive filter table.

If the routine does decide to increase the search limit, then in step 3124, the routine simply continues the hashed search of step 3116 until an empty slot is found. When one is found, then in step 3126, the routine programs the NIC and host receive filter tables at the identified entry with the queue ID and endpoint data from step 3100. Then in step 3128, the routine programs the new search limit for the particular type of entry, into the NIC and then in the kernel. It will be appreciated that steps 3120 and 3124 may be reversed in sequence or combined, so that the number of additional hops required to find an available entry can be taken into account in the decision of whether to increase the search limit.

Figure 7:
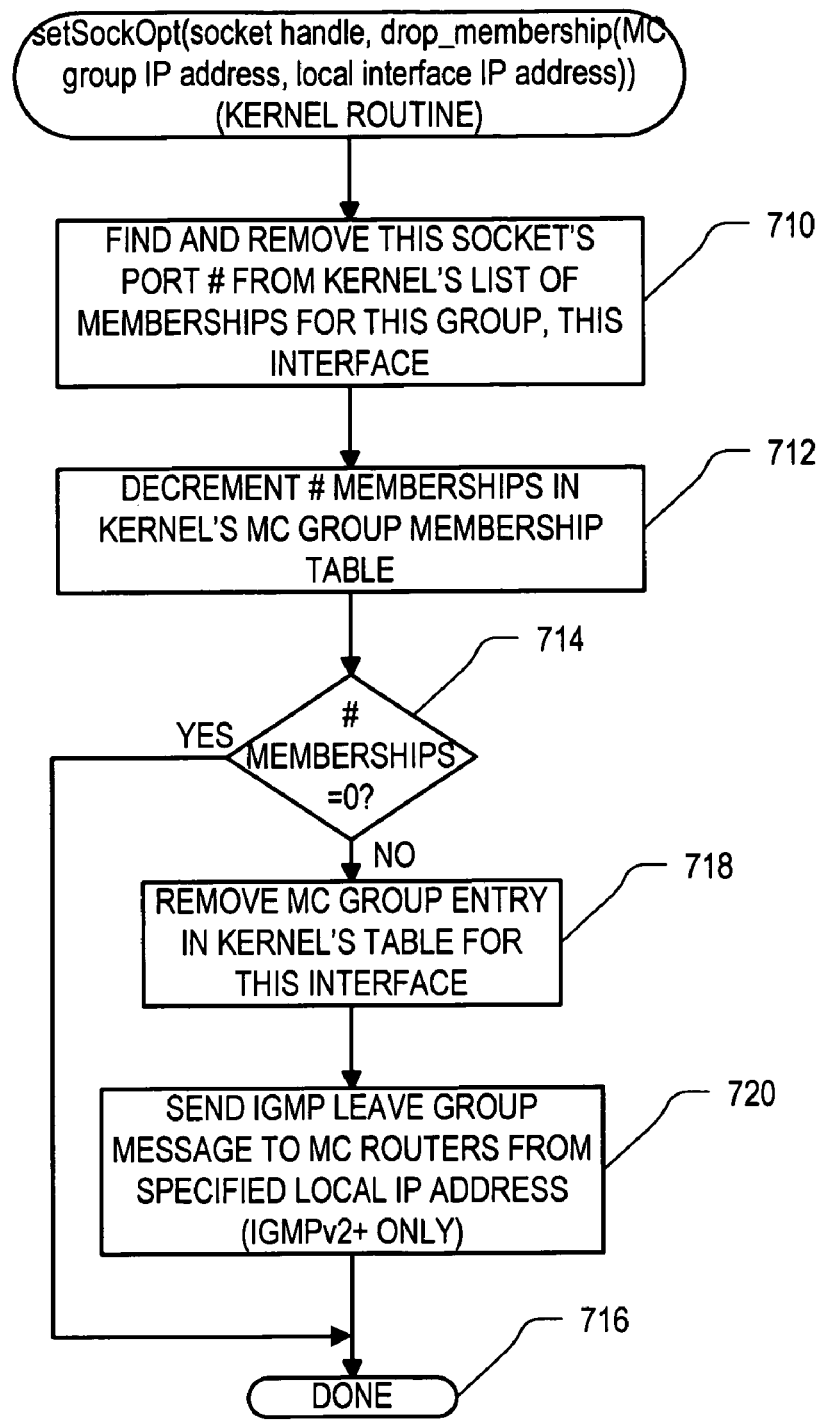
FIG. 7 is an example outline of steps that the kernel might take in the environment of FIG. 3, in response to a setSockOpt drop_membership system call.
Figure 32:
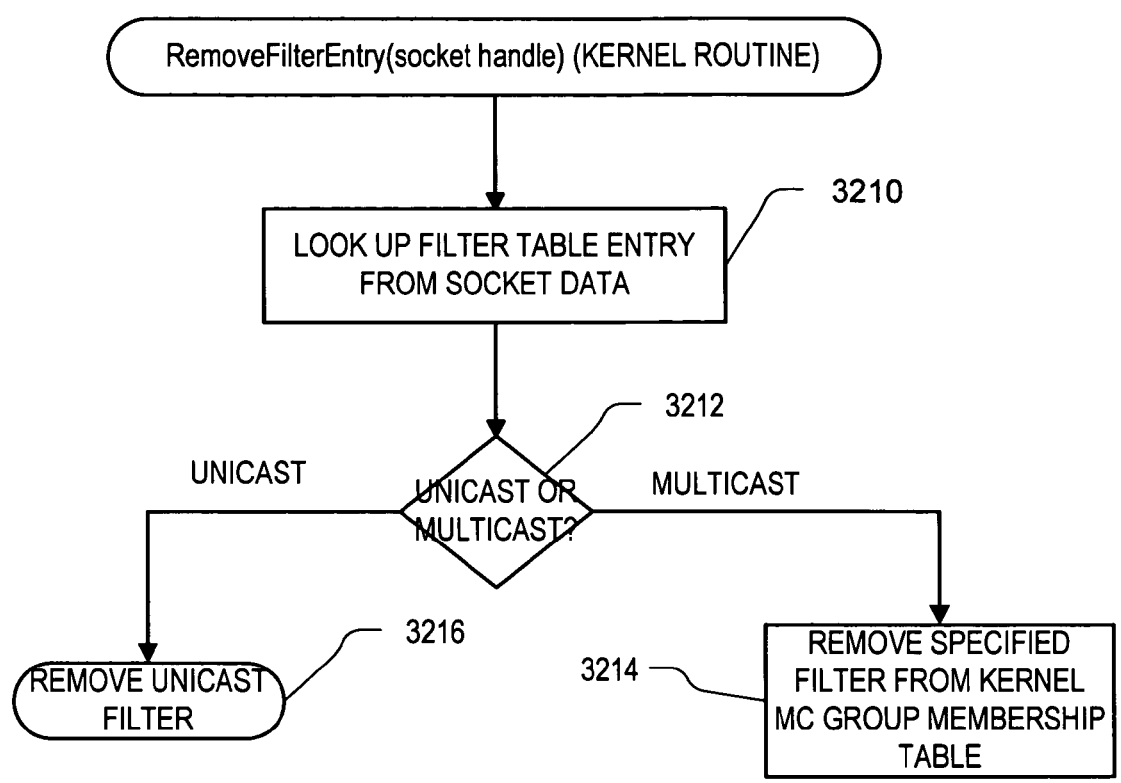
FIGS. 32, 37 and 43 are flowcharts for implementing various embodiments of the kernel's RemoveFilterEntry( ) routine.

FIG. 32 is a flowchart of pertinent steps of the kernel's RemoveFilterEntry( ) routine, for implementing the first approach. In step 3210, the kernel looks up the filter table entry from the data associated with the socket handle specified. In step 3212, the routine determines from the destination IP address of the filter criteria whether the filter to be removed is for unicast or multicast reception. If the filter is a multicast filter, then in step 3214 the routine removes the filter from the kernel's internal multicast group membership table. In an embodiment, the process of removing the filter can be the same as described above with respect to FIG. 7. If the filter is a unicast filter, then the kernel removes this filter from the NIC, if it had been established there, and from the kernel's own software redirect filter table if not (step 3216).

Figure 33:
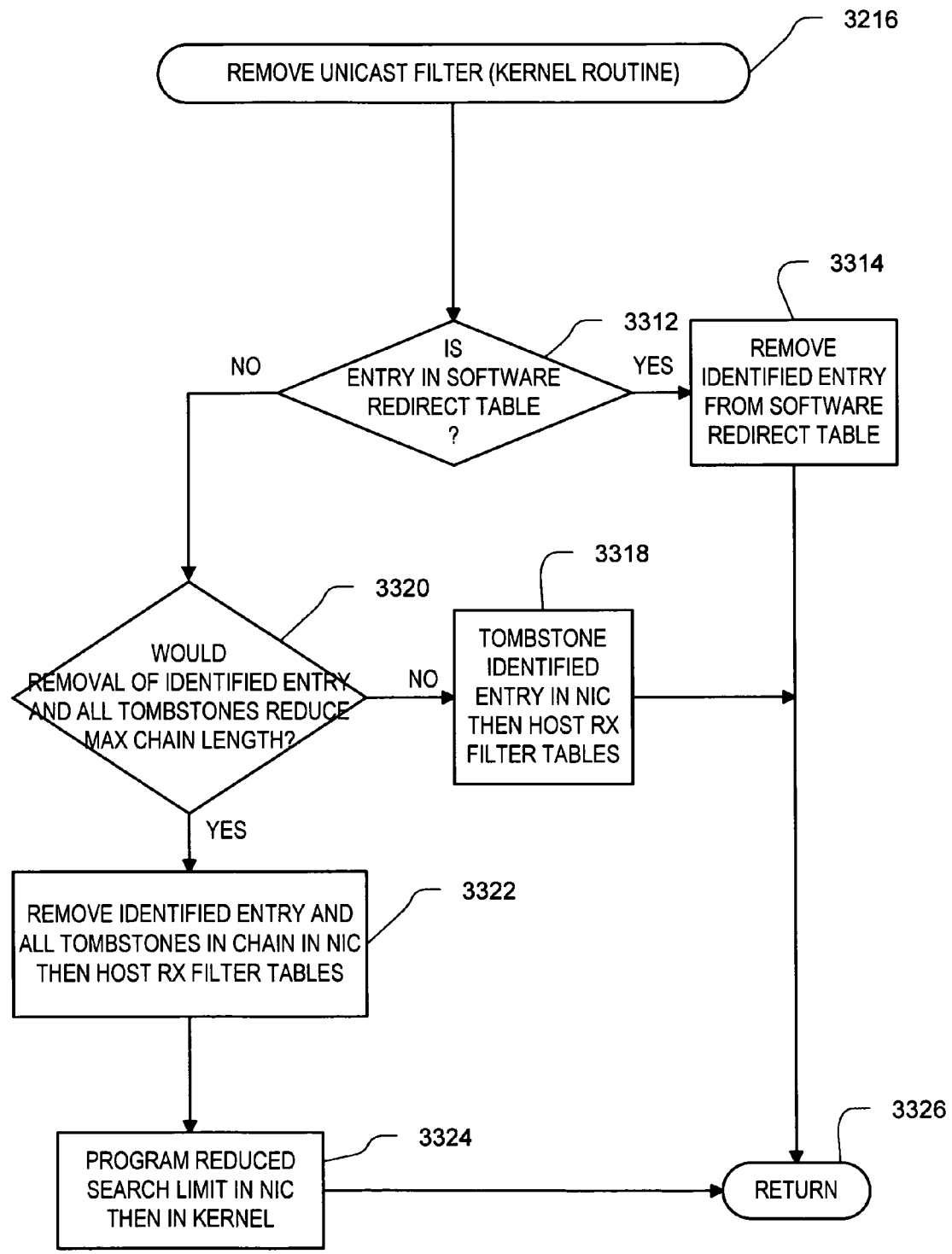
FIG. 33 is a flowchart of pertinent steps of a routine in the user level driver called for removing a filter entry.

FIG. 33 is a flowchart detail of step 3216 (FIG. 32) for removing a unicast filter table entry. In step 3312, the kernel first determines whether the entry is located in the software redirect table or in the host filter table. If it is in the software redirect table, then in step 3314, the routine removes the entry from the software redirect table and returns (step 3326). If the entry is in the host filter table, when the entry is identified in step 3314, then in one embodiment, the routine can simply remove the identified entry in both the NIC receive filter table and the host receive filter table (in that order) (step 3318). Removal involves simply writing a tombstone value into the entry, for example all zeros. However, it would be useful at this time to also perform certain garbage collection functions in order to keep the search chain lengths reasonable. These garbage collection functions can be performed at other times in the same or different embodiments, but the present embodiment conveniently performs them at least whenever a filter entry is to be removed. Accordingly, before the step of tombstoning the identified entry (step 3318), the routine first determines in step 3320 whether removal of the identified entry, and all tombstones previously written in the present chain, would reduce the overall maximum chain length. If not, then only the single entry removal is effected (step 3318). Garbage collection is typically an expensive process, so step 3320 limits the number of times that garbage collection is performed to only those times when a significant performance improvement can be achieved, such as through a reduction in the overall maximum chain length. Hysteresis can be applied here to avoid flapping, and a weight can be applied so that the chain length is reduced more aggressively if it has become longer than the maximum allowed for full line rate performance.

If the maximum chain length would be reduced, then in step 3322, the routine removes the identified entry from the table, as well as all tombstones in the table (or only those in the chain, if the chain is very long compared to others in the table), reprogramming the table to bring up into the previously tombstone the locations, entries and that were previously father down in the search chain. Finally, in step 3324, the routine programs the new (smaller) search limit for the particular kind of entry into the NIC 1116 and then makes it effective in the kernel as well. In an embodiment, the routine may skip step 3324 in the event that the new search limit would be smaller than some predetermined minimum chain length for the particular kind of entry. Many other optimizations will be apparent.

Figure 34:
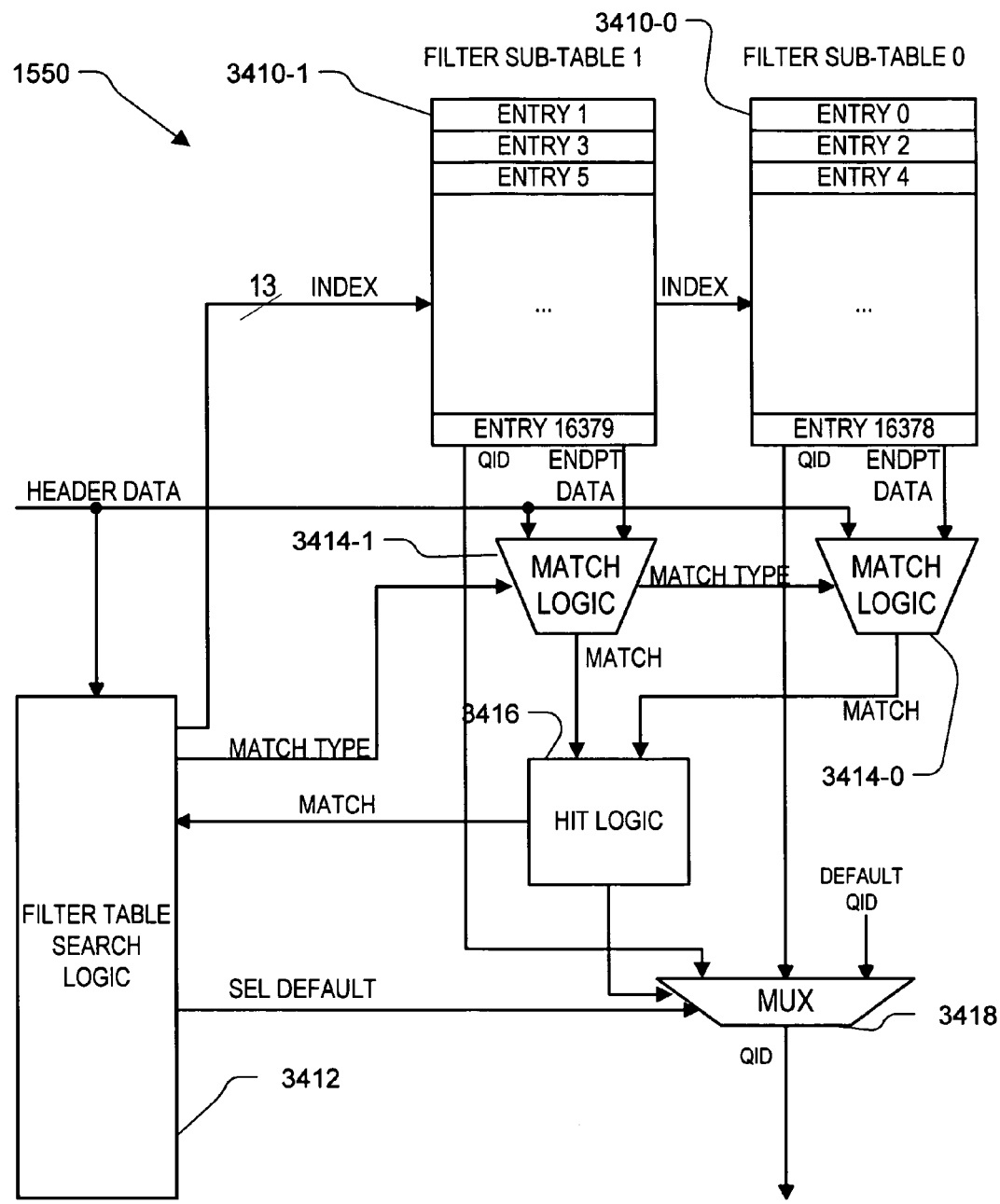
FIG. 34 is a detail of the filter table and logic unit of FIG. 15.

As mentioned, when packets arrive, the filter table and logic unit 1550 (FIG. 15) first determines the queue ID of the receive queue into which the packet should be delivered. FIG. 34 is a detail of the filter table and logic unit 1550 as implemented in the first approach. No particular accommodation is made in the NIC in this approach for multicast reception. The filter table itself is implemented as two sub-tables 3410-0 and 3410-1 (collectively 3410). The software is unaware of this implementation detail, and instead sees only a single table. The hardware in the NIC 1116 decodes the write address from the kernel driver software and places even numbered entries in filter sub-table 3410-0 and odd numbered entries in filter sub-table 3410-1. Thus filter sub-table 3410-0 contains entries 0, 2, 4, 6 and so on, whereas filter sub-table 3410-1 contains entries 1, 3, 5 and so on. The implementation of the filter table as two sub-tables enables parallel entry lookup per cycle to reduce the total lookup time. It will be appreciated that other implementations can use a single sub-table, or more than two sub-tables.

Both of the filter sub-tables 3410-0 and 3410-1 are addressed by a 13-bit index provided by filter table search logic 3412. A 13-bit index can address up to 8192 entries, which for two sub-tables, comes to 16,384 entries numbered 0 through 16,383. Four index values are reserved for the kernel NET driver queues, so only 16,380 entries are represented in the table. The filter table search logic 3412 receives the header data of the incoming data packet and uses it to derive a hash key, then uses the hash key to derive a hash code which is the first 13-bit index to be searched in the filter table 3410. The filter table search logic also calculates subsequent entries to search if the first entry in neither of the two filter sub-tables matches that of the incoming header data, and also forces the selection of a default kernel queue for delivery of the current data packet if the search limit is reached before a match is found. The filter table search logic also determines a match type (TCP_full, TCP_wildcard, UDP_full or UDP_wildcard) in dependence upon the header data and the state of the search algorithm.

The various formats for an entry in the filter table 3410 are set forth in the table above. As shown in FIG. 34, the endpoint data from the selected entry of filter sub-table 3410-0 is provided to one input of match logic 3414-0, and the endpoint data from the selected entry of filter sub-table 3410-1 is provided to the corresponding input of match logic 3414-1. The other input of each of the match logic units 3414-0 and 3414-1 (collectively 3414) receives the header data of the incoming data packet. The match type is provided from the filter table search logic 3412 to both match logic units, each of which then outputs a "match" signal to a hit logic unit 3416. If the match type is TCP_full, then match logic units 3414-0 at 3414-1 will indicate a match only if the incoming packet type is TCP and all four fields of endpoint data match the corresponding fields of the incoming header data. If the match type is TCP_wildcard, then the match logic units 3414 will indicate a match if the incoming packet type is TCP and bits 95:48 of the endpoint data in the table contains the same destination IP address and destination port as the incoming header data. The source IP address and source port as indicated in the header data are ignored. If the match type is UDP_full, then match logic units 3414-0 at 3414-1 will indicate a match only if the incoming packet type is UDP and all four fields of endpoint data match the corresponding fields of the incoming header data. If the match type is UDP_wildcard, then match logic units 3414 will indicate a match if the incoming packet type is UDP and bits 95:64 of the filter endpoint data contain the same destination IP address, and bits 15:0 of the endpoint data contain the same destination port number, as indicated in the header data of the incoming packet.

If either match logic unit 3414-0 or 3414-1 indicates a match, then hit logic 3416 so notifies the filter table search logic 3412. The Q_ID (queue ID) fields of the currently selected entries in both filter sub-tables are provided to two of three inputs of a multiplexer 3418, and hit logic 3416 provides a select input so that the multiplexer 3418 will select the queue ID from the currently selected entry of the correct filter sub-table 3410-0 or 3410-1. As mentioned, if no matching entry has been found after the search limit has been reached, then the filter table search logic 3412 provides a signal to the multiplexer 3418 to select to the default queue ID provided on a third input of the multiplexer 3418. Note that in the first approach this will always be the case for received multicast data packets, since no filter is ever established in the NIC filter table which matches the header information of incoming multicast data packets. The default queue ID in one embodiment is queue 0, which is defined to be a kernel queue. In other embodiments the default queue ID can be programmable. In any event, whether or not a match has been found, the multiplexer 3418 outputs the queue ID indicating the particular receive queue to which the NIC 1116 should deliver the incoming data packet.

Figure 35:
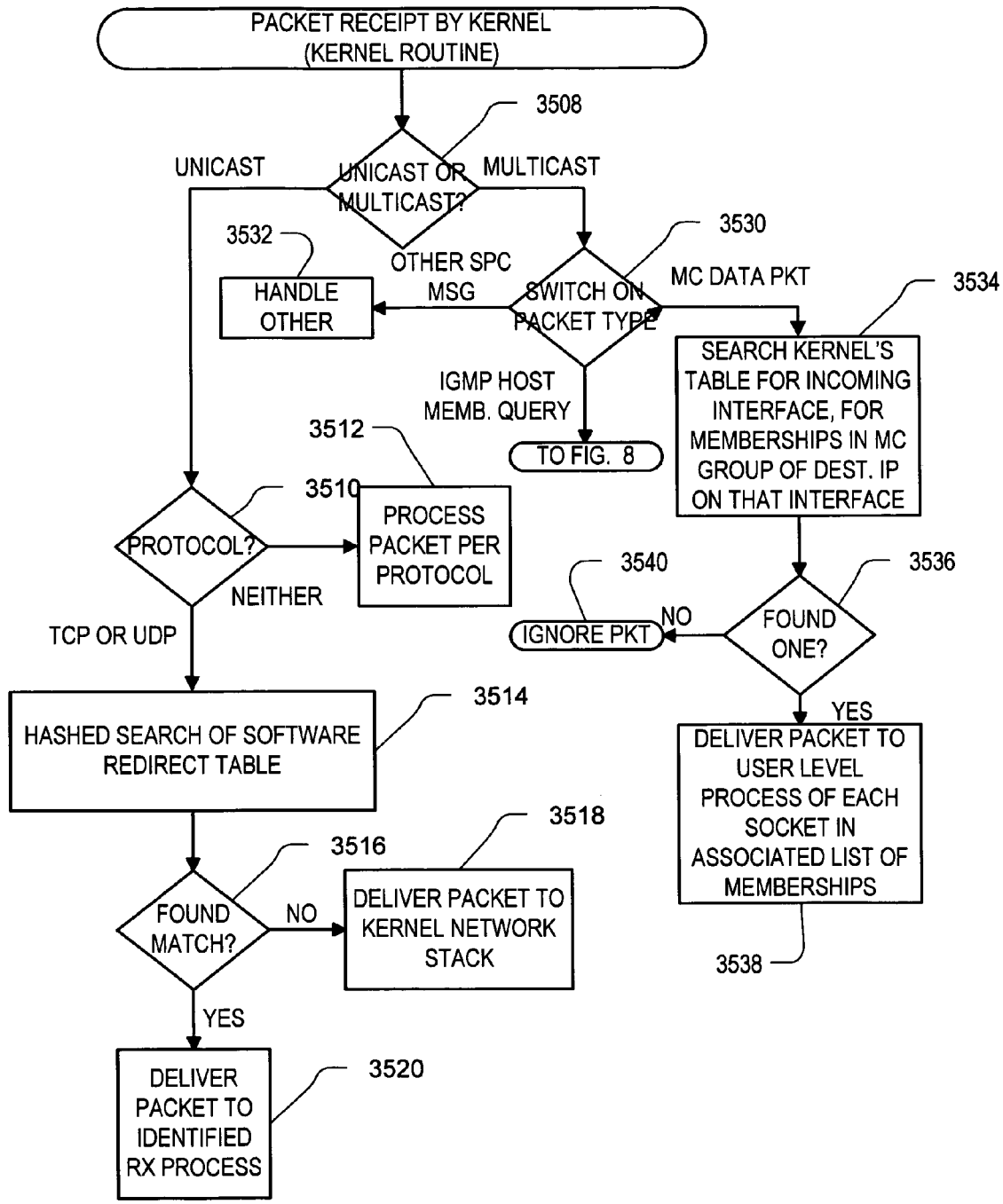
FIG. 35 is a flow chart showing pertinent steps that the kernel driver performs upon receipt of a data packet.

As previously mentioned, if the incoming data packet is mal-formed or uses a protocol that is not supported in the filter table 3410, or if it uses the supported protocol but a match was not found in the filter table 3410 before the appropriate search limit(s) was (were) reached, then the NIC 1116 will deliver the incoming data packet to a receive queue of the kernel driver 1225. All incoming multicast packets will be so delivered in the first approach, since no filter matching the header information of any incoming multicast data packet is ever established in the NIC filter table 3410. FIG. 35 is a flow chart showing pertinent steps that the kernel driver performs upon receipt of such a data packet.

Initially, in step 3508, the kernel determines from the destination IP address whether the incoming data packet is a unicast or multicast packet. If it is a unicast packet, then in step 3510, the kernel routine determines whether the packet uses the TCP or UDP protocol. If not, then in step 3512, the kernel driver processes the packet in whatever manner is appropriate for the particular packet format. If the incoming data packet does use TCP or UDP, then in step 3514, the kernel driver 1225 performs a hashed search, with no search limit imposed, of the software redirect table. In step 3516, if no match was found, then the kernel driver 1225 simply delivers the packet to a normal kernel network stack (step 3518). If a match was found then in step 3520 the kernel driver 1225 delivers the packet to the proper user level receive process. In order to avoid contention with the NIC 1116 attempting to deliver its own data packets to receive queues in an application's transport library 1224, the delivery of the packet from the kernel driver 1225 to the user level transport library 1224 occurs by some communication channel other than through the use of the receive queue. Typical standard operating system mechanisms can be used to notify the user level driver of the availability of this packet.

Figure 8:
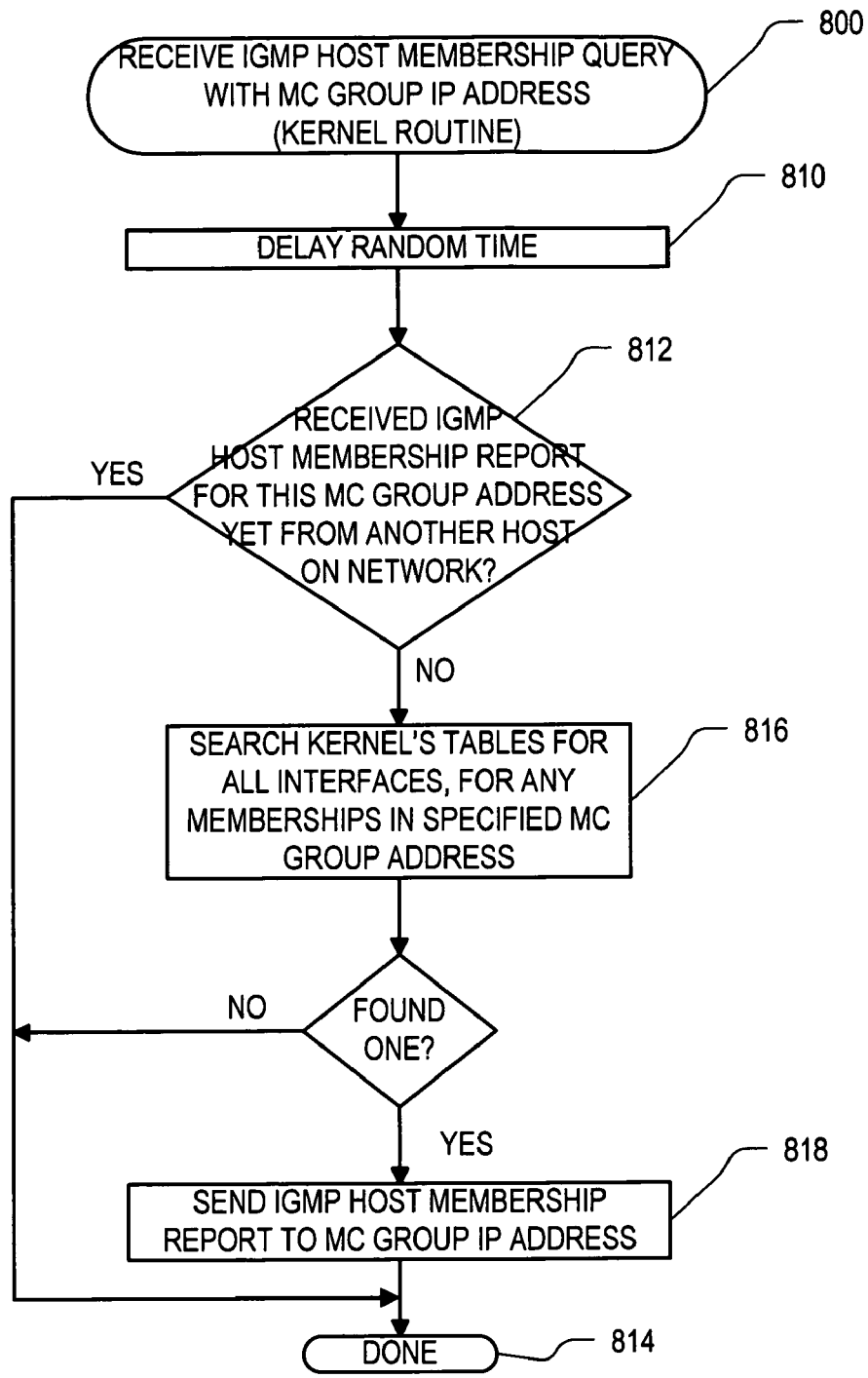
FIG. 8 is an outline of steps that a kernel might take in the environment of FIG. 3, upon receipt of an IGMP host membership query.
Figure 9:
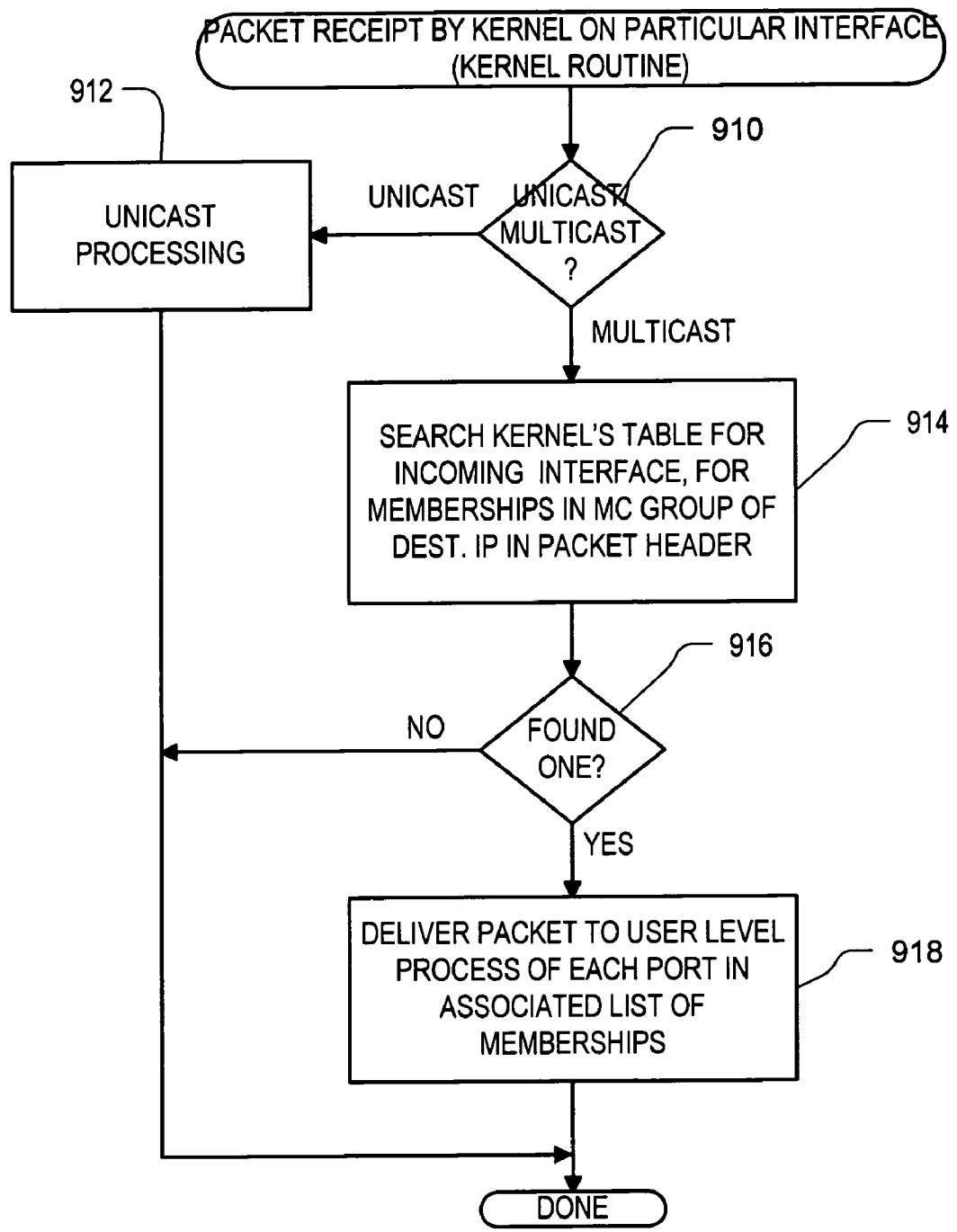
FIG. 9 is an example outline of steps that a kernel might take in the environment of FIG. 3, upon receipt of a packet on a particular network interface.
Figure 10:
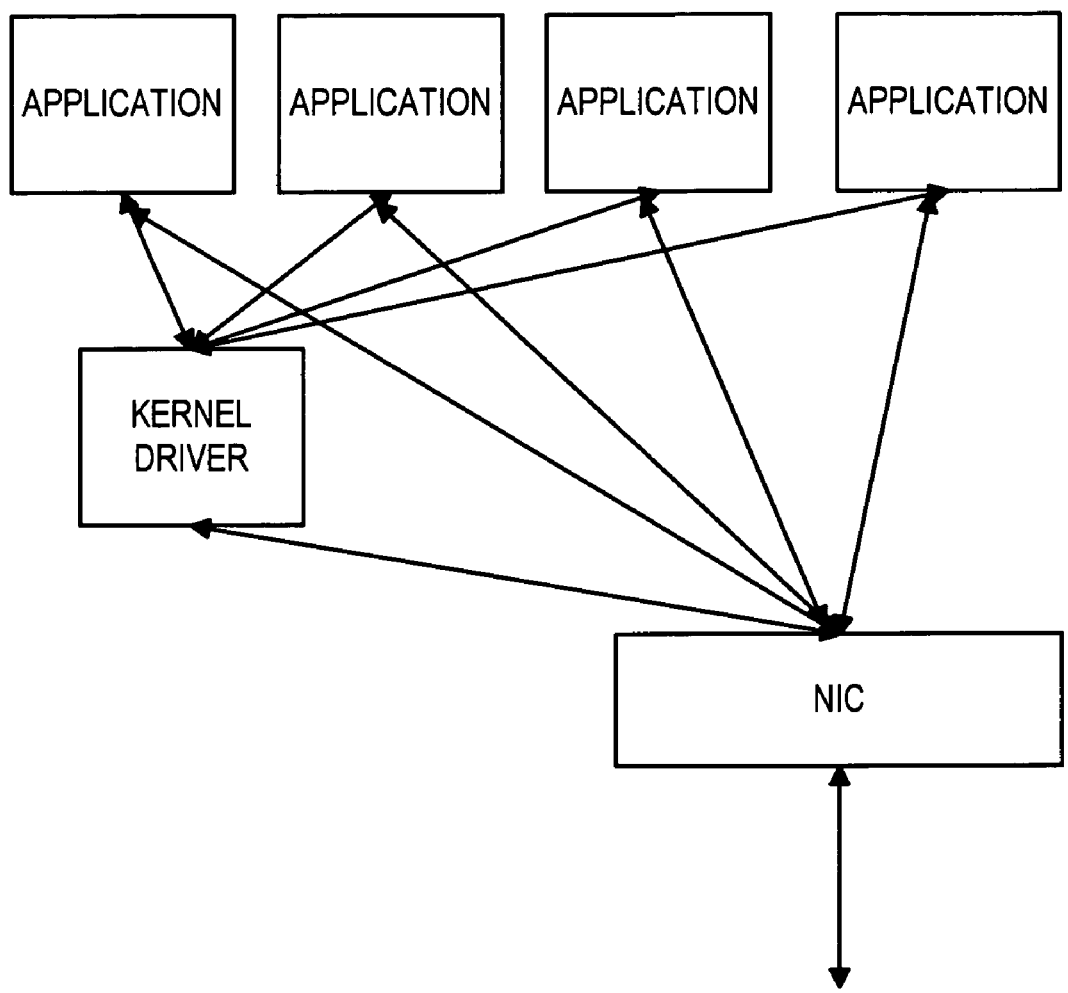
FIG. 10 symbolically illustrates an arrangement in which network protocol stacks are implemented at user level.

If in step 3508 the kernel determines that the incoming data packet is a multicast packet, then in step 3530 the routine switches on the multicast packet type. If the packet is an IGMP host membership query then the kernel processes the query in the same manner as set forth above with respect to FIG. 8. If the packet is a special multicast message other than an IGMP host membership query, then it is handled as appropriate in step 3532. If the packet is a multicast data packet, then the kernel processes it in a manner similar to that described above with respect to FIG. 9. In particular, in step and 3534 the kernel searches its table for the interface at which the packet was received, for memberships in the multicast group indicated by the destination IP address and port number in the packet header. The table may allow full or partial wildcards for the destination port number. If no memberships are found (step 3536), then the routine quietly ignores the packet (step 3540). If at least one is found, then in step 3538, the routine proceeds to deliver the packet to the user level process of each socket in the linked list pointed to by the table entry at which the group membership was found. As with unicast packets routed by means of the kernel's software redirect table, standard operating system interprocess communication mechanisms, rather than the receive queues, are used to notify the user level driver of the availability of this packet.

kernel, when it receives a request to deliver future incoming data packets having particular packet header properties to a particular user level endpoint, first determines from the specified properties whether they are of a character that permits a second or subsequent user level process to make a similar request to deliver the same future incoming data packets also to the second or subsequent user level endpoint. The kernel then programs the NIC with a filter for the specified packet header properties, but only if they are not of such a character (and assuming of course that all other restrictions are met as well). If the specified packet header properties are of a character that permits a second or subsequent user level process to make a similar request to deliver the same future incoming data packets also to the second or subsequent user level endpoint, for example if the specified packet header properties indicate multicast packets, then the kernel may instead establish the filter in its own internal tables. An incoming packet matching the specified header properties therefore will not match any entry in the NIC's filter tables, and thus will be delivered by default to the kernel to deliver in accordance with the filter it had established in the kernel's internal tables.

In the second approach to multicast reception, the NIC also implements no particular accommodations specifically for delivering incoming multicast data packets directly to user level processes. However, through special treatment of user level requests to join multicast groups, the NIC can be programmed to do so as long as no more than one user level endpoint is a member of any given multicast group. In particular, if a request to join a multicast group is the first such request for the specified group, then the kernel programs a filter into the NIC receive filter table just as it programs a unicast filter. The only difference is that the destination IP address specified in the filter is a multicast group IP address rather than a unicast destination IP address, a difference of which the NIC need not be aware. If the request to join the multicast group is the second or subsequent such request for the same multicast group, then the filter is established in the kernel multicast group membership table instead.

For the first approach, the kernel receive filter table is, at least functionally, the same as that of the NIC. For the second approach, some modifications can be implemented as shown in Table II:

TABLE II

| Entry Type | MC | bit[108] | bits[107:96] | bits[95:64] | bits[63:48] | bits[47:16] | bits[15:0] |
|---|---|---|---|---|---|---|---|
| TCP_Full | 0 | 0 | Q_ID[11:0] | destIP[31:0] | destPORT[15:0] | srcIP[31:0] | srcPORT[15:0] |
| TCP_Wildcard | 0 | 0 | Q_ID[11:0] | destIP[31:0] | destPORT[15:0] | 0 | 0 |
| UDP_Full | 0 | 1 | Q_ID[11:0] | destIP[31:0] | destPORT[15:0] | srcIP[31:0] | srcPORT[15:0] |
| UDP_Wildcard | 0 | 1 | Q_ID[11:0] | destIP[31:0] | 0 | 0 | destPORT[15:0] |
| UDP_Full (MC) | 1 | 1 | ptr to membership LL | MC group IP addr | destPORT[15:0] | srcIP[31:0] | srcPORT[15:0] |
| UDP_Wildcard (MC) | 1 | 1 | ptr to membership LL | MC group IP addr | 0 | 0 | destPORT[15:0] |

It can be seen that even though the NIC in this first approach implements no particular accommodations for delivering incoming multicast data packets directly to user level processes, multicast reception is still possible in an environment in which the NIC does deliver many unicast data packets directly to user level processes. This is made possible in part by the determination made by the kernel in its CreateFilterEntry( ) routine, to program a requested filter into the NIC only if the filter applies to unicast packets. More generally, multicast reception is made possible in an environment in which the NIC delivers many unicast data packets directly to user level processes, in the first approach, because the As can be seen, in addition to the fields set forth above in Table I, each entry in the kernel receive filter table for this second approach also includes an MC bit to indicate whether the entry represents a multicast group. If it does, then in place of the queue ID, the entry contains a pointer to a linked list of all the queue ID's to which an incoming packet of the indicated multicast group and destination port number combination should be delivered. The table includes multicast entry formats for both UDP_Full and UDP_Wildcard entries, since multicast commonly uses the UDP protocol, and the application software may or may not specify a source IP from which to accept packets of the particular multicast group. The table does not include any multicast TCP entry formats, since TCP is rarely if ever used for multicast transmission. In addition, in an embodiment, the destination port number field may support wildcarding.

In an alternative embodiment of the second approach, the kernel receive filter is the same as that set forth above with respect to the first approach (the same as the NIC). Instead of a modified table, the kernel implements a second table for multicast filters, separate from the kernel receive filter table for unicast filters. The table for multicast filters has the format of Table III:

TABLE III

| Entry Type | MC Group IP address & destination port | Source IP address & source port | Pointer to Membership LL |
|---|---|---|---|
| UDP_Full (MC) | MC Group IP address & destination port | Source IP address & source port | Pointer to Membership LL |
| UDP_Wildcard (MC) | MC Group IP address & destination port | 0 | Pointer to Membership LL |

This table can be searched linearly, or a hashed search can be performed. The kernel can determine from the first four bits of the destination IP address in the incoming packet header whether to search its unicast receive filter table or its multicast receive filter table.

Figure 36:
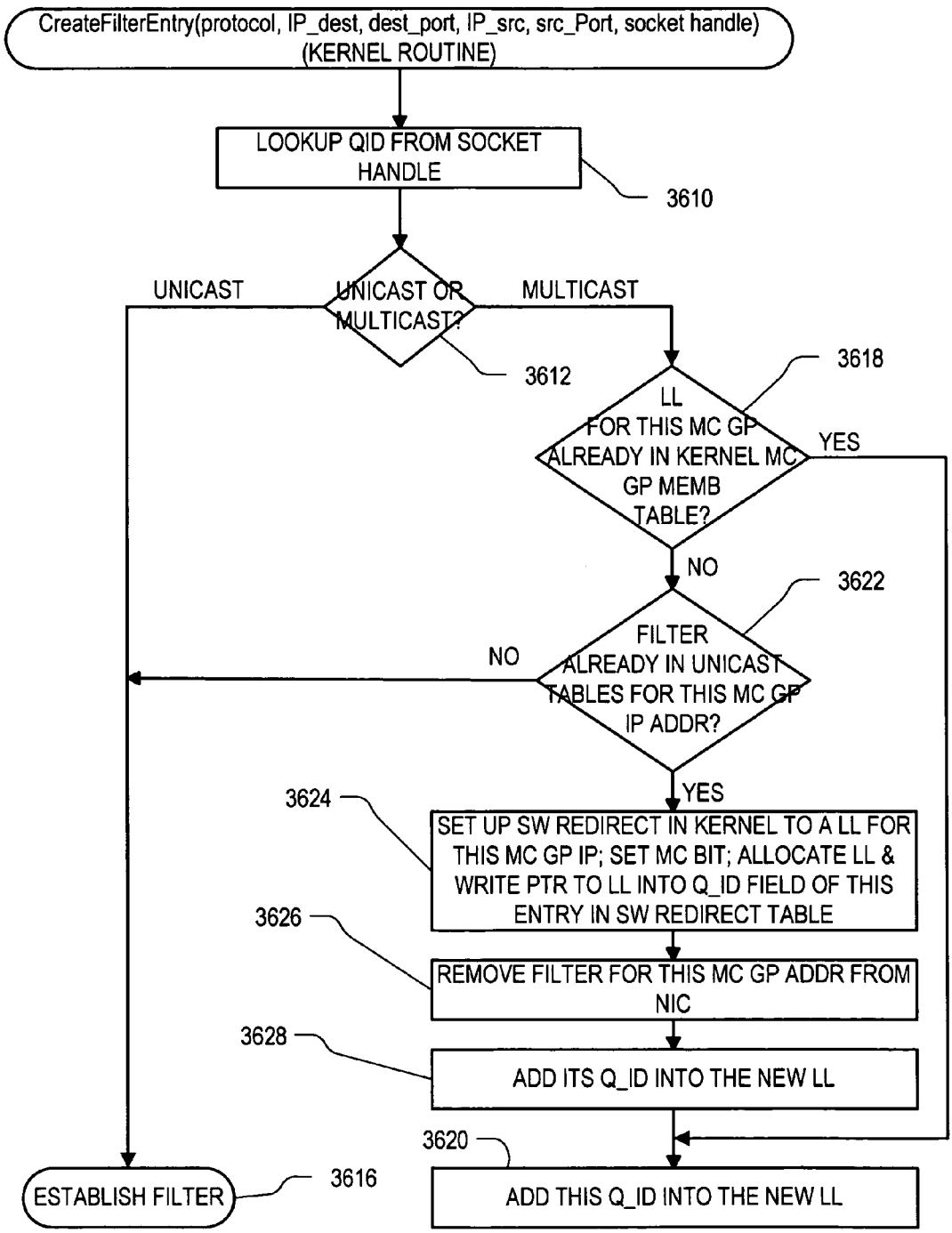

With this second approach, the user level setSockOpt( ) routine operates as described above with respect to FIG. 29. FIG. 36 is a flowchart of pertinent steps of the kernel's CreateFilterEntry( ) routine, for implementing the second approach. In step 3610, the routine first looks up the queue ID from the socket handle specified. In step 3612, the routine determines from the specified destination IP address whether the requested filter is for unicast or multicast reception. If the request is for a unicast filter, then in step 3616, similarly to step 3016 (FIG. 30), the kernel establishes this filter in the NIC if possible, or in the kernel's own unicast software redirect filter table if not.

If the request is for a multicast filter, then unlike in the first approach, the routine first determines whether a linked list for the indicated multicast group already exists in the kernel's multicast group membership tables (step 3618). If so, then the kernel simply adds the new receive queue ID into the associated linked list (step 3620). If not, then in step 3622, the routine determines whether a filter for the specified multicast group IP address already exists as a unicast filter, either in the NIC receive filter table or in the kernel's unicast software redirect table. The kernel can determine the former by looking in its own host-centric copy of the NIC's receive filter table. If a filter does not already exist in the unicast filter tables, then the current request is the first request from an application process to join the indicated multicast group. In step 3616 the routine establishes the filter just as if it were a unicast filter. The procedure to accomplish this is that same as that set forth above with respect to FIG. 31, even though the destination IP address is a multicast group address rather than a unicast IP address. Assuming the protocol of the multicast group is UDP, which is the case for many multicast groups, the filter will be established either in the NIC (step 3118) or in the kernel's software redirect table (step 3122). An appropriate IGMP host membership report may also be transmitted (not shown in FIG. 36).

If in step 3622 the routine determines that a filter does already exist in the unicast filter tables for the specified multicast group IP address, then the current request is the second request from a user level application process to join the same multicast group. To satisfy the second request, the routine would have to program a second destination queue ID into the NIC filter table for incoming data packets having the same header characteristics as already programmed for the first filter. But since the NIC in this second approach is designed for unicast reception, it does not have the structure to deliver an incoming data packet to more than one receive queue. Accordingly, in steps 3624-3628, the kernel moves the existing filter into the kernel's tables and adds the new receive queue ID into the associated linked list. In particular, in step 3624, the kernel allocates a linked list for the current multicast group, establishes an entry in the kernel's software redirect table of the appropriate multicast format set forth above in Table II, sets the multicast bit in that entry and writes a pointer into the queue ID field of the entry to point to the newly created linked list. In step 3626, the kernel removes the existing filter from the unicast filter tables, and in step 3628, adds the queue ID from that entry into the newly created linked list. The routine then continues at step 3620 for adding the queue ID of the current createFilterEntry( ) call into the newly created linked list as well.

In this embodiment of the second approach, the NIC filter table is allowed to contain only one entry for each multicast group IP address. If the embodiment supports full or partial wildcarding in the destination port field of the NIC receive filter table, then multicast filters with wildcards of a type supported can be established in the NIC filter table as well. If the embodiment does not support wildcarding in the destination port field of the NIC receive filter table, or does not support the type of wildcarding requested by the application, then the filter is established in the kernel and not the NIC. Once a filter is established in the NIC filter table for a particular multicast group IP address, if a new request is received for a different endpoint to join the same multicast group, even if a different destination IP port is specified, then the entire multicast group filter is moved to the kernel. In another embodiment, the kernel allows the establishment of multiple filters in the NIC filter table for the same multicast group, as long as the specified destination port numbers are different. If wildcarding is supported in the destination port field of the NIC receive filter table, then the kernel can still allow the establishment of multiple filters in the NIC filter table for the same multicast group, as long as the specified destination port number ranges do not overlap.

Figure 37:
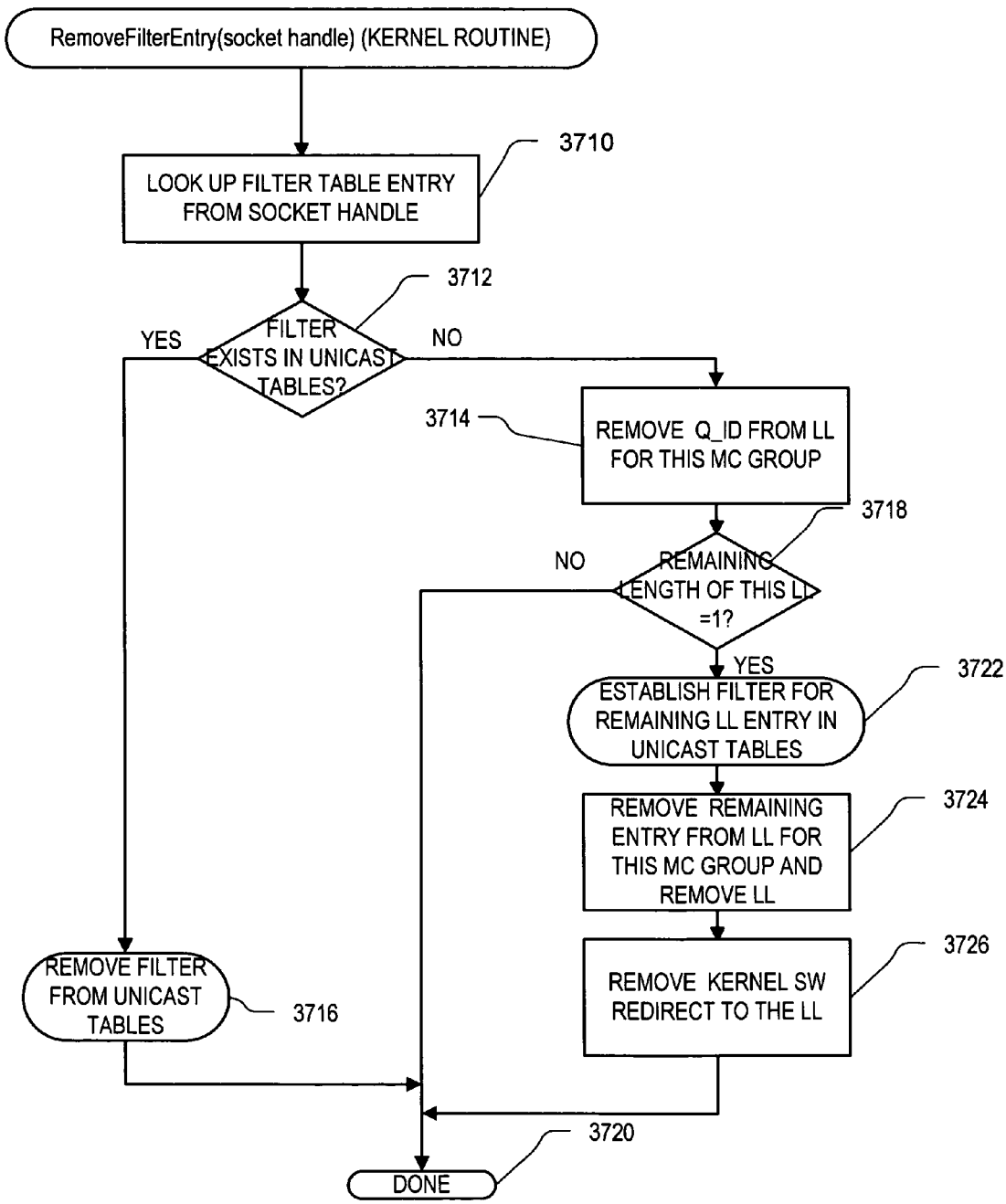

FIG. 37 is a flowchart of pertinent steps of the kernel's RemoveFilterEntry( ) routine, for implementing the second approach. In step 3710, the kernel looks up the filter table entry from the data associated with the socket handle specified. The information obtained in step 3710 includes the queue ID associated with the specified socket handle, and if the filter is located in the unicast filter tables (in NIC or kernel), a pointer to the specific unicast filter table entry. In step 3712, whether or not the socket was set up for unicast or multicast reception, the routine determines from the socket data whether the filter to be removed is located in the unicast filter tables. If so, then in step 3716, the kernel removes the filter from the NIC, if it had been established there, or from the kernel's own software redirect filter table if not. The routine described above with respect to FIG. 33 can be used for this purpose.

If the filter to be removed is not located in the unicast filter tables, then it is a multicast filter located in the kernel's multicast group membership tables. Thus in step 3714, the routine removes the queue ID of the specified socket from the kernel's linked list associated with the multicast group ID indicated by the destination IP address field of the filter. In step 3718, the routine determines whether this linked list now has only one member. If not, then the routine returns to the caller (step 3720). If there is only one destination queue ID remaining in the linked list associated with the current multicast group, then in the filter for that destination process is now moved to the unicast filter tables. In particular, in step 3722, similarly to step 3016 (FIG. 30), the kernel establishes a corresponding unicast filter in the NIC if possible, or in the kernel's own unicast software redirect filter table if not, a unicast filter for delivery of incoming multicast packets of the multicast group to the queue ID specified in the one remaining entry of the linked list. The procedure to accomplish this is that same as that set forth above with respect to FIG. 31, even though the destination IP address is a multicast group address. In step 3724, the routine removes the one remaining entry of the linked list and deletes the list. In step 3726 the routine removes the kernel software redirect that it had previously set up in step 3624 for this multicast group. The routine then returns to the caller (step 3720).

As previously mentioned, in this second approach, the NIC makes no distinction between incoming unicast and incoming multicast data packets. In both cases the NIC first searches its own receive filter table for a match, and if it finds one before the appropriate search limit is reached, then the NIC 1116 will deliver the incoming data packet to the identified receive queue. This mechanism bypasses the kernel stack both for unicast packets and, if exactly one user level endpoint in the host system is then a member of a multicast group, for multicast packets of that multicast group as well. On the other hand, if the incoming data packet is mal-formed or uses a protocol that is not supported in the filter table 3410, or if it uses a supported protocol but a match was not found in the filter table 3410 before the appropriate search limit is reached, then the NIC 1116 will deliver the incoming data packet to a receive queue of the kernel driver 1225. Again, these can be unicast or multicast packets in this second approach.

Figure 38:
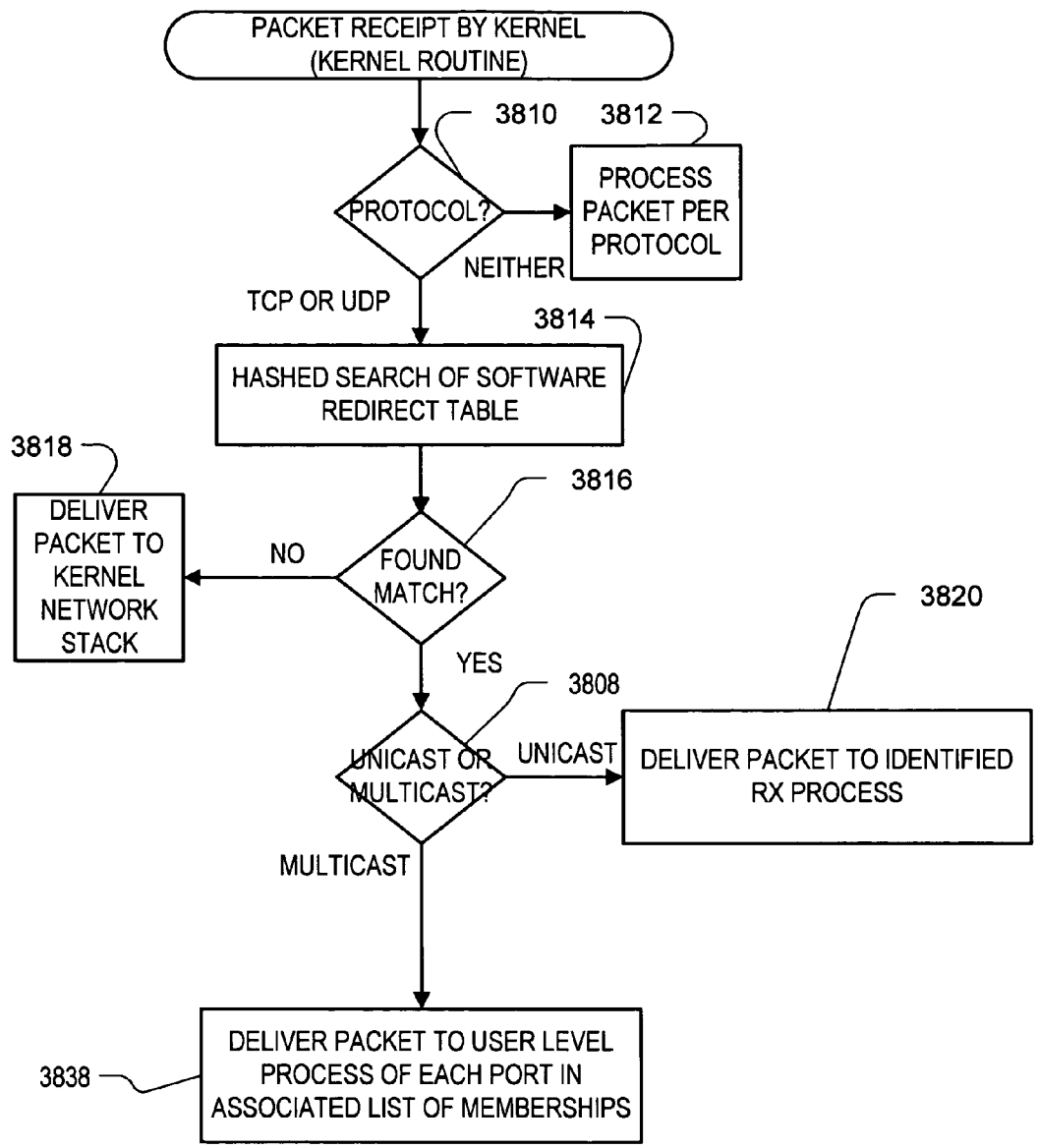
FIG. 38 is a flow chart showing pertinent steps that the kernel driver performs upon receipt of a data packet in one embodiment.

FIG. 38 is a flow chart showing pertinent steps that the kernel driver performs upon receipt of such a data packet in this second approach. Initially, in step 3810, the kernel routine determines whether the packet uses the TCP or UDP protocol. If not, then in step 3812, the kernel driver processes the packet in whatever manner is appropriate for the particular packet format. If the incoming data packet does use TCP or UDP, then in step 3814, the kernel driver 1225 performs a hashed search, with no search limit imposed, of the software redirect table. A match might be found in the kernel's software redirect table whether the incoming packet is a unicast or multicast packet. In step 3816, if no match was found, then the routine simply delivers the packet to a normal kernel network stack (step 3818). If a match was found, then the kernel driver 1225 next determines whether the incoming packet is a unicast or multicast packet. If unicast, then in step 3820 the kernel driver 1225 delivers the packet to the proper user level receive process. If the packet is a multicast data packet, then the kernel routine proceeds to deliver the packet to each queue ID in the linked list pointed to by the table entry at which the match was found. As with unicast packets routed by means of the kernel's software redirect table, standard operating system interprocess communication mechanisms, rather than the receive queues, are used to notify the user level driver of the availability of this packet.

It can be seen that in this second approach, not only incoming unicast packets, but also incoming multicast packets in certain circumstances, will be delivered by the NIC directly to the user level driver without requiring a context switch to the kernel. Direct delivery of multicast packets in this second approach requires that exactly one user level endpoint within the host system be a member of the multicast group (or in an embodiment, the multicast group and destination port combination) to which the packet belongs.

The third approach for supporting multicast reception is a generalization of the second. In the third approach, the NIC has the capacity to deliver incoming multicast data packets directly to user level processes, but as in most things there is some limit on its capacity to do so. In one embodiment the limit is very large, so that effectively it does not exist and no steps need be taken to protect against exceeding it. In another embodiment the limit is more stringent. In this third approach, the kernel driver takes advantage of whatever capacity exists, whenever it can. The second approach is a special case of the third, in which the NIC's capacity to directly deliver incoming multicast data packets is limited to a single destination receive queue. If a user level process requests membership in a particular multicast group, the kernel createFilterEntry( ) routine will create the filter in the NIC if possible (i.e. if one is not already there and if search limits are not violated), or will create it in the kernel's own internal tables if the NIC's capacity of one destination receive queue would be exceeded.

Figure 39:
FIGS. 39, 40 and 41 illustrate filter table structures that can be used in the NIC.

In another embodiment of the third approach, the NIC has capacity to store a fixed number N (for example N=2) destination queue ID's for each multicast group. In one implementation of the this embodiment, the NIC receive filter table is widened to include N fields, rather than only one field, for storing queue ID's of destination receive queues. FIG. 39 illustrates such a filter table structure. The N fields are designated 3910-1 through 3910-N. In a FIG. 39 implementation, if an incoming data packet has header information matching the filter criteria of a particular filter, then the NIC delivers the packet to each valid queue ID specified in the filter. As in the second approach, no distinction is made by the NIC between incoming unicast and incoming multicast data packets; the only difference is that a filter for unicast packets will never contain more than one valid queue ID whereas a filter for multicast packets may. A disadvantage of the FIG. 39 implementation is that in most computer systems, since the great majority of receive filters will be unicast filters, the great majority of queue ID fields in the NIC receive filter table will remain unused.

Figure 40:
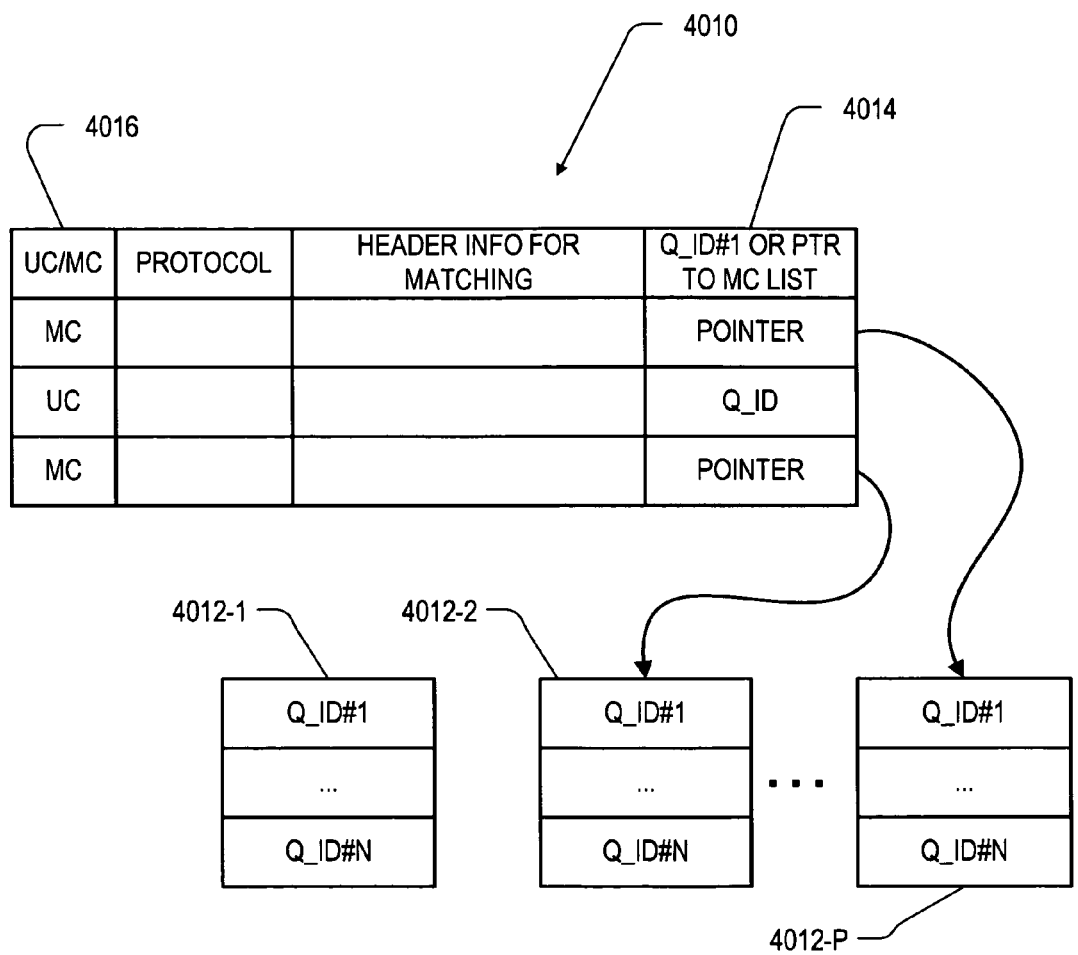

FIG. 40 illustrates a second filter table format that a NIC can use in a second implementation of this third approach. In this second implementation, the NIC receive filter table is organized as shown in Table II above. That is, the NIC filter table includes both a primary filter table 4010 and a plurality of secondary filter tables 4012-1, 4012-2, . . . , 4012-P (collectively 4012). Each entry in the primary table includes only one queue ID field 4014, which in the case of a multicast entry, doubles as a pointer to a secondary table of queue IDs. Multicast entries are distinguished from unicast entries in the primary table by a UC/MC bit 4016 added to each entry. Each pointer in a multicast entry of the primary table points to one of a fixed number P secondary lists for holding queue IDs. Each list can hold a fixed number N queue IDs. In this implementation the NIC has capacity to support hardware filters for up to P multicast groups, and up to N endpoint members in the host system for each group. The FIG. 40 implementation can utilize NIC storage capacity more optimally than the FIG. 39 implementation, because the designer can plan the numbers N and P so as to better match the expected unicast/multicast usage pattern expected for the host system. A disadvantage, however, is that it does not optimize NIC memory usage in the event that some multicast groups might be joined by fewer than N endpoints in the host system, whereas other multicast groups might be joined by many more than N endpoints in the host system.

Figure 41:
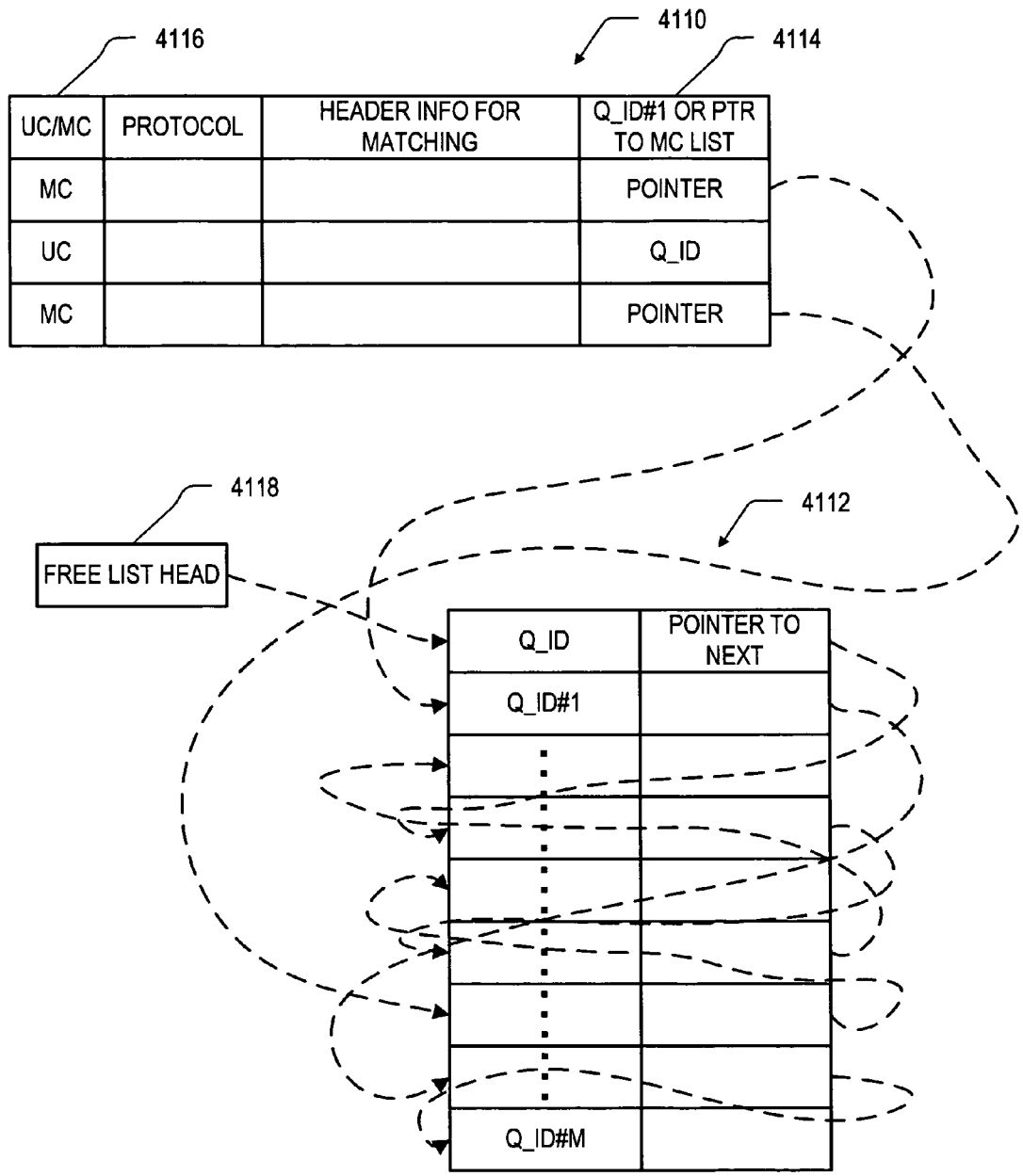

FIG. 41 illustrates yet a third filter table format that a NIC can use in a third implementation of this third approach. In this third implementation the NIC receive filter table again includes both a primary table 4110 and a secondary table 4112. The primary table is similar to the primary table 4110 in the FIG. 40 implementation, but the secondary table 4112 is a single contiguous address space holding a plurality of linked lists of queue IDs. The pointer in a multicast entry of the primary table points to the head of a respective linked list in the secondary table 4112, for holding all the queue IDs of endpoint members of the particular multicast group. Each entry in the secondary table includes both a field for a queue ID and a field pointing to the next entry in the linked list for the same multicast group. The NIC also maintains a Free List Head pointer for linking together all the currently unused entries in the secondary table. When the kernel driver instructs the NIC to add a queue ID to the linked list associated with a particular multicast group, the NIC removes an entry from the free list, links it into the specified list, and fills it with the specified queue ID. when the kernel driver instructs the NIC to remove a queue ID from the linked list associated with a particular multicast group, the NIC does so and links its entry back into the free list. The FIG. 41 implementation is more flexible than the implementations of both FIGS. 39 and 40, but can be more difficult to implement in the NIC hardware.

The three implementations above for the third approach should be seen only as examples. Depending on the embodiment, example implementations may or may not support wildcarding in the destination port number field of multicast filter entries. Yet other implementations can be constructed from hybrids of those in FIGS. 39, 40 and 41. For example, the primary filter table may have fields for N0 destination queue IDs, and then makes reference to a secondary table like FIGS. 40 or 41 only for endpoints beyond the first N0. In yet another implementation, the overspill list is stored in host memory rather than in NIC-based SRAM. This reduces the need for dedicated resources on the NIC which may be rarely used. The reader will appreciate that many other implementations are possible.

Figure 42:
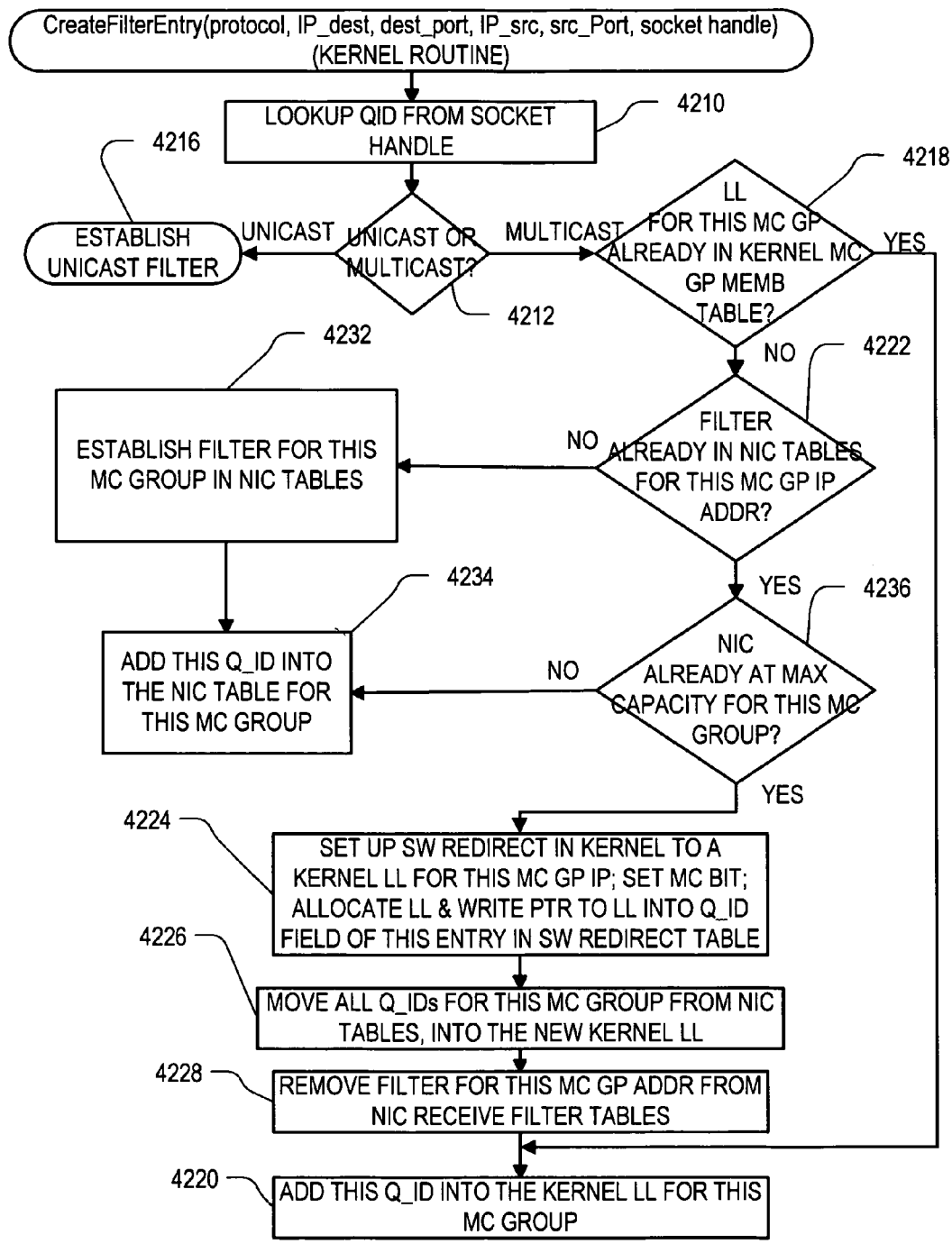

FIG. 42 is a flowchart of pertinent steps of the kernel's CreateFilterEntry( ) routine, for implementing the third approach. In step 4210, the routine first looks up the queue ID from the socket handle specified. In step 4212, the routine determines from the specified destination IP address whether the requested filter is for unicast or multicast reception. If the request is for a unicast filter, then in step 4216, the kernel establishes this filter in the NIC if possible, or in the kernel's own unicast software redirect filter table if not. The procedure to accomplish this is that same as that set forth above with respect to FIG. 31.

If the request is for a multicast filter, then the routine first determines whether a linked list for the indicated multicast group already exists in the kernel's multicast group membership tables (step 4218). If so, then membership for this group has already exceeded the NIC's capacity to deliver packets of this group directly, or there is some other reason why the NIC cannot support direct delivery of packets of this multicast group. The kernel therefore simply adds the new receive queue ID into the kernel's associated linked list (step 4220). If no linked list for the indicated multicast group already exists in the kernel's multicast group membership tables, then in step 4222, the routine determines whether a filter for the specified multicast group IP address already exists in the NIC filter tables. The kernel can determine this by looking in its own host-centric copy of the NIC's receive filter table.

If the NIC does not already have a filter for the indicated multicast group, then the current request is the first request from an application process to join the indicated multicast group. Therefore, in step 4232 the routine establishes a filter for the indicated multicast group in the NIC, and in step 4234 the routine adds the indicated queue ID into the NIC's delivery list for this multicast group. The routine also transmits an appropriate IGMP host membership report (not shown in FIG. 42). In an implementation like FIG. 39, step 4232 might be the same as establishing a unicast filter, and step 4234 might involve inserting the indicated queue ID into the first of the N delivery destination fields of the filter entry. In an implementation like FIG. 40 or 41, step 4232 might involve setting up the filter in the NIC's primary receive filter table and inserting a pointer to the NIC's secondary filter table, and step 4234 might involve inserting the indicated queue ID into an available entry in the particular secondary table (FIG. 40), or into the particular linked list in the secondary table (FIG. 41).

If in step 4222 the routine determines that a filter does already exist in the NIC for the specified multicast group IP address, then the current request is the second or subsequent request from a user level application process to join the same multicast group. The NIC may or may not have capacity to add the specified queue ID to the delivery list for this multicast group. In step 4236, therefore, the kernel determines whether the NIC is already at its maximum capacity for the indicated multicast group. In implementations like FIGS. 39 and 40, this might involve determining whether the NIC is already storing N queue IDs for the particular group. In an implementation like FIG. 41, this might involve determining whether the NIC is already storing M queue IDs over all the multicast groups. Note that this determination is (in the present embodiment) made by the kernel. Obviously it is preferred that this determination always be accurate, but it will be appreciated that circumstances may arise in which the kernel's view of the NIC's current capacity differs from the NIC's actual current capacity. As used herein, therefore, the "making of a determination" requires merely that a determination be made. It does not require that the determination be correct.

If the NIC is determined to be not yet at maximum capacity, then the kernel adds the indicated queue ID into the NIC's list for the indicated multicast group (step 4234). If it is, then in steps 4224-4228, the kernel moves the existing destination list from the NIC into the kernel's tables and adds the new receive queue ID into the associated linked list. In particular, in step 4224, the kernel allocates a linked list for the current multicast group, establishes an entry in the kernel's software redirect table of the appropriate multicast format set forth above in Table II, sets the multicast bit in that entry and writes a pointer into the queue ID field of the entry to point to the newly created linked list. In step 4226, the kernel moves all the queue IDs listed in the NIC for this multicast group, from the NIC to the newly created linked list. In step 4228 the kernel removes the existing filter from the NIC's filter table (or from the NIC's primary filter table, in the implementations of FIGS. 40 and 41). The routine then continues at step 4220 for adding the queue ID of the current createFilterEntry( ) call into the newly created kernel linked list as well. Note that in another embodiment, the existing filter might not be removed from the NIC's tables and moved to the kernel. Instead, the embodiment might leave all existing filters intact in the NIC, and merely add a flag indication that the packet should also be delivered to the kernel for possible delivery to additional destination receive queues. In yet another embodiment, the embodiment might move only the last filter pre-existing filter from the NIC to the kernel, replacing it in the NIC with an indication that the packet should also be delivered to the kernel for possible delivery to additional destination receive queues. Many other variations will be apparent to the reader.

Figure 43:
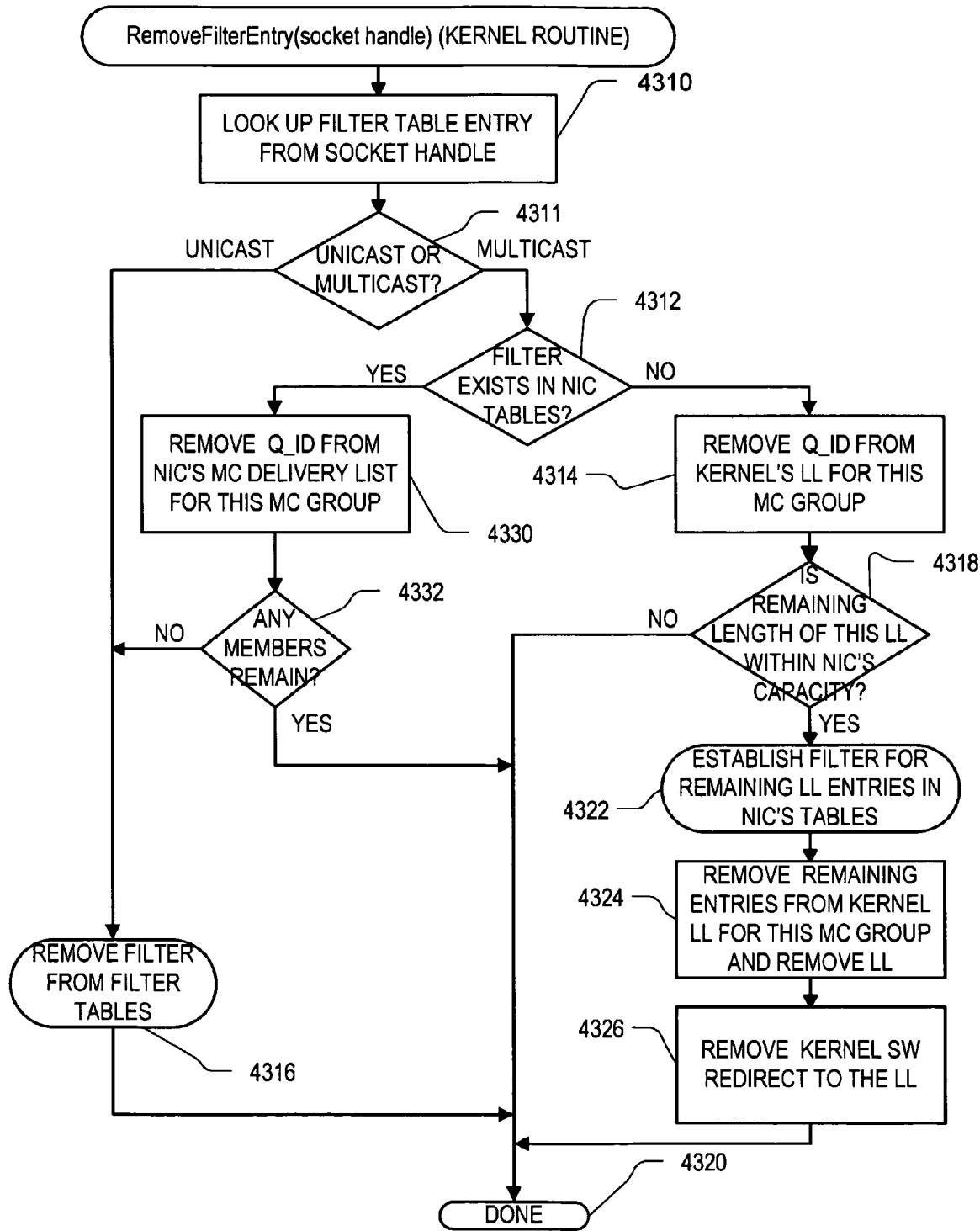

FIG. 43 is a flowchart of pertinent steps of the kernel's RemoveFilterEntry( ) routine, for implementing the third approach. In step 4310, the kernel looks up the filter table entry from the data associated with the socket handle specified. The information obtained in step 4310 includes the queue ID associated with the specified socket handle, and a pointer to the relevant entry in the NIC's (primary) filter table. If the filter was for a multicast group, then in some embodiments the information might also include a pointer to the specific field containing the specified queue ID (FIG. 39 implementation, for example), or a pointer to the specific entry of a secondary filter table (FIG. 40 or 41 implementations, for example). In step 4311, the routine determines whether the filter was for unicast or multicast reception. If for unicast, then in step 4316, the kernel removes the filter from the NIC, if it had been established there, or from the kernel's own software redirect filter table if not. The routine described above with respect to FIG. 33 can be used for this purpose.

If the filter was for multicast reception, then in step 4312 the routine determines whether it is located in the NIC filter tables. If so, then in step 4330 the kernel removes the subject queue ID from the NIC's multicast delivery list for the particular multicast group. This can involve invalidating the queue ID's field in an implementation like FIG. 39, invalidating the queue ID's entry in the secondary filter table for this multicast group in an implementation like FIG. 40, or unlinking the queue ID's entry in the secondary filter table in an implementation like FIG. 41 and adding it to the free list. In step 4332, the routine determines whether the NIC's delivery list for the particular group has any remaining queue ID's. If so, then step 4316 is performed for also removing the main filter entry for this multicast group from the (primary) filter table. Again, the routine described above with respect to FIG. 33 can be used for this purpose. Otherwise, the routine terminates (step 4320) without any further removal of entries from the NIC tables.

If the filter to be removed is not located in the NIC filter tables, then it is located in the kernel's multicast group membership tables. Thus in step 4314, the routine removes the queue ID of the specified socket from the kernel's linked list associated with the multicast group ID indicated by the destination IP address field of the filter. In step 4318, the routine determines whether this linked list now contains few enough members to be within the capacity of the NIC to deliver packets of the particular multicast group to all members directly. If not, then the no further changes are made to filter tables and the routine returns to the caller (step 4320). If the kernel's linked list does now contain few enough members, then the kernel moves the existing destination list from the kernel's tables into the NIC. In particular, in step 4322, the kernel establishes the main filter entry for the multicast group in the NIC's (primary) receive filter table, and copies in all the remaining queue IDs from the kernel's delivery list. In step 4324 the kernel removes the remaining queue IDs from the kernel's linked list for this multicast group and deletes the list. In step 4326 the routine removes the kernel software redirect that it had previously set up for this multicast group. The routine then returns to the caller (step 4320).

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

Additionally, as used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. As an example, whereas in the embodiments described herein it is the header fields of an incoming packet which are compared to fields in the filter table to detect a matching filter table entry, in another embodiment other aspects of the content of the incoming packet can be compared instead. As another example, whereas the filter table in the NIC in the embodiments described herein have a tabular format, it will be appreciated that a table is only one possible format for what is more generally known as a database. Another embodiment might implement a filter database having a different structure that need not be tabular. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A method for establishing filtering for incoming data packets to be received from a network, for use with a network interface device by a host system having an operating system having a network protocol stack, comprising the steps of:
   receiving a first request for a first user level endpoint to join a first multicast group;
   programming the network interface device to deliver future incoming data packets of the first multicast group to the first user level endpoint in a manner that at least part of a header of the future incoming data packets, including an identification of at least one of the first multicast group and the first user level endpoint, bypasses the operating system network protocol stack,
   receiving, while the first user level endpoint remains a member of the first multicast group, a second request for a second user level endpoint to join a second multicast group; and
   programming the network interface device to deliver future incoming data packets of the second multicast group to the second user level endpoint in a manner that at least part of a header of future incoming data packets of the second multicast group, including an identification of at least one of the second multicast group and the second user level endpoint, bypasses the operating system network protocol stack.

2. A method for establishing filtering for incoming data packets to be received from a network, for use with a network interface device by a host system having an operating system having a network protocol stack, comprising the steps of:

receiving a first request for a first user level endpoint to join a first multicast group;

programming the network interface device to deliver future incoming data packets of the first multicast group to the first user level endpoint in a manner that at least part of a header of the future incoming data packets, including an identification of at least one of the first multicast group and the first user level endpoint, bypasses the operating system network protocol stack, receiving, while the first user level endpoint remains a member of the first multicast group, a second request for a second user level endpoint to join the first multicast group; and programming the network interface device to deliver further future incoming data packets of the first multicast group also to the second user level endpoint in a manner that at least part of a header of the further future incoming data packets, including an identification of at least one of the first multicast group and the second user level endpoint, bypasses the operating system network protocol stack.

3. The method according to claim 2, wherein the step of programming the network interface device to deliver also to the second user level endpoint, comprises the steps of:

programming into a secondary table in the network interface device of endpoint members of the first multicast group, an identification of the second user level endpoint; and programming the network interface device to refer to the secondary table in response to an incoming data packet of the first multicast group.

4. The method according to claim 3, wherein the secondary table also identifies endpoint members of a second multicast group.

5. The method according to claim 3, wherein the network interface device includes a filter table that maintains, for each of a plurality of packet header match criteria, identification of a single corresponding packet destination endpoint for incoming data packets matching the corresponding packet header match criteria, and wherein the step of programming the network interface device to deliver future incoming data packets to the first user level endpoint, comprises the step of programming into the filter table an identification of the first user level endpoint as the single corresponding packet destination endpoint for incoming data packets having a destination IP address matching that of the first multicast group, further comprising the steps of:

programming an identification of the first user level endpoint into the secondary table of endpoint members of the first multicast group; and unprogramming from the filter table the identification of the first user level endpoint as the single corresponding packet destination endpoint for incoming data packets having a destination IP address matching that of the first multicast group.

6. A method for establishing filtering for incoming data packets to be received from a network, for use with a network interface device by a host system having an operating system having a network protocol stack, comprising the steps of:

receiving a first request for a first user level endpoint to join a first multicast group;

programming the network interface device to deliver future incoming data packets of the first multicast group to the first user level endpoint in a manner that at least part of a header of the future incoming data packets, including an identification of at least one of the first multicast group and the first user level endpoint, bypasses the operating system network protocol stack, receiving a second request for a second user level endpoint to join the first multicast group;

making a determination that the network interface device lacks sufficient capacity to be programmed to add the second user level endpoint as an endpoint for delivery of future incoming data packets of the first multicast group; and causing the operating system to deliver to the second user level endpoint, future incoming data packets of the first multicast group.

7. The method according to claim 6, further comprising the steps of:

causing the network interface device to deliver future incoming data packets of the first multicast group to the operating system and not to the first user level endpoint; and causing the operating system to deliver future incoming data packets of the first multicast group, to the first user level endpoint.

8. The method according to claim 7, wherein the network interface device delivers all incoming multicast data packets to the operating system unless programmed otherwise, wherein the step of programming the network interface device to deliver to the first user level endpoint future incoming data packets of the first multicast group causes the network interface device to deliver future incoming data packets of the first multicast group to the first user level endpoint and not to the operating system, and wherein the step of causing the network interface device to deliver future incoming data packets of the first multicast group to the operating system and not to the first user level endpoint, comprises the step of unprogramming the network interface device to deliver to the first user level endpoint future incoming data packets of the first multicast group.

9. The method according to claim 6, further comprising the steps of:

receiving a third request for a third user level endpoint to join the first multicast group; and in response to a determination that the operating system is already handling deliveries of incoming data packets of the first multicast group, causing the operating system to deliver future incoming data packets of the first multicast group also to the third user level endpoint.

10. The method according to claim 6, further comprising the steps of:

receiving a request for a particular user level endpoint to leave the first multicast group;

making a determination that the network interface device has sufficient capacity to be programmed for delivery of future incoming data packets of the first multicast group to all user level endpoints of the host that remain as members of the first multicast group; and causing the network interface device to deliver future incoming data packets of the first multicast group to each of the remaining user level endpoints and not to the operating system.

11. A host system for establishing filtering for incoming data packets to be received from a network, for use with a network interface device, the host system being configured to have an operating system having a network protocol stack, comprising:

a memory subsystem; and a data processor coupled to the memor subsystem, the data processor configured to, in response to a first request for a first user level endpoint to join a first multicast group, program the network interface device to deliver future incoming data packets of the first multicast group to the first user level endpoint in a manner that at least part of a header of the future incoming data packets, including an identification of at least one of the first multicast group and the first user level endpoint, bypasses the operating system network protocol stack, wherein the data processor is further configured to, in response to a second request for a second user level endpoint to join a second multicast group, received while the first user level endpoint remains a member of the first multicast group, program the network interface device to deliver future incoming data packets of the second multicast group to the second user level endpoint in a manner that at least part of a header of future incoming data packets of the second multicast group, including an identification of at least one of the second multicast group and the second user level endpoint, bypasses the operating system network protocol stack.

12. A host system for establishing filtering for incoming data packets to be received from a network, for use with a network interface device, the host system being configured to have an operating system having a network protocol stack, comprising:

a memory subsystem; and a data processor coupled to the memor subsystem, the data processor configured to, in response to a first request for a first user level endpoint to join a first multicast group, program the network interface device to deliver future incoming data packets of the first multicast group to the first user level endpoint in a manner that at least part of a header of the future incoming data packets, including an identification of at least one of the first multicast group and the first user level endpoint, bypasses the operating system network protocol stack, wherein the data processor is further configured to, in response to a second request for a second user level endpoint to join the first multicast group, received while the first user level endpoint remains a member of the first multicast group, program the network interface device to deliver further future incoming data packets of the first multicast group also to the second user level endpoint, in a manner that at least part of a header of the further future incoming data packets, including an identification of at least one of the first multicast group and the second user level endpoint, bypasses the operating system network protocol stack.

13. A host system for establishing filtering for incoming data packets to be received from a network, for use with a network interface device, the host system being configured to have an operating system having a network protocol stack, comprising:

a memory subsystem; and a data processor coupled to the memory subsystem, the data processor configured to, in response to a first request for a first user level endpoint to join a first multicast group, program the network interface device to deliver future incoming data packets of the first multicast group to the first user level endpoint in a manner that at least part of a header of the future incoming data packets, including an identification of at least one of the first multicast group and the first user level endpoint, bypasses the operating system network protocol stack, wherein the data processor is further configured to, in response to a second request for a second user level endpoint to join the first multicast group:

make a determination that the network interface device lacks sufficient capacity to be programmed to add the second user level endpoint as an endpoint for delivery of future incoming data packets of the first multicast group; and in response to the determination, cause the operating system to deliver future incoming data packets of the first multicast group to the second user level endpoint.

14. A system according to claim 13, wherein the data processor is further configured to, in further response to the determination:

cause the network interface device to deliver future incoming data packets of the first multicast group to the operating system and not to the first user level endpoint; and cause the operating system to deliver future incoming data packets of the first multicast group, to the first user level endpoint.

15. A system according to claim 13, wherein the data processor is further configured to, in response to a third request for a third user level endpoint to join the first multicast group, and in response to a determination that the operating system is already handling deliveries of incoming data packets of the first multicast group, cause the operating system to deliver future incoming data packets of the first multicast group also to the third user level endpoint.

16. A system according to claim 13, wherein the data processor is further configured to, in response to a request for a particular user level endpoint to leave the first multicast group:

make a determination that the network interface device has sufficient capacity to be programmed for delivery of future incoming data packets of the first multicast group to all user level endpoints of the host that remain as members of the first multicast group; and in response to the determination, cause the network interface device to deliver future incoming data packets of the first multicast group to each of the remaining user level endpoints and not to the operating system.

17. A method for establishing filtering for incoming data packets to be received by a network interface device from a network and further for filtering incoming data packets received from the network, the network interface device communicating with a host subsystem via a communications bus, the host subsystem having an operating system having a network protocol stack, comprising the steps of:

receiving a first instruction from the host subsystem to deliver future incoming data packets of a first multicast group to a first user level endpoint in the host subsystem, in a manner that at least part of a header of the further future incoming data packets, including an identification of at least one of the first multicast group and the first user level endpoint, bypasses the operating system network protocol stack;

programming a table in the network interface device with a first correspondence of an identification of the first user level endpoint with an identification of the first multicast group receiving, while the first correspondence remains valid in the table a second instruction from the host subsystem to deliver future incoming data packets of the first multicast group to a second user level endpoint in the host subsystem;

further programming the table in the network interface device with a second correspondence of an identification of the second user level endpoint with an identification of the first multicast group;

receiving from the network a first incoming data packet of the first multicast group;

delivering the first incoming data packet to the first user level endpoint in a manner that at least part of a header of the first incoming data packet, including an identification of at least one of the first multicast group and the first user level endpoint, bypasses the operating system network protocol stack; and delivering the first incoming data packet also to the second user level endpoints, in a manner that at least part of a header of the first incoming data packet, including an identification of at least one of the first multicast group and the second user level endpoint, bypasses the operating system network protocol stack.

18. A method for establishing filtering for incoming data packets to be received by a network interface device from a network, the network interface device communicating with a host subsystem via a communications bus, the host subsystem having an operating system having a network protocol stack, comprising the steps of:

receiving a first instruction from the host subsystem to deliver future incoming data packets of a first multicast group to a first user level endpoint in the host subsystem, in a manner that at least part of a header of the further future incoming data packets, includin an identification of at least one of the first multicast group and the first user level endpoint, bypasses the operating system network protocol stack; and programming a table in the network interface device with a first correspondence of an identification of the first user level endpoint with an identification of the first multicast group, wherein the table includes a primary table and a secondary table, and wherein the step of programming the table with the first correspondence comprises the step of programming the first correspondence into the primary table;

further comprising the steps of:

receiving, while the first correspondence remains valid in the primary table, a second instruction from the host subsystem to deliver future incoming data packets of the first multicast group to a second user level endpoint in the host subsystem;

programming into the secondary table both the first correspondence and a second correspondence of an identification of the second user level endpoint with an identification of the first multicast group; and unprogramming the first correspondence from the primary table.

19. A method for establishing filtering for incoming data packets to be received by a network interface device from a network, the network interface device communicating with a host subsystem via a communications bus, the host subsystem having an operating system having a network protocol stack, comprising the steps of:

receiving a first instruction from the host subsystem to deliver future incoming data packets of a first multicast group to a first user level endpoint in the host subsystem, in a manner that at least part of a header of the further future incoming data packets, including an identification of at least one of the first multicast group and the first user level endpoint, bypasses the operating system network protocol stack;

programming a table in the network interface device with a first correspondence of an identification of the first user level endpoint with an identification of the first multicast group;

receiving a second instruction from the host subsystem to deliver future incoming unicast data packets having indicated second header characteristics to a second user level endpoint in the host subsystem; and further programming the table in the network interface device with a second correspondence of an identification of the second user level endpoint with an identification of the second header characteristics.

20. Network interface apparatus, for use with a host subsystem in communication with the network interface apparatus via an internal communications bus of the host subsystem, the host subsystem having an operating system having a network protocol stack, the network interface device comprising:

a filter for filtering incoming data packets received from the network, the filter comprising a table; and a resource configuration unit that, in response to receipt from the host subsystem via the communications bus of first and second instructions to deliver future incoming data packets of a first multicast group to respective first and second user level endpoints in the host subsystem, configures the filter table in the network interface device with a correspondence of an identification of both the first and second user level endpoints, on the one hand, with an identification of the first multicast group, on the other hand, wherein in response to receipt from the host subsystem, while the first and second correspondences remains valid in the table, of a third instruction from the host subsystem to no longer deliver future incoming data packets of the first multicast group to an identified one of the first and second user level endpoints the resource configuration unit deletes from the table, the correspondence of the first multicast group with the identified one of the first and second user level endpoints.

21. Network interface apparatus, for use with a host subsystem in communication with the network interface apparatus via an internal communications bus of the host subsystem, the host subsystem having an operating system having a network protocol stack, the network interface apparatus comprising a filter for filtering incoming data packets received from the network, the filter comprising a filter table, the network interface apparatus being configured to, in response to receipt from the network of an incoming data packet of a first multicast group, to deliver the data packet via the communications bus to each of a plurality of user level processes each identified in the filter table, bypassing the operating system, the network interface apparatus being further configured to determine if the following conditions are fulfilled:

the incoming data packet is not malformed, the incoming data packet uses a protocol that is supported in the filter table, and at least one correspondence is found between the incoming data packet and at least one user level endpoint;

and if all of the conditions are fulfilled, the network interface apparatus delivering the incoming data packet to each of the plurality of user level processes, and otherwise, delivering the incoming data packet to the operating system.

* * * * *